US012768623B1

(12) United States Patent
Smith et al.

(10) Patent No.: US 12,768,623 B1
(45) Date of Patent: Oct. 20, 2026

(54) SYSTEMS AND METHODS FOR MISSION PLANNING OF A MILITARY VEHICLE

(71) Applicant: Oshkosh Defense, LLC, Oshkosh, WI (US)

(72) Inventors: Chad Smith, Omro, WI (US); Nader Nasr, Neenah, WI (US); Rachell Harsh, Oshkosh, WI (US); Mike J. Bolton, Oshkosh, WI (US); Bradon Zeitler, Oshkosh, WI (US); Ryan Crabtree, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

(21) Appl. No.: 17/886,610

(22) Filed: Aug. 12, 2022

Related U.S. Application Data

(60) Provisional application No. 63/344,128, filed on May 20, 2022, provisional application No. 63/233,008, filed on Aug. 13, 2021.

(51) Int. Cl.
*F41H 7/00* (2006.01)
*B60L 58/13* (2019.01)
*G05D 1/00* (2024.01)

(52) U.S. Cl.
CPC .............. *F41H 7/005* (2013.01); *B60L 58/13* (2019.02); *G05D 1/0061* (2013.01); (Continued)

(58) Field of Classification Search
CPC ...... F41H 7/005; B60L 58/13; B60L 2250/10; B60L 2260/26; B60L 2260/46; G05D 1/0061; G05D 1/0088; G05D 1/0217
(Continued)

(56) References Cited

U.S. PATENT DOCUMENTS

| | | | |
|---|---|---|---|
| 1,763 | A | 9/1840 | Grimes |
| 13,952 | A | 12/1855 | George et al. |

(Continued)

FOREIGN PATENT DOCUMENTS

| | | | |
|---|---|---|---|
| CN | 102490584 | A | 6/2012 |
| CN | 102849062 | A | 1/2013 |

(Continued)

OTHER PUBLICATIONS

Blackett, “What is Subaru X-Mode, and How Does It Work?”, J.D. Power, Mar. 12, 2021.

(Continued)

*Primary Examiner* — Ellis B. Ramirez
(74) *Attorney, Agent, or Firm* — Foley & Lardner LLP

(57) ABSTRACT

A system for mission planning of a military vehicle includes a military vehicle operable according to different modes and having a controller. The system includes processing circuitry that obtains a starting location and a destination for the military vehicle and obtains data associated with a geographic area. The processing circuitry determines a mission plan based on the data, the starting location, and the destination. The mission plan includes a route between the starting location and the destination, and a selection of one of the modes that the military vehicle should be operated according to, along portions of the route. The processing circuitry provides the mission plan to the military vehicle for use by the military vehicle. The controller uses the mission plan operate the military vehicle to transport along the route. The controller also transitions the military vehicle between modes based on the mission plan.

20 Claims, 44 Drawing Sheets

(52) U.S. Cl.
CPC ......... *G05D 1/0088* (2013.01); *G05D 1/0217* (2013.01); *B60L 2250/10* (2013.01); *B60L 2260/26* (2013.01); *B60L 2260/46* (2013.01)

(58) Field of Classification Search
USPC .......... 701/25, 22, 27, 448; 180/65.1, 65.21; 477/2
See application file for complete search history.

(56) References Cited

U.S. PATENT DOCUMENTS

| | | | |
|---|---|---|---|
| 16,774 | A | 3/1857 | Holmes |
| 29,361 | A | 7/1860 | Covel |
| 47,430 | A | 4/1865 | Kolb |
| 48,292 | A | 6/1865 | Leonard |
| 51,775 | A | 12/1865 | Brown |
| 51,776 | A | 12/1865 | Buckley |
| 52,626 | A | 2/1866 | Tyler |
| 97,675 | A | 12/1869 | Morris |
| 99,256 | A | 1/1870 | Squires et al. |
| 112,496 | A | 3/1871 | Robbins |
| 139,955 | A | 6/1873 | Hall |
| 158,756 | A | 1/1875 | Tibbals |
| 162,200 | A | 4/1875 | Sisum |
| 183,431 | A | 10/1876 | Steckler, Jr. |
| 193,992 | A | 8/1877 | Patterson |
| 200,315 | A | 2/1878 | Lewis |
| 230,192 | A | 7/1880 | Olmstead |
| 294,505 | A | 3/1884 | Robinson |
| 297,417 | A | 4/1884 | Keuffel |
| 304,091 | A | 8/1884 | Foley |
| 307,084 | A | 10/1884 | Bissell |
| 319,389 | A | 6/1885 | Button |
| 334,160 | A | 1/1886 | Berger |
| 360,678 | A | 4/1887 | Gaskin, Sr. |
| 2,612,964 | A | 10/1952 | Dudley |
| 4,093,034 | A | 6/1978 | Curley et al. |
| 4,533,011 | A | 8/1985 | Heidemeyer et al. |
| 4,998,745 | A | 3/1991 | David |
| 5,081,365 | A | 1/1992 | Field et al. |
| 5,139,123 | A | 8/1992 | Rutke |
| 5,281,190 | A | 1/1994 | Koivunen |
| 5,343,970 | A | 9/1994 | Severinsky |
| 5,559,420 | A | 9/1996 | Kohchi |
| 5,713,424 | A | 2/1998 | Christenson |
| 5,720,589 | A | 2/1998 | Christenson et al. |
| 5,725,350 | A | 3/1998 | Christenson |
| 5,769,055 | A | 6/1998 | Motose et al. |
| 5,769,592 | A | 6/1998 | Christenson |
| 5,775,867 | A | 7/1998 | Christenson |
| 5,785,486 | A | 7/1998 | McNeilus et al. |
| 5,785,487 | A | 7/1998 | McNeilus et al. |
| 5,820,150 | A | 10/1998 | Archer et al. |
| 5,833,429 | A | 11/1998 | McNeilus et al. |
| 5,851,100 | A | 12/1998 | Brandt |
| 5,857,822 | A | 1/1999 | Christenson |
| 5,863,086 | A | 1/1999 | Christenson |
| 5,868,543 | A | 2/1999 | McNeilus et al. |
| 5,885,049 | A | 3/1999 | McNeilus et al. |
| 5,897,123 | A | 4/1999 | Cherney et al. |
| 6,083,138 | A | 7/2000 | Aoyama et al. |
| 6,086,074 | A | 7/2000 | Braun |
| 6,123,347 | A | 9/2000 | Christenson |
| 6,155,126 | A | 12/2000 | Vogt et al. |
| 6,164,400 | A | 12/2000 | Jankovic et al. |
| 6,209,672 | B1 | 4/2001 | Severinsky |
| 6,371,227 | B2 | 4/2002 | Bartlett |
| 6,372,378 | B1 | 4/2002 | Warner et al. |
| 6,516,914 | B1 | 2/2003 | Andersen et al. |
| 6,534,705 | B2 | 3/2003 | Berrios et al. |
| 6,561,718 | B1 | 5/2003 | Archer et al. |
| 6,672,415 | B1 | 1/2004 | Tabata |
| 6,764,085 | B1 | 7/2004 | Anderson |
| 6,779,806 | B1 | 8/2004 | Breitbach et al. |
| 6,832,148 | B1 | 12/2004 | Bennett et al. |
| 6,883,815 | B2 | 4/2005 | Archer |
| 6,976,688 | B2 | 12/2005 | Archer et al. |
| 7,073,620 | B2 | 7/2006 | Braun et al. |
| 7,207,582 | B2 | 4/2007 | Siebers et al. |
| 7,222,004 | B2 | 5/2007 | Anderson |
| 7,231,994 | B2 | 6/2007 | Buglione et al. |
| 7,258,194 | B2 | 8/2007 | Braun et al. |
| 7,277,782 | B2 | 10/2007 | Yakes et al. |
| 7,302,320 | B2 | 11/2007 | Nasr et al. |
| 7,331,586 | B2 | 2/2008 | Trinkner et al. |
| 7,357,203 | B2 | 4/2008 | Morrow et al. |
| 7,379,797 | B2 | 5/2008 | Nasr et al. |
| 7,439,711 | B2 | 10/2008 | Bolton |
| 7,472,914 | B2 | 1/2009 | Anderson et al. |
| 7,497,285 | B1 | 3/2009 | Radev |
| 7,521,814 | B2 | 4/2009 | Nasr |
| 7,657,351 | B2 | 2/2010 | Moran |
| 7,770,506 | B2 | 8/2010 | Johnson et al. |
| 7,848,857 | B2 | 12/2010 | Nasr et al. |
| 7,878,750 | B2 | 2/2011 | Zhou et al. |
| 7,905,540 | B2 | 3/2011 | Kiley et al. |
| 7,937,194 | B2 | 5/2011 | Nasr et al. |
| 8,000,850 | B2 | 8/2011 | Nasr et al. |
| 8,005,587 | B2 | 8/2011 | Tamor et al. |
| 8,201,656 | B2 | 6/2012 | Archer et al. |
| 8,286,743 | B2 | 10/2012 | Rawlinson |
| 8,307,924 | B2 | 11/2012 | Wang et al. |
| 8,333,390 | B2 | 12/2012 | Linsmeier et al. |
| 8,337,352 | B2 | 12/2012 | Morrow et al. |
| 8,376,077 | B2 | 2/2013 | Venton-Walters |
| 8,459,619 | B2 | 6/2013 | Trinh et al. |
| 8,465,025 | B2 | 6/2013 | Venton-Walters et al. |
| 8,561,735 | B2 | 10/2013 | Morrow et al. |
| 8,565,990 | B2 | 10/2013 | Colvin et al. |
| 8,566,013 | B2 | 10/2013 | Davis et al. |
| 8,596,648 | B2 | 12/2013 | Venton-Walters et al. |
| 8,764,029 | B2 | 7/2014 | Venton-Walters et al. |
| 8,801,017 | B2 | 8/2014 | Ellifson et al. |
| 8,801,393 | B2 | 8/2014 | Crabtree et al. |
| 8,833,324 | B2 | 9/2014 | O'Brien et al. |
| 8,834,319 | B2 | 9/2014 | Nefcy |
| 8,839,902 | B1 | 9/2014 | Archer et al. |
| 8,864,613 | B2 | 10/2014 | Morrow et al. |
| 8,876,133 | B2 | 11/2014 | Ellifson |
| 8,955,859 | B1 | 2/2015 | Richmond et al. |
| 8,955,880 | B2 | 2/2015 | Malcolm et al. |
| 8,991,834 | B2 | 3/2015 | Venton-Walters et al. |
| 8,991,840 | B2 | 3/2015 | Zuleger et al. |
| 9,007,020 | B2 | 4/2015 | Prosser et al. |
| 9,016,703 | B2 | 4/2015 | Rowe et al. |
| 9,045,014 | B1 | 6/2015 | Verhoff et al. |
| 9,054,402 | B1 | 6/2015 | Rawlinson |
| 9,074,656 | B2 | 7/2015 | Benz et al. |
| 9,114,804 | B1 | 8/2015 | Shukla et al. |
| 9,126,587 | B2 | 9/2015 | Yamazaki et al. |
| 9,127,738 | B2 | 9/2015 | Ellifson et al. |
| 9,132,736 | B1 | 9/2015 | Zhang et al. |
| 9,174,520 | B2 | 11/2015 | Katayama et al. |
| 9,174,686 | B1 | 11/2015 | Holda et al. |
| 9,227,582 | B2 | 1/2016 | Katayama et al. |
| 9,254,740 | B2 | 2/2016 | Lamperth |
| 9,291,230 | B2 | 3/2016 | Ellifson et al. |
| 9,302,129 | B1 | 4/2016 | Betz et al. |
| 9,303,715 | B2 | 4/2016 | Dillman et al. |
| 9,318,751 | B2 | 4/2016 | Chorian et al. |
| 9,327,576 | B2 | 5/2016 | Ellifson |
| 9,328,986 | B1 | 5/2016 | Pennau et al. |
| 9,329,000 | B1 | 5/2016 | Richmond et al. |
| 9,376,102 | B1 | 6/2016 | Shukla et al. |
| 9,404,413 | B2 | 8/2016 | Schmalzing et al. |
| 9,410,823 | B2 | 8/2016 | Widmer et al. |
| 9,415,697 | B2 | 8/2016 | Asai |
| 9,423,069 | B2 | 8/2016 | Shimmel et al. |
| 9,428,042 | B2 | 8/2016 | Morrow et al. |
| 9,434,321 | B2 | 9/2016 | Perron et al. |
| 9,440,523 | B2 | 9/2016 | Decker |
| 9,452,750 | B2 | 9/2016 | Shukla et al. |
| 9,472,971 | B2 | 10/2016 | Soar |
| 9,492,695 | B2 | 11/2016 | Betz et al. |

(56) References Cited

U.S. PATENT DOCUMENTS

| | | | |
|---|---|---|---|
| 9,533,631 | B2 | 1/2017 | Kamimura et al. |
| 9,580,960 | B2 | 2/2017 | Aiken et al. |
| 9,580,962 | B2 | 2/2017 | Betz et al. |
| 9,650,032 | B2 | 5/2017 | Kotloski et al. |
| 9,651,120 | B2 | 5/2017 | Morrow et al. |
| 9,656,640 | B1 | 5/2017 | Verhoff et al. |
| 9,656,659 | B2 | 5/2017 | Shukla et al. |
| 9,669,679 | B2 | 6/2017 | Zuleger et al. |
| 9,677,334 | B2 | 6/2017 | Aiken et al. |
| 9,688,112 | B2 | 6/2017 | Venton-Walters et al. |
| 9,707,869 | B1 | 7/2017 | Messina et al. |
| 9,732,846 | B2 | 8/2017 | Li et al. |
| 9,751,540 | B2 | 9/2017 | Cook |
| 9,764,613 | B2 | 9/2017 | Rowe et al. |
| 9,765,841 | B2 | 9/2017 | Ellifson et al. |
| 9,806,306 | B2 | 10/2017 | Tsutsui et al. |
| 9,809,080 | B2 | 11/2017 | Ellifson et al. |
| 9,821,789 | B2 | 11/2017 | Shukla et al. |
| 9,849,871 | B2 | 12/2017 | Dunlap et al. |
| 9,890,024 | B2 | 2/2018 | Hao et al. |
| 9,908,520 | B2 | 3/2018 | Shukla et al. |
| 9,944,145 | B2 | 4/2018 | Dillman et al. |
| 9,944,186 | B1 | 4/2018 | Rehberger |
| 9,970,515 | B2 | 5/2018 | Morrow et al. |
| 10,029,555 | B2 | 7/2018 | Kotloski et al. |
| 10,029,556 | B2 | 7/2018 | Morrow et al. |
| 10,030,737 | B2 | 7/2018 | Dillman et al. |
| 10,118,477 | B2 | 11/2018 | Borud et al. |
| 10,144,389 | B2 | 12/2018 | Archer et al. |
| 10,160,438 | B2 | 12/2018 | Shukla et al. |
| 10,167,027 | B2 | 1/2019 | Perron et al. |
| 10,221,055 | B2 | 3/2019 | Hao et al. |
| 10,224,745 | B2 | 3/2019 | Easton et al. |
| 10,267,390 | B2 | 4/2019 | Morrow et al. |
| 10,272,909 | B1 | 4/2019 | Melatti et al. |
| 10,315,643 | B2 | 6/2019 | Shukla et al. |
| 10,350,956 | B2 | 7/2019 | Dillman et al. |
| 10,369,860 | B2 | 8/2019 | Ellifson et al. |
| 10,384,668 | B2 | 8/2019 | Hilliard et al. |
| 10,392,000 | B2 | 8/2019 | Shukla et al. |
| 10,392,056 | B2 | 8/2019 | Perron et al. |
| 10,407,288 | B2 | 9/2019 | Hao et al. |
| 10,421,332 | B2 | 9/2019 | Venton-Walters et al. |
| 10,422,403 | B2 | 9/2019 | Ellifson et al. |
| 10,434,894 | B2 | 10/2019 | Li et al. |
| 10,434,995 | B2 | 10/2019 | Verhoff et al. |
| 10,435,026 | B2 | 10/2019 | Shively et al. |
| 10,457,134 | B2 | 10/2019 | Morrow et al. |
| 10,458,182 | B1 | 10/2019 | Betz et al. |
| 10,463,900 | B1 | 11/2019 | Betz et al. |
| 10,464,389 | B2 | 11/2019 | Zuleger et al. |
| 10,486,689 | B2 | 11/2019 | Farrell et al. |
| D869,332 | S | 12/2019 | Gander et al. |
| 10,532,722 | B1 | 1/2020 | Betz et al. |
| 10,556,622 | B1 | 2/2020 | Calliari et al. |
| 10,611,203 | B1 | 4/2020 | Rositch et al. |
| 10,611,204 | B1 | 4/2020 | Zhang et al. |
| 10,619,696 | B2 | 4/2020 | Dillman et al. |
| 10,632,805 | B1 | 4/2020 | Rositch et al. |
| 10,676,079 | B1 | 6/2020 | Bucknor et al. |
| 10,723,282 | B2 | 7/2020 | Perron et al. |
| 10,724,616 | B2 | 7/2020 | Katsura et al. |
| 10,734,693 | B2 | 8/2020 | Staudenmaier |
| 10,752,075 | B1 | 8/2020 | Shukla et al. |
| 10,759,251 | B1 | 9/2020 | Zuleger |
| 10,780,770 | B2 | 9/2020 | Kohler et al. |
| 10,808,813 | B2 | 10/2020 | Sugimoto et al. |
| 10,836,375 | B2 | 11/2020 | Kaufman et al. |
| 10,843,549 | B2 | 11/2020 | Morrow et al. |
| 10,858,231 | B2 | 12/2020 | Holmes et al. |
| 10,875,521 | B2 | 12/2020 | Pettersson |
| 10,934,145 | B2 | 3/2021 | Hao et al. |
| 10,940,728 | B2 | 3/2021 | Rositch et al. |
| 10,953,939 | B2 | 3/2021 | Zuleger et al. |
| 10,960,248 | B2 | 3/2021 | Betz et al. |
| 10,967,728 | B2 | 4/2021 | Kotloski et al. |
| 10,974,561 | B2 | 4/2021 | Dillman et al. |
| 10,974,713 | B2 | 4/2021 | Shukla et al. |
| 10,974,724 | B1 | 4/2021 | Shively et al. |
| 10,981,538 | B2 | 4/2021 | Archer et al. |
| 10,982,736 | B2 | 4/2021 | Steinberger et al. |
| 10,988,132 | B2 | 4/2021 | Ayesh et al. |
| 10,989,279 | B2 | 4/2021 | Morrow et al. |
| 11,001,135 | B2 | 5/2021 | Wente et al. |
| 11,007,863 | B2 | 5/2021 | Wente et al. |
| 11,027,606 | B2 | 6/2021 | Wildgrube et al. |
| 11,034,206 | B2 | 6/2021 | Zuleger |
| 11,034,227 | B2 | 6/2021 | Spielvogel et al. |
| 11,046,142 | B2 | 6/2021 | Zhang et al. |
| 11,052,899 | B2 | 7/2021 | Shukla et al. |
| 11,097,617 | B2 | 8/2021 | Rocholl et al. |
| 11,110,977 | B2 | 9/2021 | Smith et al. |
| 11,111,120 | B2 | 9/2021 | Hao et al. |
| 11,135,890 | B2 | 10/2021 | Ellifson et al. |
| 11,136,187 | B1 | 10/2021 | Bolton et al. |
| 11,137,053 | B2 | 10/2021 | Steinberger et al. |
| 11,142,058 | B2 | 10/2021 | Marquez Duran et al. |
| 11,148,530 | B2 | 10/2021 | Sakai |
| 11,148,550 | B2 | 10/2021 | Rocholl et al. |
| 11,161,403 | B2 | 11/2021 | Lo et al. |
| 11,161,415 | B1 | 11/2021 | Koga et al. |
| 11,161,483 | B2 | 11/2021 | Betz et al. |
| 11,167,919 | B1 | 11/2021 | Koga et al. |
| 11,199,239 | B2 | 12/2021 | Dumitru et al. |
| 11,209,067 | B2 | 12/2021 | Ellifson et al. |
| 11,225,240 | B2 | 1/2022 | Dalum |
| 11,230,278 | B2 | 1/2022 | Linsmeier et al. |
| 11,299,139 | B2 | 4/2022 | Shukla et al. |
| 11,358,431 | B2 | 6/2022 | Hall et al. |
| 11,376,943 | B1 | 7/2022 | Bolton et al. |
| 11,376,958 | B1 | 7/2022 | Smith et al. |
| 11,376,990 | B1 | 7/2022 | Smith et al. |
| 11,377,089 | B1 | 7/2022 | Smith et al. |
| 11,383,694 | B1 | 7/2022 | Bolton |
| 11,420,522 | B1 | 8/2022 | Bernatchez |
| 11,420,695 | B2 | 8/2022 | Viele et al. |
| 11,485,228 | B1 | 11/2022 | Smith et al. |
| 11,498,409 | B1 | 11/2022 | Smith et al. |
| 11,498,426 | B1 | 11/2022 | Bernatchez |
| 11,505,062 | B1 | 11/2022 | Smith et al. |
| 11,597,399 | B1 | 3/2023 | Smith et al. |
| 11,608,050 | B1 | 3/2023 | Smith et al. |
| 11,712,977 | B2 | 8/2023 | Bucknor et al. |
| 11,964,587 | B2 | 4/2024 | Yukawa |
| 11,967,727 | B2 | 4/2024 | Poloczek et al. |
| 11,981,340 | B1 | 5/2024 | Smith et al. |
| 11,987,128 | B2 | 5/2024 | Smith et al. |
| 12,100,966 | B2 | 9/2024 | Lethellier et al. |
| 12,278,354 | B2 | 4/2025 | Teshima et al. |
| 2003/0183431 | A1 | 10/2003 | Cikanek et al. |
| 2005/0080523 | A1* | 4/2005 | Bennett .................. B60K 6/445 |
| 2005/0109550 | A1 | 5/2005 | Buglione et al. |
| 2005/0113996 | A1 | 5/2005 | Pillar et al. |
| 2005/0209747 | A1* | 9/2005 | Yakes ................. H02J 7/00712 |
| 2005/0251299 | A1* | 11/2005 | Donnelly ................ B60L 15/20 |
| 2005/0256631 | A1 | 11/2005 | Cawthorne et al. |
| 2006/0173593 | A1* | 8/2006 | Anderson .......... G01C 21/3461 |
| 2007/0021879 | A1* | 1/2007 | DelNero .............. G05D 1/0088 |
| 2007/0112496 | A1 | 5/2007 | Ji |
| 2007/0124037 | A1* | 5/2007 | Moran .................. B60W 10/06 |
| 2007/0162200 | A1 | 7/2007 | Zillmer et al. |
| 2007/0164552 | A1 | 7/2007 | Bauer et al. |
| 2007/0186896 | A1 | 8/2007 | Carroll et al. |
| 2007/0278856 | A1 | 12/2007 | Craig et al. |
| 2008/0017426 | A1 | 1/2008 | Walters et al. |
| 2008/0020875 | A1 | 1/2008 | Serrels et al. |
| 2008/0029361 | A1 | 2/2008 | Deroo et al. |
| 2008/0093139 | A1 | 4/2008 | Dobereiner et al. |
| 2008/0099256 | A1 | 5/2008 | Holmes et al. |
| 2008/0149405 | A1 | 6/2008 | Hladun et al. |
| 2008/0150350 | A1 | 6/2008 | Morrow et al. |
| 2008/0234096 | A1 | 9/2008 | Joshi et al. |
| 2008/0284118 | A1 | 11/2008 | Venton-Walters et al. |
| 2009/0013952 | A1 | 1/2009 | Deniston et al. |

(56) References Cited

U.S. PATENT DOCUMENTS

2009/0062320 A1 3/2009 Guagnano et al.
2009/0098976 A1 4/2009 Usoro et al.
2009/0174158 A1 7/2009 Anderson et al.
2009/0192660 A1 7/2009 Tamor et al.
2009/0287366 A1 11/2009 Davis et al.
2009/0298646 A1 12/2009 Parsons
2009/0326750 A1* 12/2009 Ang .................. G01C 21/3407 701/1
2010/0019538 A1 1/2010 Kiley et al.
2010/0049389 A1 2/2010 Ando
2010/0065001 A1 3/2010 Spicer et al.
2010/0138089 A1 6/2010 James
2010/0145562 A1 6/2010 Moran
2010/0219007 A1 9/2010 Dalum et al.
2010/0230192 A1 9/2010 Riley
2011/0079978 A1 4/2011 Schreiner et al.
2011/0162901 A1 7/2011 Lucas et al.
2011/0297469 A1 12/2011 Usami et al.
2012/0225751 A1 9/2012 Andreae et al.
2012/0227394 A1 9/2012 Schweiher et al.
2012/0244979 A1 9/2012 Kruger
2012/0266701 A1 10/2012 Yamada et al.
2012/0299544 A1 11/2012 Prosser et al.
2012/0328454 A1 12/2012 Roby
2012/0329593 A1 12/2012 Larrabee et al.
2013/0126254 A1 5/2013 Lee et al.
2013/0158756 A1 6/2013 Yamazaki et al.
2013/0218386 A1* 8/2013 Fisker ...................... B60K 6/46
2013/0234864 A1* 9/2013 Herman ............... G05D 1/0088
2014/0046592 A1* 2/2014 Christ ............... B60W 50/0097
2014/0207346 A1 7/2014 Filla et al.
2014/0228168 A1 8/2014 Kaufman et al.
2014/0315064 A1 10/2014 Katayama et al.
2015/0038290 A1 2/2015 Bichler et al.
2015/0051775 A1 2/2015 Gotoh et al.
2015/0051776 A1 2/2015 Gotoh et al.
2015/0188104 A1 7/2015 Templeman et al.
2015/0247559 A1 9/2015 Graves
2015/0307084 A1 10/2015 Bureau et al.
2015/0336568 A1 11/2015 Porras et al.
2015/0360678 A1 12/2015 Le Roy et al.
2016/0001763 A1 1/2016 Ehrlich et al.
2016/0052382 A1 2/2016 Clark et al.
2016/0052420 A1 2/2016 Kim
2016/0082951 A1 3/2016 Ohn et al.
2016/0152129 A1 6/2016 West et al.
2016/0185207 A1 6/2016 Gerschutz et al.
2016/0193992 A1 7/2016 Hancock et al.
2016/0200315 A1 7/2016 Fracchia et al.
2016/0304091 A1 10/2016 Remes
2016/0355202 A1 12/2016 Nitti
2017/0023947 A1* 1/2017 McMillion ............. B64U 80/25
2017/0028912 A1* 2/2017 Yang ....................... B60L 58/12
2017/0028978 A1 2/2017 Dunlap et al.
2017/0066431 A1 3/2017 Kim et al.
2017/0120890 A1 5/2017 Payne
2017/0120899 A1 5/2017 Sugimoto et al.
2017/0129475 A1* 5/2017 Prakah-Asante ...... B60K 6/445
2017/0282737 A1 10/2017 Miller et al.
2017/0291609 A1 10/2017 Reich et al.
2017/0297425 A1 10/2017 Wildgrube et al.
2017/0355259 A1 12/2017 Borud et al.
2017/0355373 A1 12/2017 Dalum
2018/0001839 A1 1/2018 Perron et al.
2018/0009431 A1 1/2018 Akuzawa
2018/0031085 A1 2/2018 Steinberger et al.
2018/0050685 A1 2/2018 Atluri et al.
2018/0050686 A1 2/2018 Atluri et al.
2018/0154754 A1 6/2018 Rowley et al.
2018/0162371 A1 6/2018 Colavincenzo et al.
2018/0170349 A1 6/2018 Jobson et al.
2018/0265001 A1 9/2018 Bean et al.
2018/0281772 A1* 10/2018 Hilliard ................... B60L 50/60
2018/0304882 A1 10/2018 Koh et al.
2018/0319389 A1 11/2018 Felsch et al.
2018/0334160 A1 11/2018 Kava et al.
2018/0345805 A1 12/2018 Hernandez Lopez et al.
2018/0370373 A1 12/2018 Hooper et al.
2019/0039407 A1 2/2019 Smith
2019/0084395 A1 3/2019 Toyota et al.
2019/0126759 A1 5/2019 Miller et al.
2019/0129416 A1* 5/2019 Upmanue ............. B60W 40/08
2019/0135107 A1 5/2019 Fortune et al.
2019/0143957 A1 5/2019 Dalum et al.
2019/0178350 A1 6/2019 Steinberger et al.
2019/0202286 A1 7/2019 Natsume et al.
2019/0233034 A1 8/2019 Viele et al.
2019/0248361 A1 8/2019 Farrell et al.
2019/0270387 A1 9/2019 Dudar et al.
2019/0276001 A1 9/2019 Kava et al.
2019/0291711 A1 9/2019 Shukla et al.
2019/0308669 A1 10/2019 Aitharaju et al.
2019/0316650 A1 10/2019 Dillman et al.
2019/0344838 A1 11/2019 Perron et al.
2019/0359198 A1 11/2019 Velderman et al.
2019/0381900 A1 12/2019 Ito et al.
2020/0001698 A1 1/2020 Jang et al.
2020/0047740 A1 2/2020 Hoesl
2020/0056426 A1 2/2020 Betz et al.
2020/0062071 A1 2/2020 Zuleger et al.
2020/0108709 A1 4/2020 Kohler et al.
2020/0117204 A1* 4/2020 Lindemann ....... B60W 60/0023
2020/0139955 A1 5/2020 Park
2020/0164760 A1 5/2020 Sohmshetty et al.
2020/0171907 A1 6/2020 Hall et al.
2020/0180440 A1 6/2020 Uchimura et al.
2020/0223276 A1 7/2020 Rositch et al.
2020/0232533 A1 7/2020 Dillman et al.
2020/0247388 A1 8/2020 Johri et al.
2020/0316816 A1 10/2020 Messina et al.
2020/0317083 A1 10/2020 Messina et al.
2020/0346547 A1 11/2020 Rocholl et al.
2020/0346556 A1 11/2020 Rocholl et al.
2020/0384823 A1 12/2020 Shukla et al.
2020/0384977 A1 12/2020 Higuchi et al.
2020/0385977 A1 12/2020 Cooper et al.
2020/0386135 A1 12/2020 Kobayashi et al.
2021/0016774 A1 1/2021 Cho et al.
2021/0031612 A1 2/2021 Yakes et al.
2021/0031649 A1 2/2021 Messina et al.
2021/0031837 A1 2/2021 Schmidt
2021/0070371 A1 3/2021 Ebisumoto et al.
2021/0070375 A1 3/2021 Ebisumoto et al.
2021/0070388 A1 3/2021 Matsuda
2021/0107361 A1 4/2021 Linsmeier et al.
2021/0122205 A1 4/2021 Shukla et al.
2021/0129757 A1 5/2021 Uken
2021/0135177 A1 5/2021 Kalra et al.
2021/0140517 A1 5/2021 Steinberger et al.
2021/0143663 A1 5/2021 Bolton
2021/0155063 A1 5/2021 Rositch et al.
2021/0155218 A1 5/2021 Higuchi et al.
2021/0171137 A1 6/2021 Zuleger et al.
2021/0173411 A1* 6/2021 Rao .......................... G08G 1/22
2021/0178890 A1 6/2021 Steinberger et al.
2021/0188069 A1 6/2021 Friedman
2021/0188076 A1 6/2021 Morrow et al.
2021/0200243 A1 7/2021 Chen et al.
2021/0213822 A1 7/2021 Ripley et al.
2021/0213934 A1 7/2021 Higuchi et al.
2021/0215493 A1* 7/2021 Kapadia ............. G01C 21/3697
2021/0221190 A1 7/2021 Rowe
2021/0221216 A1 7/2021 Yakes et al.
2021/0231411 A1 7/2021 Grate et al.
2021/0276450 A1 9/2021 Eshleman et al.
2021/0276643 A1 9/2021 Ellifson et al.
2021/0313647 A1 10/2021 Itai et al.
2021/0316588 A1 10/2021 Zhang et al.
2021/0318696 A1* 10/2021 Koch .................. G05D 1/0016
2021/0323436 A1 10/2021 Rocholl et al.
2021/0323437 A1 10/2021 Rocholl et al.
2021/0323438 A1 10/2021 Rocholl et al.
2021/0327170 A1 10/2021 Rocholl et al.
2021/0327237 A1 10/2021 Rocholl et al.

(56) References Cited

U.S. PATENT DOCUMENTS

| | | | | |
|---|---|---|---|---|
| 2021/0339632 | A1 | 11/2021 | Rocholl et al. | |
| 2021/0339648 | A1 | 11/2021 | Koga et al. | |
| 2021/0354684 | A1 | 11/2021 | Healy et al. | |
| 2021/0369515 | A1 | 12/2021 | Malcolm et al. | |
| 2021/0380179 | A1 | 12/2021 | Smith et al. | |
| 2021/0396293 | A1 | 12/2021 | Ellifson et al. | |
| 2022/0001734 | A1 | 1/2022 | Tanaka et al. | |
| 2022/0049647 | A1 | 2/2022 | Papaioannou et al. | |
| 2022/0063660 | A1* | 3/2022 | Poulet | B60W 60/005 |
| 2022/0097675 | A1 | 3/2022 | Bryan et al. | |
| 2022/0118845 | A1 | 4/2022 | Mu | |
| 2022/0126878 | A1* | 4/2022 | Moustafa | G08G 1/0112 |
| 2022/0176965 | A1 | 6/2022 | Gesang et al. | |
| 2022/0268202 | A1 | 8/2022 | Pennazza et al. | |
| 2022/0273975 | A1 | 9/2022 | Svensson | |
| 2022/0344964 | A1 | 10/2022 | Duarte | |
| 2022/0355678 | A1 | 11/2022 | Seo | |
| 2022/0371456 | A1 | 11/2022 | Borud et al. | |
| 2022/0379730 | A1 | 12/2022 | Bernatchez | |
| 2023/0047110 | A1 | 2/2023 | Smith et al. | |
| 2023/0047430 | A1 | 2/2023 | Smith et al. | |
| 2023/0048292 | A1 | 2/2023 | Smith et al. | |
| 2023/0052626 | A1 | 2/2023 | Smith et al. | |
| 2023/0057525 | A1 | 2/2023 | Smith et al. | |
| 2023/0070769 | A1 | 3/2023 | Wheeler et al. | |
| 2023/0173902 | A1 | 6/2023 | Ruiz et al. | |
| 2023/0200296 | A1 | 6/2023 | Zeiler et al. | |
| 2023/0231245 | A1 | 7/2023 | Gauthier | |
| 2023/0294505 | A1 | 9/2023 | Smith et al. | |
| 2023/0318131 | A1 | 10/2023 | Kellner et al. | |
| 2023/0415555 | A1 | 12/2023 | Murphy et al. | |
| 2024/0063470 | A1 | 2/2024 | Linsmeier et al. | |
| 2024/0101098 | A1 | 3/2024 | Salter et al. | |
| 2024/0149657 | A1 | 5/2024 | Coupal-Sikes et al. | |
| 2024/0149965 | A1 | 5/2024 | Archer et al. | |
| 2024/0153674 | A1 | 5/2024 | Archer et al. | |
| 2024/0243387 | A1 | 7/2024 | Naruke | |
| 2025/0087807 | A1 | 3/2025 | Burgess et al. | |
| 2025/0269972 | A1 | 8/2025 | Peck | |
| 2025/0329845 | A1 | 10/2025 | Bloder | |

FOREIGN PATENT DOCUMENTS

| | | | |
|---|---|---|---|
| CN | 202965960 | U | 6/2013 |
| CN | 119369961 | A | 1/2025 |
| DE | 10 2005 047 940 | A1 | 7/2007 |
| DE | 10 2014 201 355 | A1 | 7/2015 |
| DE | 10 2016 204 936 | A1 | 9/2017 |
| DE | 10 2017 214 229 | A1 | 2/2018 |
| DE | 10 2018 002 650 | A1 | 10/2019 |
| DE | 10 2018 129 759 | A1 | 5/2020 |
| DE | 10 2021 100 131 | A1 | 7/2021 |
| DE | 10 2021 118 072 | A1 | 2/2022 |
| EP | 1 995 482 | A1 | 11/2008 |
| EP | 3678074 | A1 * | 7/2020 |
| ES | 2897461 | T3 | 3/2022 |
| FR | 2932556 | A1 | 12/2009 |
| FR | 3082298 | A1 | 12/2019 |
| JP | H11-266507 | A | 9/1999 |
| JP | 2000-224710 | A | 8/2000 |
| JP | 2007-022309 | A | 2/2007 |
| JP | 2012-065521 | A | 3/2012 |
| JP | 2012-232714 | A | 11/2012 |
| JP | 2015-071413 | A | 4/2015 |
| JP | 2020-055417 | A | 4/2020 |
| KR | 20090062320 | A | 6/2009 |
| WO | WO-2005/071819 | A1 | 4/2004 |
| WO | WO-2012/139224 | A1 | 10/2012 |
| WO | WO-2019/116589 | A1 | 6/2019 |
| WO | WO-2020/097885 | A1 | 5/2020 |
| WO | WO-2022/132807 | A1 | 6/2022 |

OTHER PUBLICATIONS

Goudar, Zero Radius Turning Vehicle:, International Journal of Engineering and Management Research, vol. 6, Issue-4, Jul.-Aug. 2016.

Yamauchi, “Slip-compensated odometry for tracked vehicle on loose and weak slope”, Robomech Journal, 2017.

* cited by examiner

SYSTEMS AND METHODS FOR MISSION PLANNING OF A MILITARY VEHICLE

CROSS-REFERENCE TO RELATED PATENT APPLICATIONS

This application claims the benefit of and priority to (a) U.S. Provisional Patent Application No. 63/233,008, filed Aug. 13, 2021, and (b) U.S. Provisional Patent Application No. 63/344,128, filed May 20, 2022, both of which are incorporated herein by reference in their entireties.

BACKGROUND

Traditionally, military vehicles have been powered by internal combustion engines. However, such internal combustion engines and related systems can produce a significant amount of noise. Under certain circumstances, such as when in enemy territory and trying to remain discreet and unidentified, it may be advantageous to drive military vehicles and their associated subsystems with the engine off to mitigate the amount of noise being produced by the military vehicles, something that current military vehicles cannot provide.

SUMMARY

One embodiment relates to a system for mission planning of a military vehicle. The system includes a military vehicle configured to operate according to multiple modes. The military vehicle includes a controller. The system also includes processing circuitry configured to obtain a starting location and a destination for the military vehicle, and obtain data associated with a geographic area. The processing circuitry is also configured to determine a mission plan based on the data associated with the geographic area, the starting location and the destination. The mission plan includes a route between the starting location and the destination, and a selection of one of the plurality of modes that the military vehicle should be operated according to, along different portions of the route. The processing circuitry is also configured to provide the mission plan to the military vehicle. The controller of the military vehicle may be configured to use the mission plan to autonomously operate the military vehicle to transport along the route or prompt an operator of the military vehicle to operate the military vehicle to transport along the route. The controller is further configured to automatically transition the military vehicle between the modes based on the selection of the one of the modes that the military vehicle should be operated according to along the different portions of the route. The military vehicle is either a hybrid military vehicle having both electrical drive components and an internal combustion engine, or is a fully electric military vehicle having electrical drive components for transportation of the military vehicle.

In some embodiments, the mission plan is determined using artificial intelligence and training data obtained from a plurality of military vehicles in the geographic area. In some embodiments, the mission plan is determined using a rules-based technique.

In some embodiments, the processing circuitry is further configured to obtain one or more objectives for the mission plan and determine the mission plan based on the data associated with the geographic area. In some embodiments, the mission plan includes the route between the starting location and the destination, and the selection of one of the modes that the military vehicle should be operated according to, along different portions of the route to achieve the one or more objectives for the mission plan.

In some embodiments, the one or more objectives include at least one of a desired state of charge that batteries of the military vehicle should be at when the military vehicle approaches the destination, a desired state of charge that batteries of the military vehicle should be at when the military vehicle enters a high alert level area, a minimization of energy consumed by the military vehicle for the military vehicle to transport from the starting location to the destination, a minimization of an amount of time for the military vehicle to transport from the starting location to the destination, a minimization of an amount of distance that the military vehicle travels through high alert level areas, or a minimization of detectability of the military vehicle. In some embodiments, the desired state of charge that the batteries of the military vehicle should be at when the military vehicle approaches the destination is a maximum state of charge.

In some embodiments, the mission plan further includes one or more notifications. In some embodiments, each of the one or more notifications is assigned to a geographic location along the route and is presented to the operator of the military vehicle when the military vehicle approaches the geographic location along the route.

In some embodiments, the one or more notifications are generated by the processing circuitry based on one or more entries or reports provided by another military vehicle that is in the geographic area. In some embodiments, the modes include an engine mode, an electric vehicle or silent mode, an ultrasilent mode, and a dual-drive mode.

Another embodiment of the present disclosure is a method for mission planning of a military vehicle. The method includes obtaining a starting location and a destination of the military vehicle configured to operate according to multiple modes. The method also includes obtaining data associated with a geographic area proximate at least one of the starting location and the destination of the military vehicle. The method also include determining a mission plan based on the data associated with the geographic area, the starting location, and the destination. The mission plan includes a route between the starting location and the destination, and a selection of one of the modes that the military vehicle should be operated according to, along different portions of the route. The method also includes autonomously operating the military vehicle to transport along the route or prompting an operator of the military vehicle to operate the military vehicle to transport along the route. The method also includes automatically transitioning the military vehicle between the modes based on the selection of the one of the modes that the military should be operated according to along the different portions of the route.

In some embodiments, the mission plan is determined using artificial intelligence and training data obtained from a plurality of military vehicles in the geographic area. In some embodiments, the method includes obtaining one or more objectives for the mission plan. In some embodiments, the method includes determining the mission plan based on the data associated with the geographic area. In some embodiments, the mission plan includes the route between the starting location and the destination, and the selection of one of the modes that the military vehicle should be operated according to, along different portions of the route to achieve the one or more objectives for the mission plan.

In some embodiments, the one or more objectives include at least one of a desired state of charge that batteries of the military vehicle should be at when the military vehicle approaches the destination, a desired state of charge that batteries of the military vehicle should be at when the military vehicle enters a high alert level area, a minimization of energy consumed by the military vehicle for the military vehicle to transport from the starting location to the destination, a minimization of an amount of time for the military vehicle to transport from the starting location to the destination, a minimization of an amount of distance that the military vehicle travels through high alert level areas, or a minimization of detectability of the military vehicle.

In some embodiments, the one or more objectives include at least a desired state of charge that the batteries of the military vehicle should be at when the military vehicle approaches the destination, the desired state of charge being a maximum state of charge. In some embodiments, the mission plan further includes one or more notifications. In some embodiments, each of the one or more notifications is assigned to a geographic location along the route and is presented to the operator of the military vehicle when the military vehicle approaches the geographic location along the route.

In some embodiments, the one or more notifications are generated by the processing circuitry based on one or more entries or reports provided by another military vehicle that is in the geographic area. In some embodiments, the modes include an engine mode, an electric vehicle or silent mode, an ultrasilent mode, and a dual-drive mode.

In some embodiments, in the engine mode, only an internal combustion engine operates to transport the military vehicle. In some embodiments, in the electric vehicle or silent mode, only an electric motor operates to transport the military vehicle. In some embodiments, in the ultrasilent mode, only the electric motor operates to transport the military vehicle and one or more other features are disabled to reduce sound output of the military vehicle. In some embodiments, in the dual-drive mode, both the engine and the electric motor operate to transport the military vehicle.

Another embodiment relates to a method for mission planning of a military vehicle. The method includes obtaining a starting location for the military vehicle, a destination for the military vehicle, and a desired objective. The method also includes determining a mission plan that achieves the desired objective based on data associated with a geographic area of at least one of the starting location or the destination, the starting location, and the destination. The mission plan includes a route between the starting location and the destination, and controls for the military vehicle along different portions of the route. The method also includes autonomously operating the military vehicle to transport along the route or prompting an operator of the military vehicle to operate the military vehicle to transport along the route. The method also includes adjusting operation of the military vehicle according to the controls of the mission plan along the different portions of the route. The desired objective is a desired state of charge of batteries of the military vehicle by a specific location along the route or by the destination.

In some embodiments, the method further includes obtaining information regarding enemy forces along the route, and determining the mission plan based on the information regarding enemy forces along the route.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
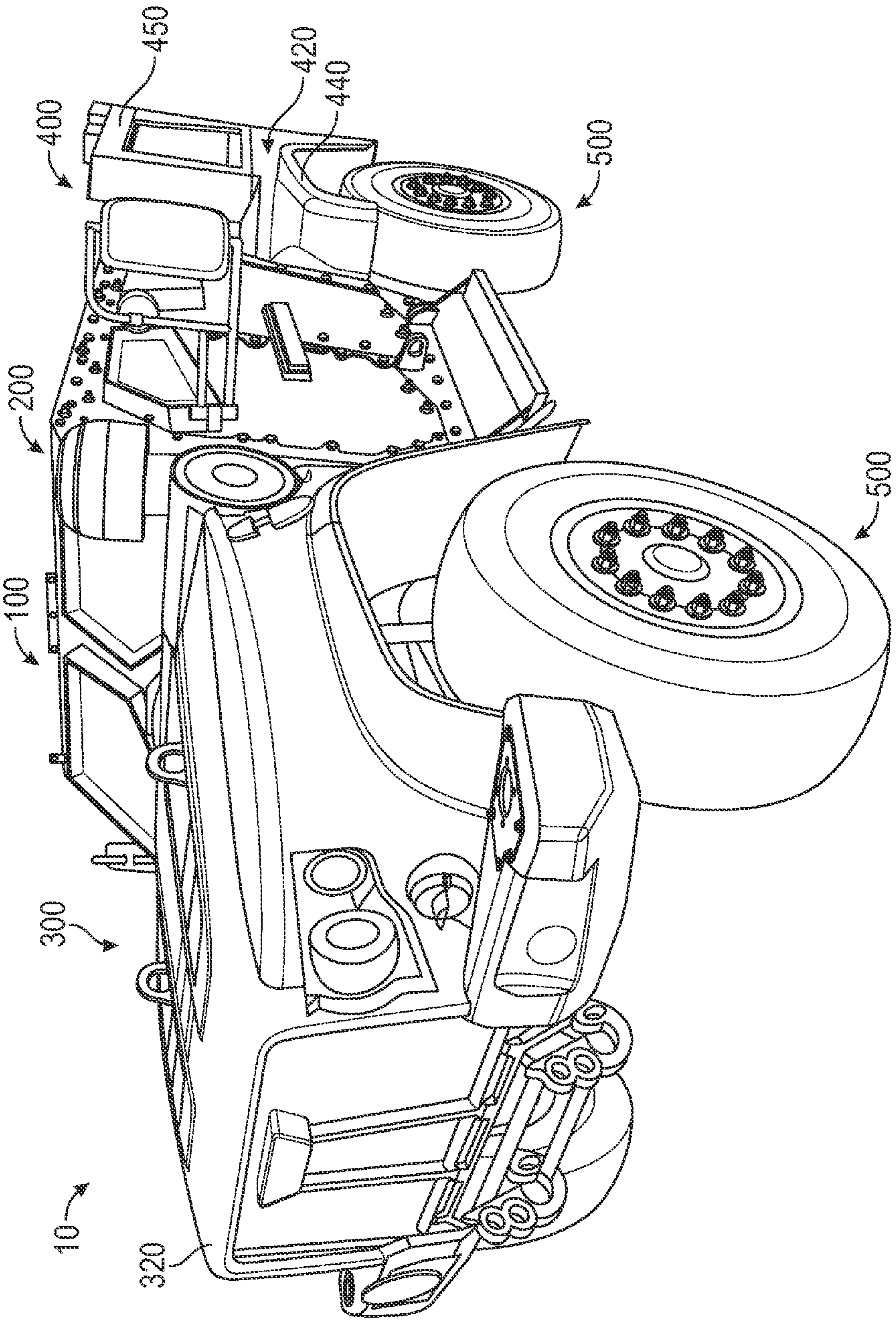
FIG. 1 is a front perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure (e.g., a military vehicle, etc.) includes an electrified driveline. Specifically, the vehicle includes (i) a first driver including an internal combustion engine and (ii) a second driver including a motor/generator and a clutch. The clutch is positioned between the engine and the motor/generator. The engine can drive the driveline independently, the motor/generator can drive the driveline independently, and/or both the engine and the motor/generator can drive the driveline together. Such an electrified driveline arrangement facilitates operating the vehicle in variety of ways that current military vehicles are incapable of.

According to an exemplary embodiment, the vehicle of the present disclosure includes an engine and a FEAD. The FEAD can include a first belt and a second belt that are coupled with each other through a sprag clutch. The first belt is coupled with multiple accessories, which may include, but is not limited to, a fan, an air compressor, and an electric motor/generator. The second belt is coupled with an output of the engine and the sprag clutch. The sprag clutch is coupled with an additional accessory (e.g., a hydraulic pump). The FEAD is operable between an engine-driven mode and an electric-driven mode (e.g., an electrified mode). When the FEAD is operated in the engine-driven mode, the engine drives the second belt and the first belt (e.g., through the sprag clutch) and the accessories that are coupled with the sprag clutch and the first belt. When the FEAD is operated in the engine-driven mode, the electric motor/generator may be driven to generate electrical energy that can be stored in a battery or consumed by electric accessories of the vehicle. When the FEAD is operated in the electric-driven mode, the electric motor/generator drives the first belt and the accessories coupled with the first belt, and the additional accessory (e.g., the hydraulic pump) coupled with the sprag clutch. In the electric-driven mode, the electric motor/generator consumes electrical energy from the battery, and operates independently of operation of the engine.

In alternative embodiments, the FEAD does not include the electric motor/generator. In one such embodiment, the FEAD may instead be driven solely by the engine and the FEAD only operates according to an engine-driven mode. In another such embodiment, a PTO is positioned at an output of an IMG or a transmission of a driveline of the vehicle, and the PTO can be engaged while the IMG or the transmission drives the PTO. The PTO may transfer torque to the FEAD belt in place of the electric motor/generator to thereby drive the FEAD using an electrically-driven source. In still another such embodiment, one or more accessories, or all of the accessories, of the FEAD include a corresponding electric motor so that each of the accessories of the FEAD having the corresponding electric motor can be independently operated relative to operation of the engine (if included), and relative to operation of each other.

According to an exemplary embodiment, the vehicle of the present disclosure includes an ESS with a large battery capable of providing electric vehicle propulsion. The ESS can be stored behind a cab within a bed cavity, behind a cab outside the bed cavity, above the rear wheel wells, between a floor and a belly deflector, above a floor within the cab, and/or below a false floor above the floor.

According to an exemplary embodiment, the vehicle of the present disclosure includes a control system. The control system includes a controller configured to operate the vehicle according to different modes. The modes include an engine mode, a dual-drive mode, an EV/silent mode, and/or an ultrasilent mode. In the engine mode, an engine of the vehicle drives the FEAD and tractive elements of the vehicle for transportation. In the dual-drive mode, both the engine and an IMG of the vehicle drive the tractive elements of the vehicle for transportation. In the EV/silent mode, the IMG drives the tractive elements of the vehicle for transportation with the engine shut off and an electric motor of the FEAD drives the FEAD. In the ultrasilent mode, the IMG drives the tractive elements of the vehicle for transportation with the engine shut off, the electric motor drives the FEAD, and a fan of the FEAD is disengaged to further reduce sound output of the vehicle during operation.

According to an exemplary embodiment, the vehicle of the present disclosure includes a driveline assembly that can be configured to operate in an (i) engine-only travel mode, (ii) an electric-motor-only travel mode, and/or (iii) a hybrid or dual-drive travel mode where each of the engine and an electric motor can be used to drive the vehicle. The vehicle includes an onboard energy storage system (e.g., a battery) that is configured to supply the electric drive motor with power to drive the vehicle for an extended period of time (e.g., 30 minutes) within the electric-motor-only mode or a "silent mode" or a "stealth mode." The driveline assembly is arranged so that the electric drive motor of the vehicle can be selectively clutched into one or more of a transaxle drive shaft, a transmission shaft, or a transaxle to supply torque to each of a front axle assembly and a rear axle assembly to drive the vehicle. During the silent or stealth mode, the engine can be decoupled from the transmission or the transaxle drive shaft, which allows the vehicle to drive entirely independent of the engine for a period of time. This type of operation can permit the vehicle to perform tasks discretely, which provides a significant advantage to military vehicles that may wish to travel undetected through enemy territory, for example.

Overall Vehicle

Figure 2:
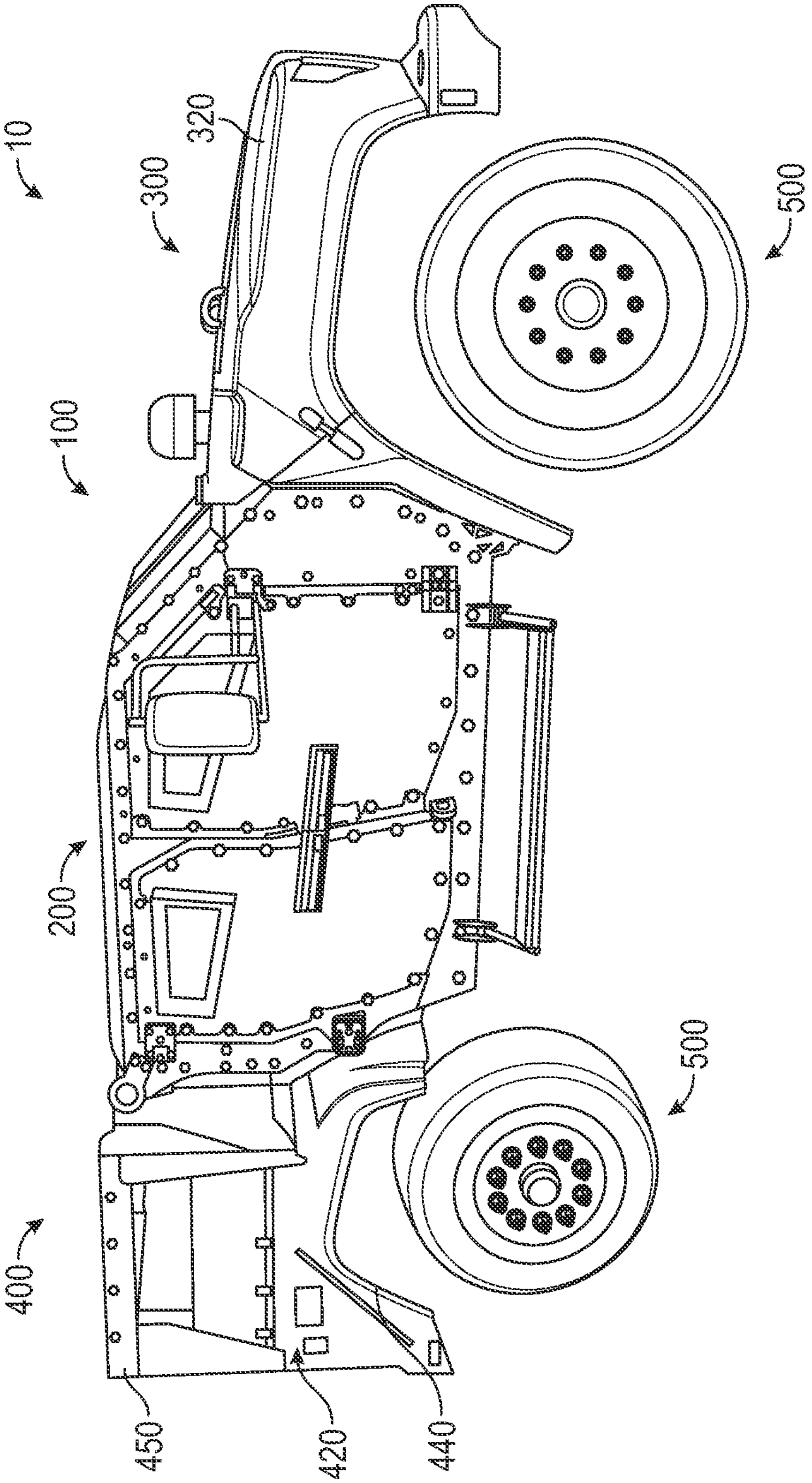
FIG. 2 is a side view of the vehicle of FIG. 1, according to an exemplary embodiment.
Figure 3:
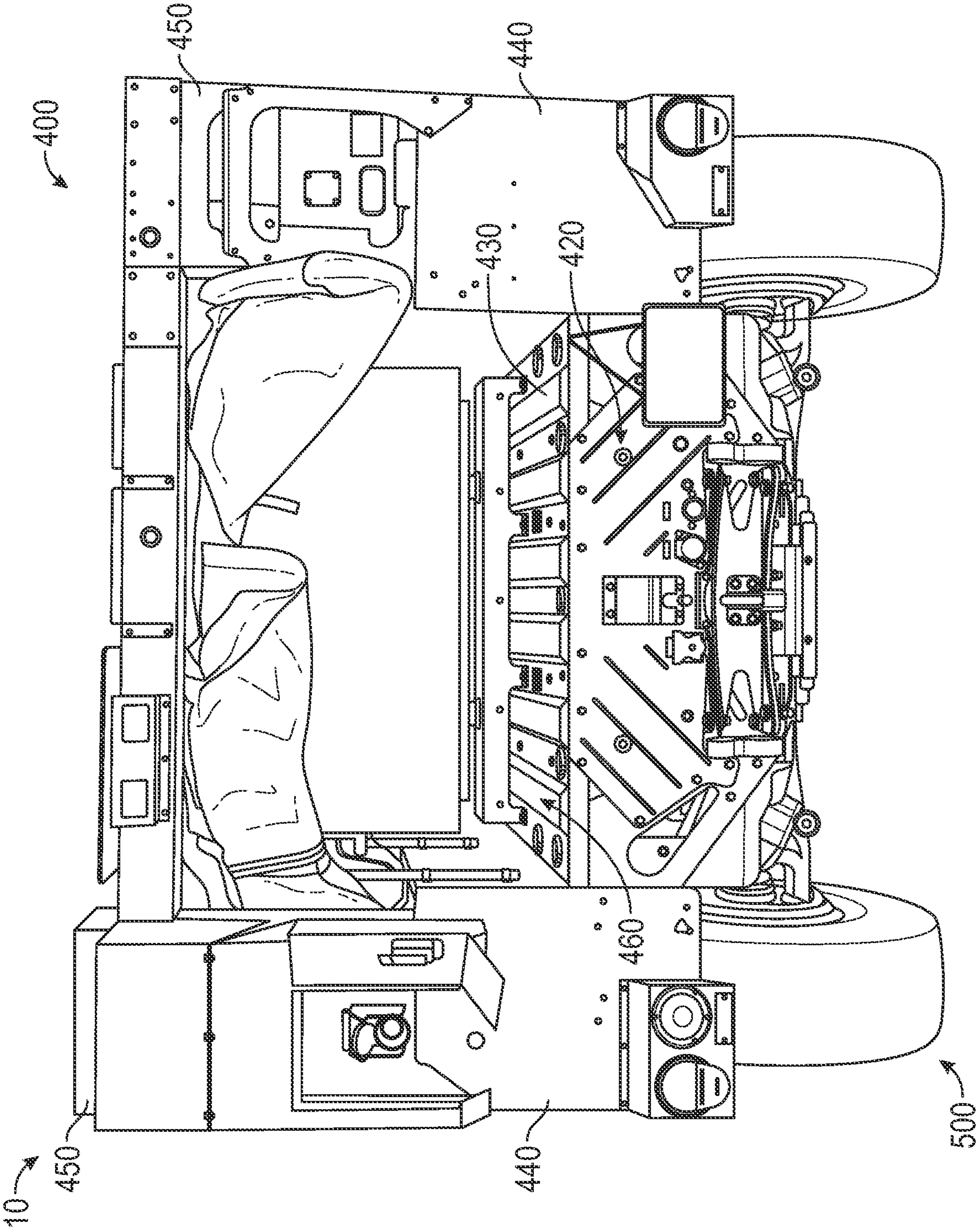
FIG. 3 is a rear view of the vehicle of FIG. 1, according to an exemplary embodiment.

According to the exemplary embodiment shown in FIGS. 1-3, a machine, shown vehicle 10, is configured as a military vehicle. In the embodiment shown, the military vehicle is a joint light tactical vehicle ("JLTV"). In other embodiments, the military vehicle is another type of military vehicle (e.g., a medium tactical vehicle, a heavy tactical vehicle, etc.). In an alternative embodiment, the vehicle 10 is another type of vehicle other than a military vehicle. For example, the vehicle 10 may be a fire apparatus (e.g., a pumper fire truck, a rear-mount aerial ladder truck, a mid-mount aerial ladder truck, a quint fire truck, a tiller fire truck, an airport rescue fire fighting ("ARFF") truck, etc.), a refuse truck, a concrete mixer truck, a tow truck, an ambulance, a farming machine or vehicle, a construction machine or vehicle, and/or still another vehicle.

As shown in FIGS. 1-14, the vehicle 10 includes a chassis assembly, shown as hull and frame assembly 100, including a passenger cabin, shown as passenger capsule 200, a first module, shown as front module 300, a second module, shown as rear module 400; a plurality of axle assemblies (e.g., including axles, differentials, wheels, brakes, suspension components, etc.), shown as axle assemblies 500, coupled to the front module 300 and the rear module 400; and a first electrified driveline arrangement (e.g., a powertrain, a drivetrain, including an accessory drive, etc.), shown as driveline 600.

According to an exemplary embodiment, the passenger capsule 200 provides a robust and consistent level of protection by using overlaps to provide further protection at the door interfaces, component integration seams, and panel joints. The passenger capsule 200 may be manufactured from high hardness steel, commercially available aluminum alloys, ceramic-based SMART armor, and/or other suitable materials to provide a 360-degree modular protection system with two levels of underbody mine/improvised explosive device ("IED") protection. The modular protection system provides protection against kinetic energy projectiles and fragmentation produced by IEDs and overhead artillery fire. The two levels of underbody protection may be made of an aluminum alloy configured to provide an optimum combination of yield strength and material elongation. Each protection level uses an optimized thickness of this aluminum alloy to defeat underbody mine and IED threats.

According to an exemplary embodiment, the passenger capsule 200 is a structural shell that forms a monocoque hull structure. Monocoque refers to a form of vehicle construction in which the vehicle body and chassis form a single unit. In some embodiments, the passenger capsule 200 includes a plurality of integrated armor mounting points configured to engage a supplemental armor kit (e.g., a "B-Kit," etc.). According to the exemplary embodiment shown in FIGS. 1, 2, 4, 5, 9, and 10, the passenger capsule 200 accommodates four passengers in a two-by-two seating arrangement and has four doors mounted thereto. According to the alternative embodiment shown in FIG. 8, the passenger capsule 200 accommodates two passengers and has two doors mounted thereto.

Figure 4:
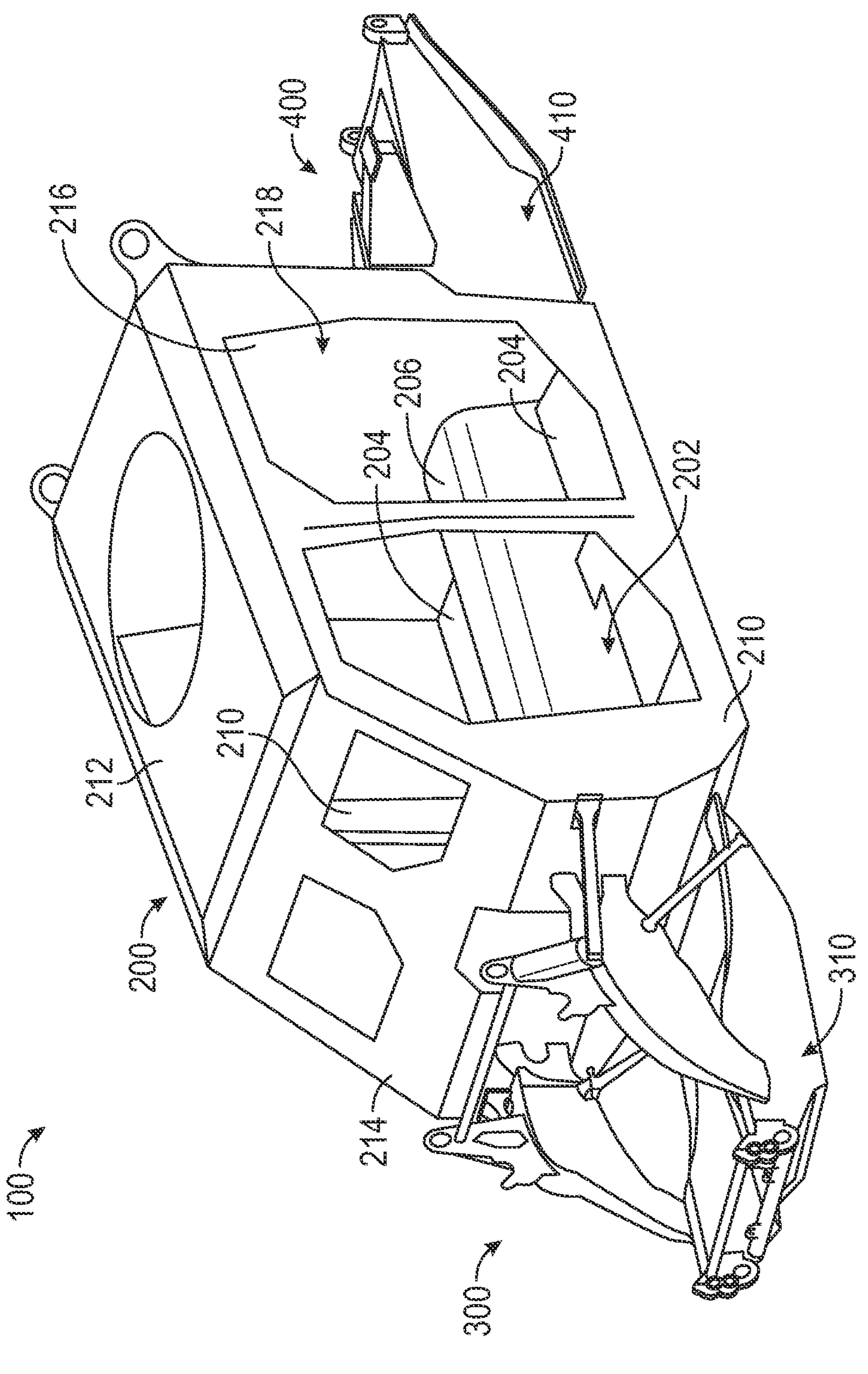
FIG. 4 is a perspective view of a chassis assembly of the vehicle of FIG. 1 including a passenger capsule, a front module, and a rear module, according to an exemplary embodiment.
Figure 5:
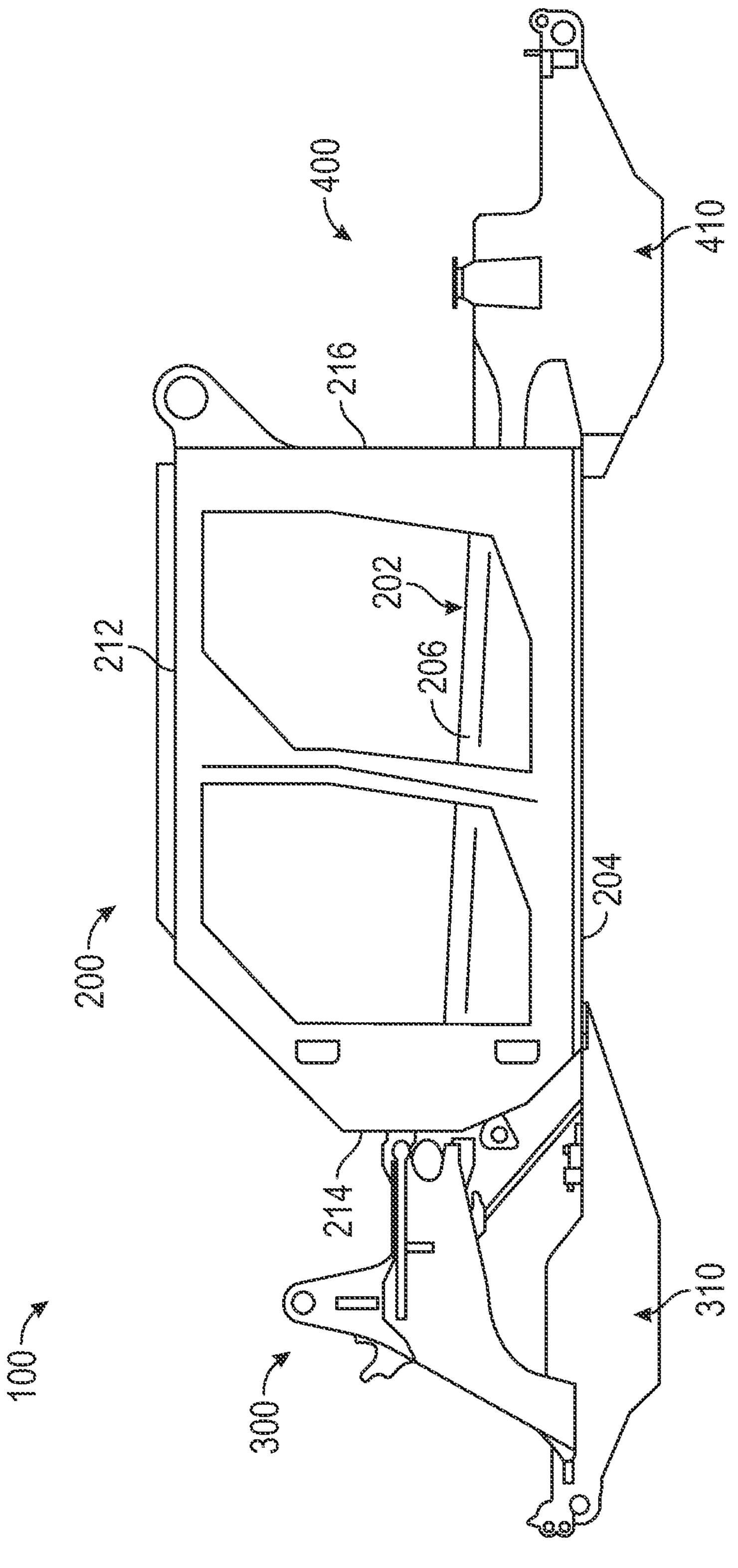
FIG. 5 is a side view of the chassis assembly of FIG. 4, according to an exemplary embodiment.
Figure 6:
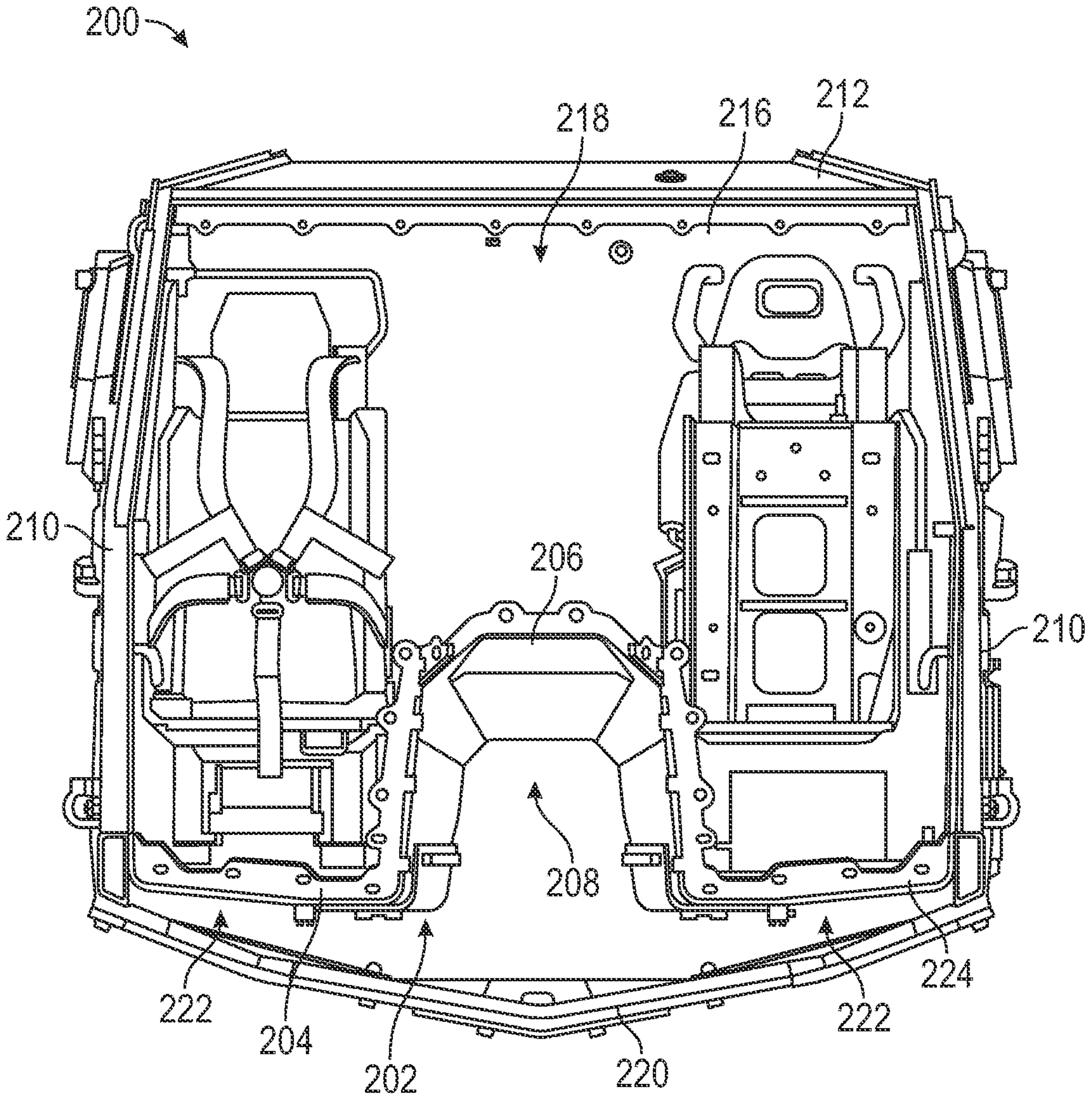
FIG. 6 is a cross-sectional view of the passenger capsule of FIG. 4, according to an exemplary embodiment.

As shown in FIGS. 4-6, the passenger capsule 200 includes a floor assembly, shown as floor assembly 202, having a pair of floor portions, shown as floor portions 204, laterally spaced apart and separated by a central tunnel, shown as structural tunnel 206, extending longitudinally along a centerline of the passenger capsule 200. According to an exemplary embodiment, for load purposes, the structural tunnel 206 replaces a frame or rail traditionally used in vehicle chassis. As shown in FIG. 6, the structural tunnel 206 (*i*) has an arcuately shaped cross-section that extends upward into an interior, shown as passenger compartment 218, of the passenger capsule 200 and (ii) defines a cavity or recessed space, shown as tunnel slot 208. The configuration of the structural tunnel 206 increases the distance between the ground and the passenger compartment 218 of the passenger capsule 200. Accordingly, the structural tunnel 206 may provide greater blast protection from IEDs located on the ground (e.g., because the IED has to travel a greater distance in order to penetrate the structural tunnel 206).

As shown in FIGS. 4-6, the passenger capsule 200 additionally includes a pair of side panels, shown as sidewalls 210, coupled to opposing lateral sides of the floor assembly 202; a top panel, shown as roof 212, coupled to the sidewalls 210 opposite the floor assembly 202; a front panel, shown as front wall 214, coupled to front ends of the floor assembly 202, the sidewalls 210, and the roof 212; and a rear panel, shown as rear wall 216, coupled to rear ends of the floor assembly 202, the sidewalls 210, and the roof 212. As shown in FIGS. 4 and 6, the floor assembly 202, the sidewalls 210, the roof 212, the front wall 214, and the rear wall 216 cooperatively define the passenger compartment 218.

As shown in FIG. 6, the passenger capsule 200 includes a belly deflector, shown as v-shaped belly deflector 220, coupled to bottom ends of the sidewalls 210 and across the bottom of the passenger capsule 200 beneath the floor assembly 202. According to an exemplary embodiment, the v-shaped belly deflector 220 is configured to mitigate and spread blast forces along the belly of the vehicle 10. As shown in FIG. 6, the v-shaped belly deflector 220 is spaced from the floor assembly 202 such that a space, shown as air gap 222, is formed between the floor portions 204 of the floor assembly 202 and the v-shaped belly deflector 220.

In some embodiments, the floor assembly 202, the sidewalls 210, the roof 212, the front wall 214, the rear wall 216, and the v-shaped belly deflector 220 are fabricated subassemblies that are bolted together to provide the passenger capsule 200. Such a modular approach to the passenger capsule 200 provides increased protection with the application of perimeter, roof, and underbody add on panels. The components of the passenger capsule 200 mitigate and attenuate blast effects, allow for upgrades, and facilitate maintenance and replacements.

As shown in FIGS. 4, 5, 7, 8, and 10, the front module 300 includes a first subframe assembly, shown as front subframe 310, and the rear module 400 includes a second subframe assembly, shown as rear subframe 410. The front subframe 310 includes a first plurality of frame members coupled to the floor assembly 202 and the front wall 214 of the passenger capsule 200 at a first plurality of interfaces. The rear subframe 410 includes a second plurality of frame members coupled to the floor assembly 202 and the rear wall 216 of the passenger capsule 200 at a second plurality of interfaces. Such interfaces may include, for example, a plurality of fasteners (e.g., bolts, rivets, etc.) extending through corresponding pads coupled to the front subframe 310, the rear subframe 410, and the passenger capsule 200. According to an exemplary embodiment, a front axle assembly of the axle assemblies 500 is coupled to the front subframe 310 and a rear axle assembly of the axle assemblies 500 is coupled to the rear subframe 410.

The front subframe 310 and the rear subframe 410 may be manufactured from high strength steels, high strength aluminum, or another suitable material. According to an exemplary embodiment, the front subframe 310 and the rear subframe 410 feature a tabbed, laser cut, bent, and welded design. In other embodiments, the front subframe 310 and the rear subframe 410 are manufactured from tubular members to form a space frame. The front subframe 310 and the rear subframe 410 may also include forged frame sections, rather than fabricated or cast frame sections, to mitigate the stress, strains, and impact loading imparted during operation of the vehicle 10. Aluminum castings may be used for various cross member components where the loading is compatible with such material properties.

The passenger capsule 200, the front subframe 310, and the rear subframe 410 are integrated into the hull and frame assembly 100 to efficiently carry chassis loading imparted during operation of the vehicle 10, during a lift event, during a blast event, or under still other conditions. During a blast event, conventional frame rails can capture the blast force, transferring the blast force into the vehicle 10 and the occupants thereof. The vehicle 10 replaces conventional frame rails and instead includes the passenger capsule 200, the front module 300, and the rear module 400. According to an exemplary embodiment, the passenger capsule 200, the front module 300, and the rear module 400 vent blast gases (e.g., traveling upward after a tire triggers an IED), thereby reducing the blast force on the passenger capsule 200 and the occupants within passenger capsule 200. Traditional frame rails may also directly impact (e.g., contact, engage, hit, etc.) the floor of traditional military vehicles. The hull and frame assembly 100 does not include traditional frame rails extending along a length of the vehicle 10, thereby eliminating the ability for such frame rails to impact the floor assembly 202 of the passenger capsule 200.

Figure 9:
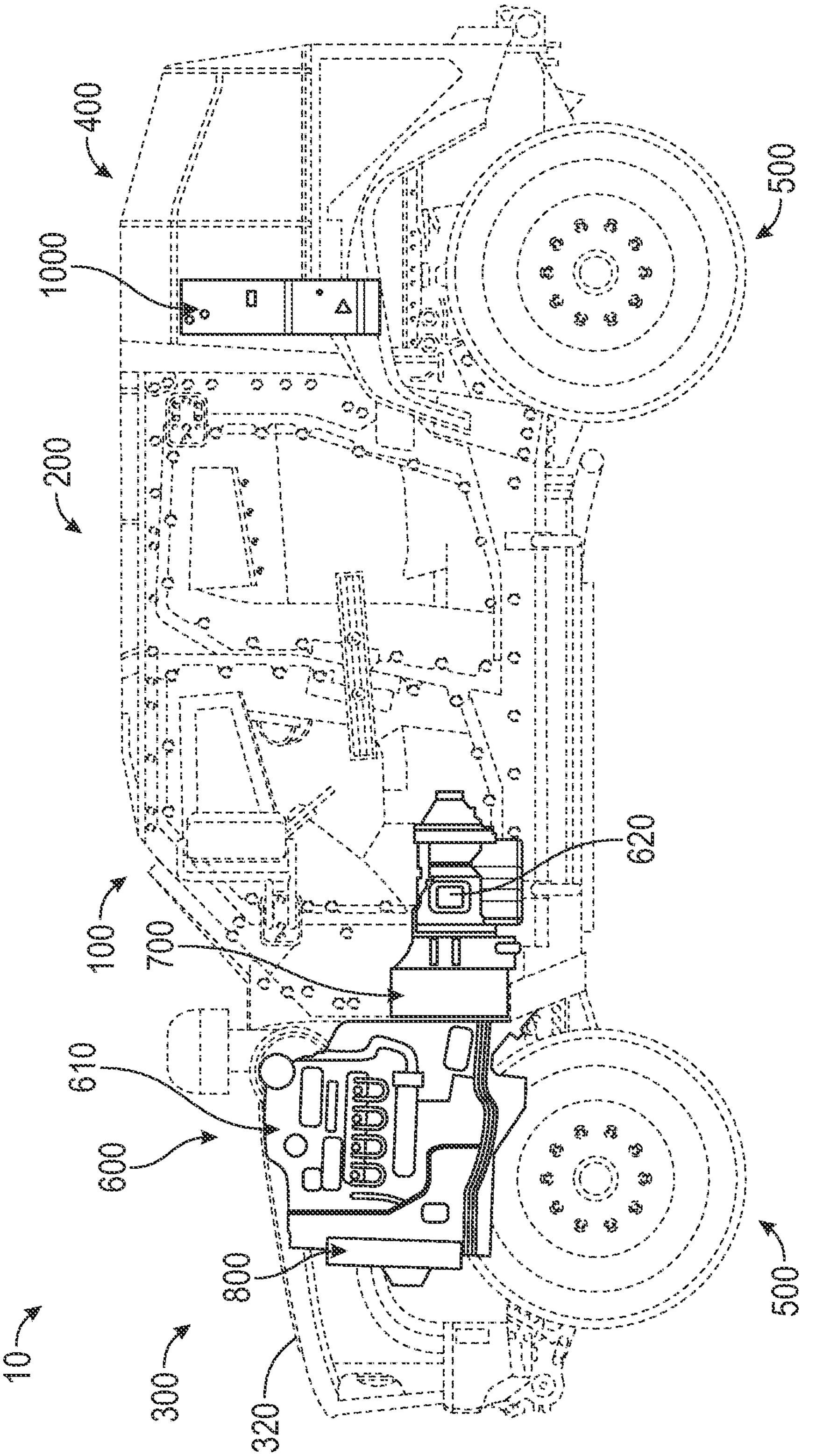
FIG. 9 is a partially transparent side view of the vehicle of FIG. 1 having a driveline including an engine, an integrated motor/generator ("IMG"), a transmission, an energy storage system ("ESS"), and a front-end accessory drive ("FEAD"), according to an exemplary embodiment.

As shown in FIGS. 1, 2, and 9, the front module 300 includes a body panel, shown as hood 320, supported by the front subframe 310. As shown in FIG. 9, the hood 320 partially surrounds components of the driveline 600 (e.g., an engine, a FEAD, radiators, etc.) of the vehicle 10. The hood 320 may be manufactured from a composite material (e.g., carbon fiber, fiberglass, a combination of fiberglass and carbon fiber, etc.) or a metal material (e.g., steel, aluminum, etc.). The hood 320 may be configured (e.g., shaped, etc.) to maximize vision while clearing under-hood components.

As shown in FIGS. 1-3, the rear module 400 includes a body assembly, shown as cargo body assembly 420, supported by the rear subframe 410. The cargo body assembly 420 includes a deck, shown as bed 430; a pair of wheel wells, shown as wheel wells 440, positioned along opposing lateral sides of the bed 430 and over the wheels of the rear axle assembly of the axle assemblies 500; and a pair of storage compartments, shown as stowage boxes 450, positioned along and on top of the wheel wells 440. As shown in FIG. 3, the bed 430, the wheel wells 440, and the stowage boxes 450 cooperatively define a compartment, shown as bed cavity 460.

Figure 7:
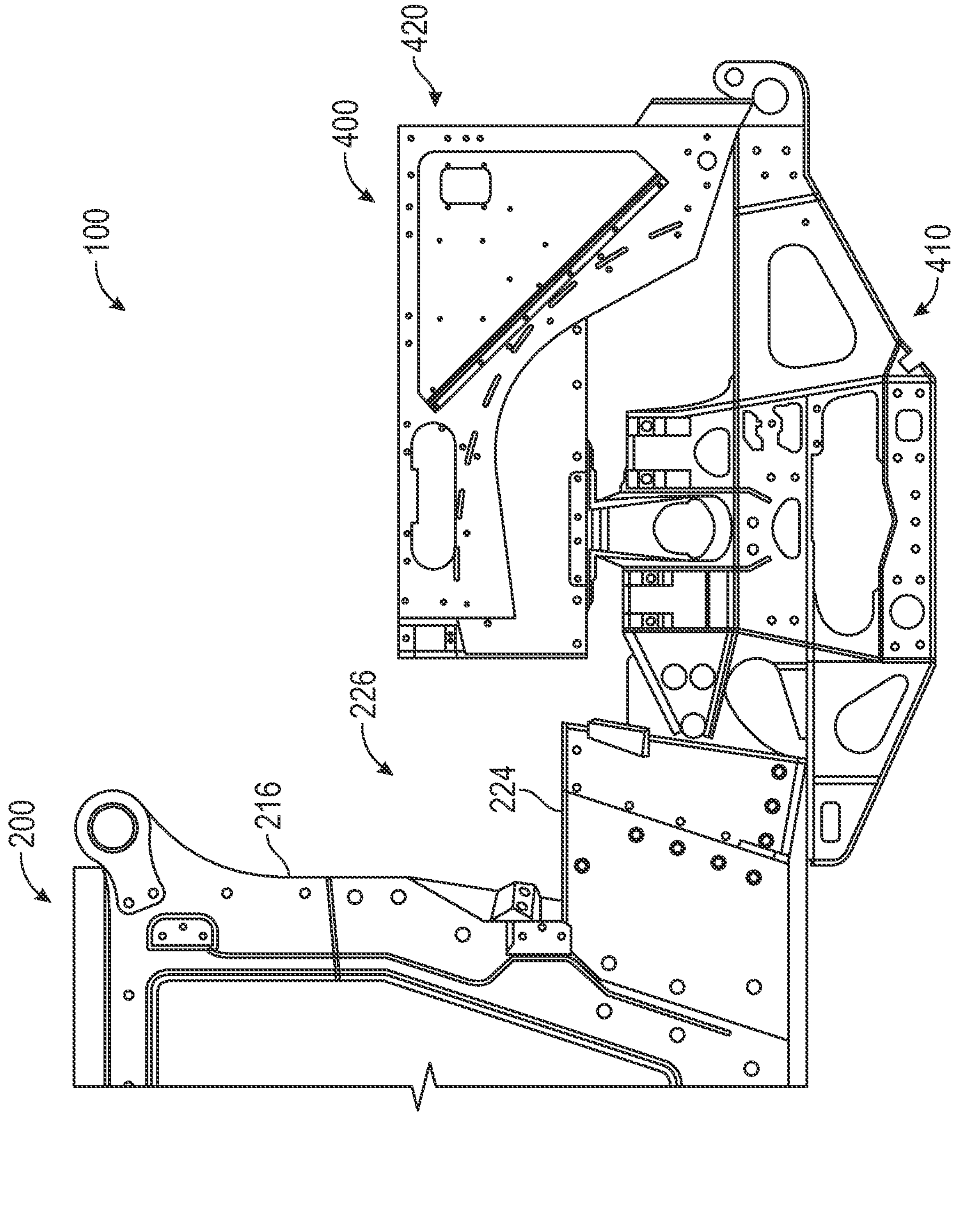
FIG. 7 is a detailed side view of a chassis assembly of the vehicle of FIG. 1, according to another exemplary embodiment.
Figure 8:
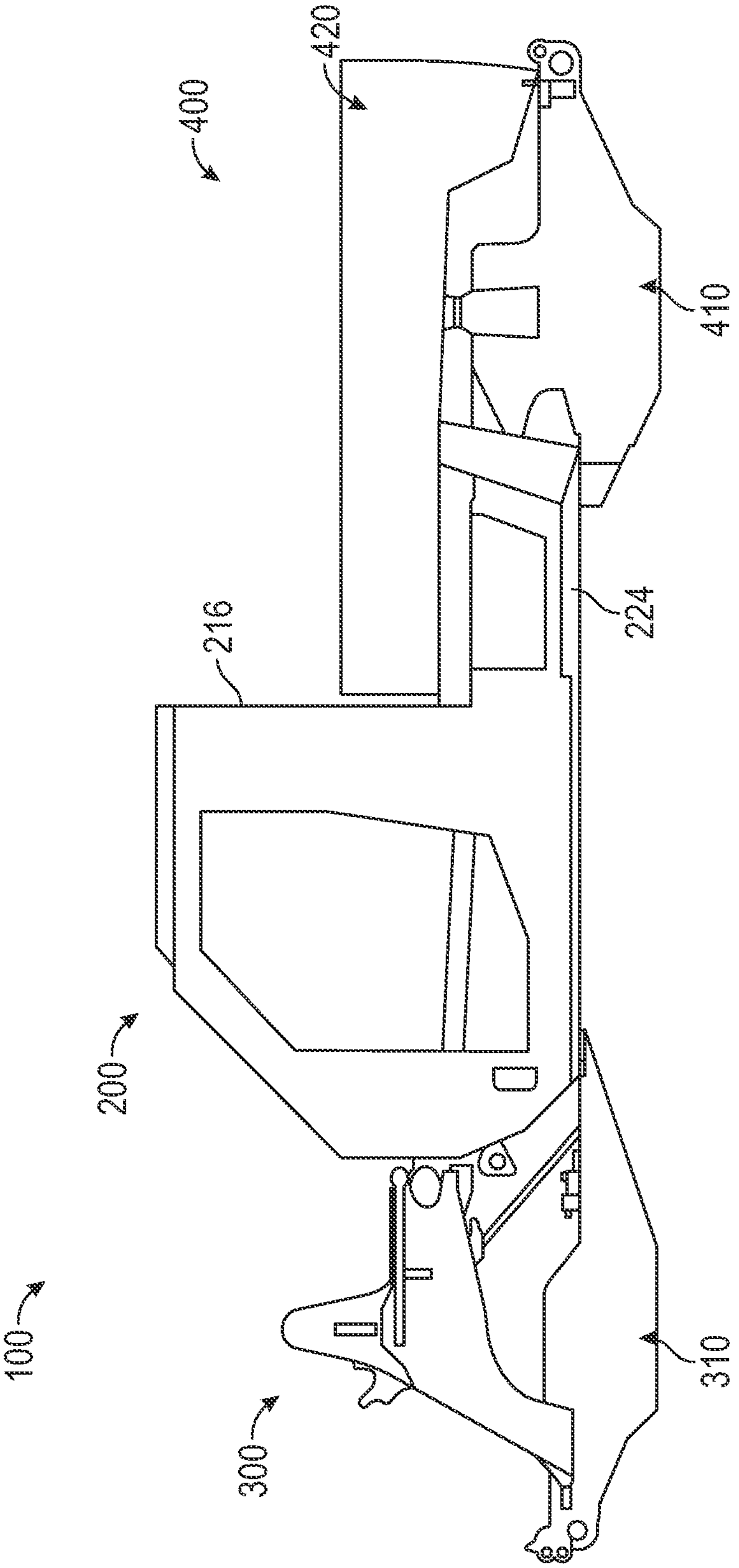
FIG. 8 is a side view of a chassis assembly of the vehicle of FIG. 1, according to another exemplary embodiment.

In some embodiment, as shown in FIG. 7, the passenger capsule 200 includes a protrusion, shown as capsule extension 224, extending from a bottom portion of the rear wall 216 of the passenger capsule 200. According to an exemplary embodiment, the capsule extension 224 provides an extended wheelbase for the vehicle 10, which facilitates providing a cavity, shown as gap 226, between the rear wall 216 and the cargo body assembly 420 of the rear module 400. In some embodiments, as shown in FIG. 8, the capsule extension 224 replaces a rear portion (e.g., back seats, etc.) of the passenger capsule 200 and supports an extended cargo body assembly 420 (e.g., eliminating the gap 226 of FIG. 7 or maintaining the gap 226 of FIG. 7).

Driveline

As shown in FIGS. 9-36, the driveline 600 includes a first driver, shown as engine 610; a transmission device, shown as transmission 620; a first drive shaft, shown transaxle drive shaft 630, coupled to the transmission 620; a power splitter, shown as transaxle 640, coupled to the transaxle drive shaft 630 and the rear axle assembly 500; a second drive shaft, shown as front axle drive shaft 650, extending between the transaxle 640 and the front axle assembly 500 (e.g., a front differential thereof); a second driver, shown as IMG 700, positioned between the engine 610 and the transmission 620; an accessory drive assembly, shown as FEAD 800, positioned in front of the engine 610; and an on-board ESS, shown as ESS 1000.

Figure 10:
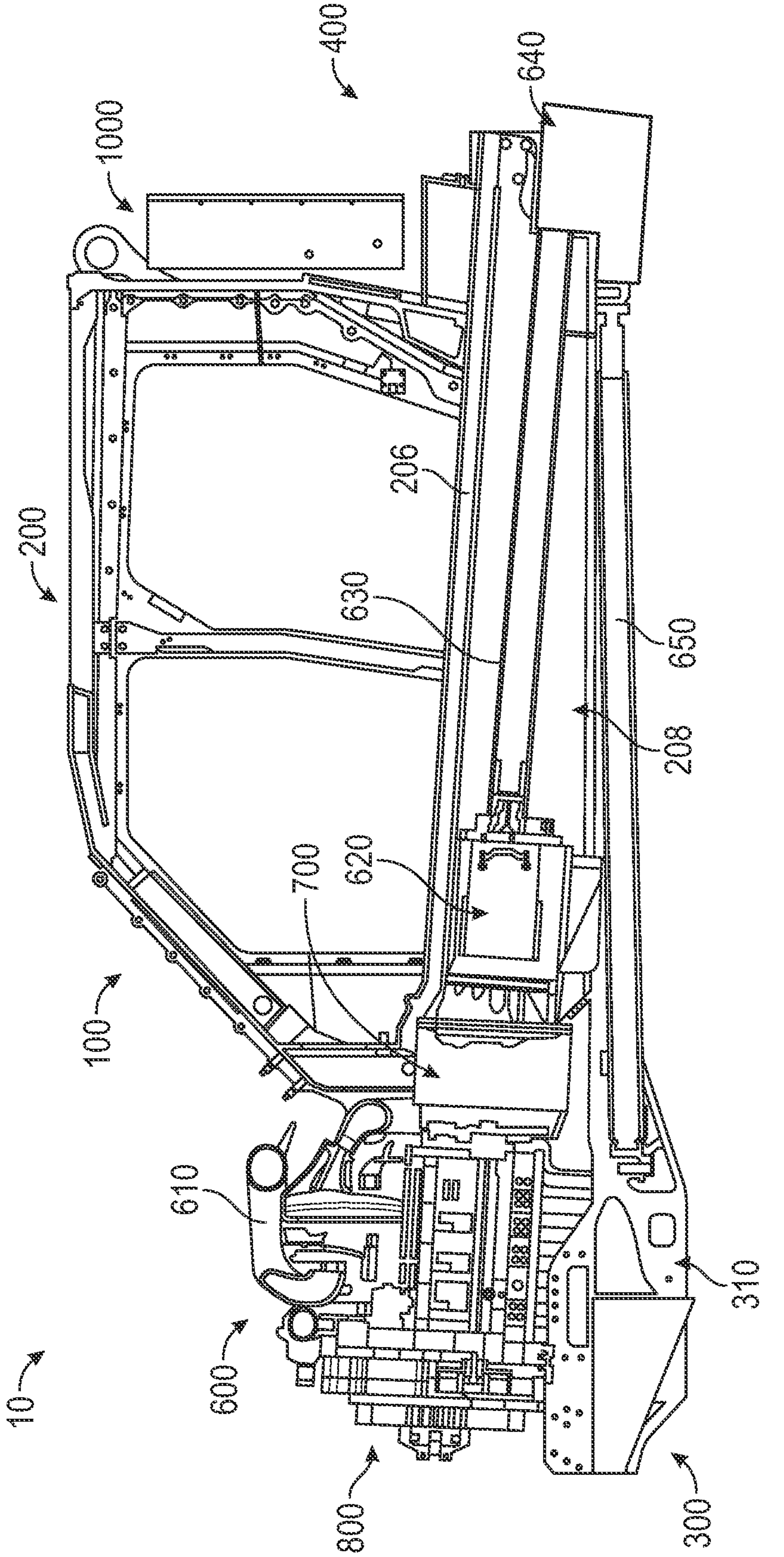
FIG. 10 is a cross-sectional side view of the driveline of FIG. 9 including the engine, the IMG, the transmission, the ESS, the FEAD, and a transaxle, according to an exemplary embodiment.
Figure 11:
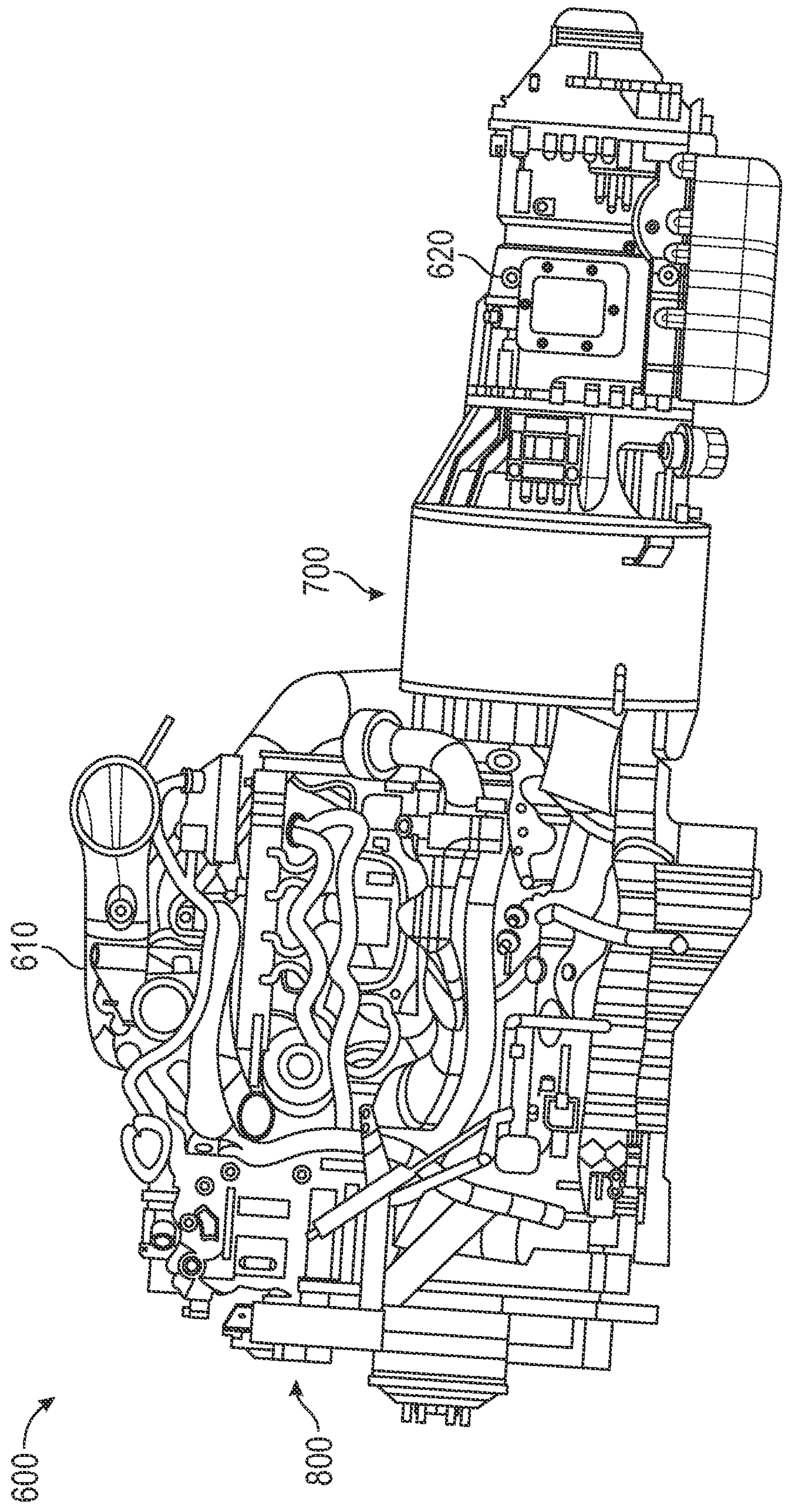
FIG. 11 is a detailed side view of the engine, the IMG, the transmission, and the FEAD of the driveline of FIG. 9, according to an exemplary embodiment.

As shown in FIGS. 9 and 10, the engine 610 and the FEAD 800 are positioned within the front module 300 and supported by the front subframe 310. The FEAD 800 may include an independent FEAD motor (e.g., motor/generator 822) and various belt driven-accessories and/or electrically-operated accessories (e.g., a fan, a hydraulic pump, an air compressor, an air conditioning ("A/C") compressor, etc.). As shown in FIG. 10, the IMG 700 and the transmission 620 are positioned beneath the passenger capsule 200 within the tunnel slot 208 of the structural tunnel 206. The transaxle drive shaft 630 extends from the transmission 620 longitudinally along the structural tunnel 206 and within tunnel slot 208 to the transaxle 640. According to an exemplary embodiment, the transaxle 640 is positioned within the rear module 400 and supported by the rear subframe 410. As shown in FIG. 10, the front axle drive shaft 650 is positioned beneath the transaxle drive shaft 630 and outside of the tunnel slot 208 (e.g., between the transaxle drive shaft 630 and the v-shaped belly deflector 220).

According to various embodiments, the engine 610 is individually, the IMG 700 is individually, or both the engine 610 and the IMG 700 are cooperatively configured to provide power to the transmission 620 to drive the transmission 620 and, thereby, drive the transaxle drive shaft 630, the transaxle 640, the rear axle assembly 500, the front axle drive shaft 650, and the front axle assembly 500 to drive the vehicle 10. According to various embodiments, the FEAD 800 is configured to be selectively driven by the engine 610, by the FEAD motor, by the IMG 700, and/or electrically-operated. According to an exemplary embodiment, the ESS 1000 is configured to power various high-voltage components and low-voltage components of the vehicle 10 (e.g., the IMG 700, the FEAD motor, electrified FEAD accessories, cab displays, cab gauges, cab lights, external lights, etc.). According to various embodiments, except for electrical wiring, the components of the ESS 1000 (e.g., battery packs, inverters, power distribution components, power conversion hardware, etc.) are variously positioned about the vehicle 10 (e.g., within the rear module 400, under the passenger capsule 200, etc.), except proximate the engine 610 or within the tunnel slot 208 of the structural tunnel 206. Such positioning facilitates maintaining the components of the ESS 1000 at proper operating temperatures and away from high temperature zones proximate the engine 610 and/or within the tunnel slot 208 of the structural tunnel 206. In some embodiments (e.g., when the FEAD 800 includes the FEAD motor, when the engine 610 drives the FEAD, etc.), the FEAD motor and the IMG 700 are configured to selectively operate as generators to facilitate charging the ESS 1000 using power provided by the engine 610 while the vehicle 10 is stationary or moving.

Engine, Transmission, and Transaxle

According to an exemplary embodiment, the engine 610 is a compression-ignition internal combustion engine that utilizes diesel fuel. In other embodiments, the engine 610 is a spark-ignition engine that utilizes one of a variety of fuel types (e.g., gasoline, compressed natural gas, propane, etc.). The transmission may be a commercially available transmission.

The transmission 620 may include a torque converter configured to improve efficiency and decrease heat loads. Lower transmission gear ratios combined with a low range of an integrated rear differential/transfer case provide optimal speed for slower speeds, while higher transmission gear ratios deliver convoy-speed fuel economy and speed on grade. According to an exemplary embodiment, the transmission 620 includes a driver selectable range selection.

The transaxle 640 is designed to reduce the weight of the vehicle 10. The weight of the transaxle 640 is minimized by integrating a transfercase and a rear differential into a single unit, selecting an optimized gear configuration, and/or utilizing high strength structural aluminum housings. By integrating the transfercase and the rear differential into the transaxle 640 (thereby forming a singular unit), the connecting drive shaft and end yokes traditionally utilized to connect the transfercase and the rear differential have been eliminated. An integral neutral and front axle disconnect allows the vehicle 10 to be flat towed or front/rear lift and towed with minimal preparation (i.e., without removing the transaxle drive shaft 630 or the front axle drive shaft 650). Specifically, the transaxle 640 includes an internal mechanical disconnect capability that allows the front axle assembly 500 and/or the rear axle assembly 500 to turn without rotating the transaxle 640 and the transmission 620. A mechanical air solenoid over-ride is easily accessible from the interior and/or exterior of the vehicle 10. Once actuated, no further vehicle preparation is needed. After the recovery operation is complete, the driveline 600 can be re-engaged by returning the air solenoid mechanical over-ride to the original position.

IMG

According to an exemplary embodiment, the IMG 700 is electrically coupled to the ESS 1000, selectively mechanically coupled to the engine 610, and mechanically coupled to the transmission 620. The IMG 700 is configured to be mechanically driven by the engine 610 to selectively generate electricity for storage in the ESS 1000 and/or to power electrical components of the vehicle 10. The IMG 700 is configured to receive electrical power from the ESS 1000 to facilitate driving the transmission 620 and, therefore, the axle assemblies 500 of the vehicle 10. In some embodiments, the IMG 700 is configured to receive electrical power from the ESS 1000 to function as a starter for the engine 610. Such starting capability can be performed while the vehicle 10 is stationary or while the vehicle 10 is moving. In some embodiments, the driveline 600 additionally or alternatively includes a backup or dedicated engine starter.

Figure 12:
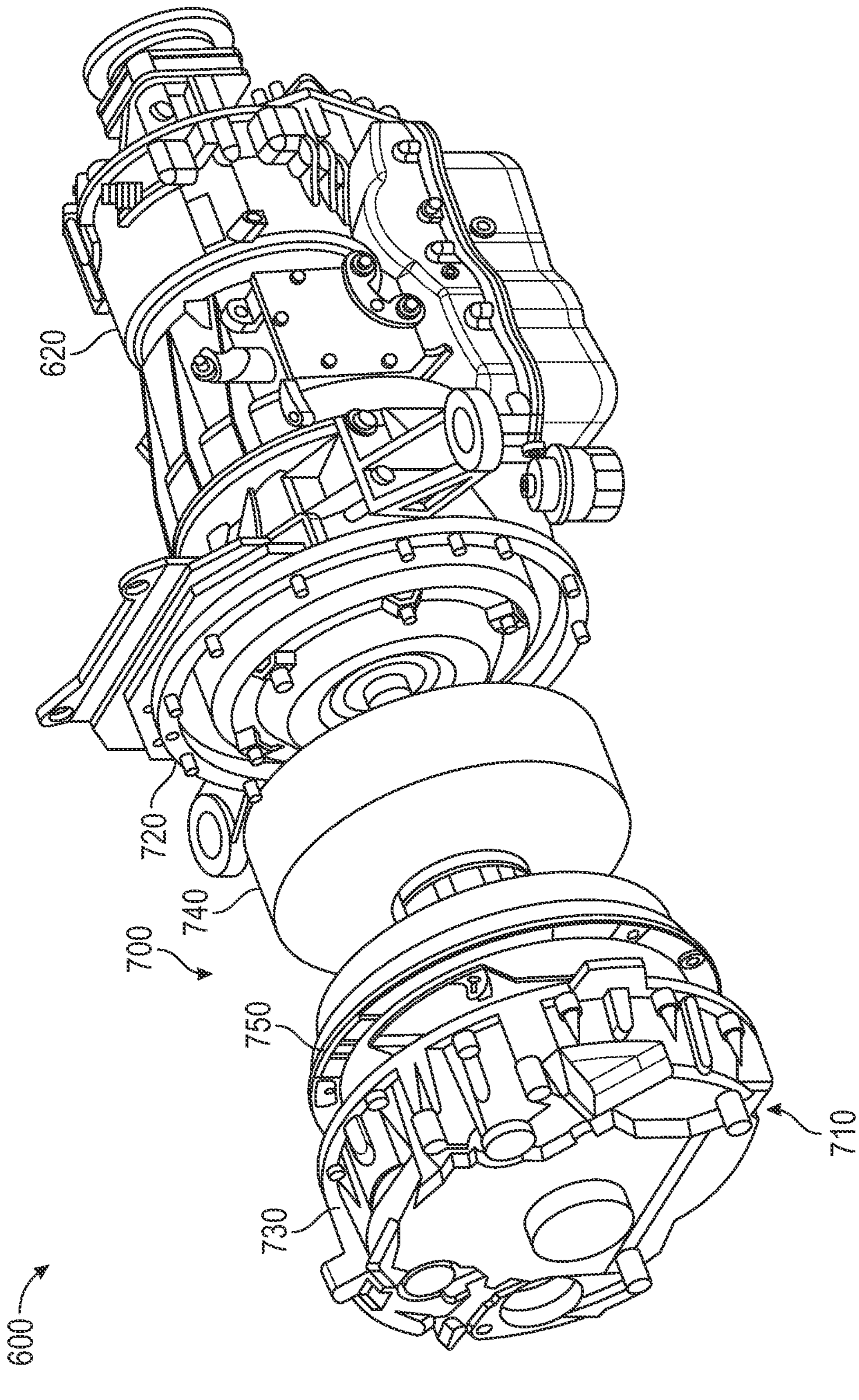
FIG. 12 is an exploded view the IMG and the transmission of the driveline of FIG. 9, according to an exemplary embodiment.
Figure 13:
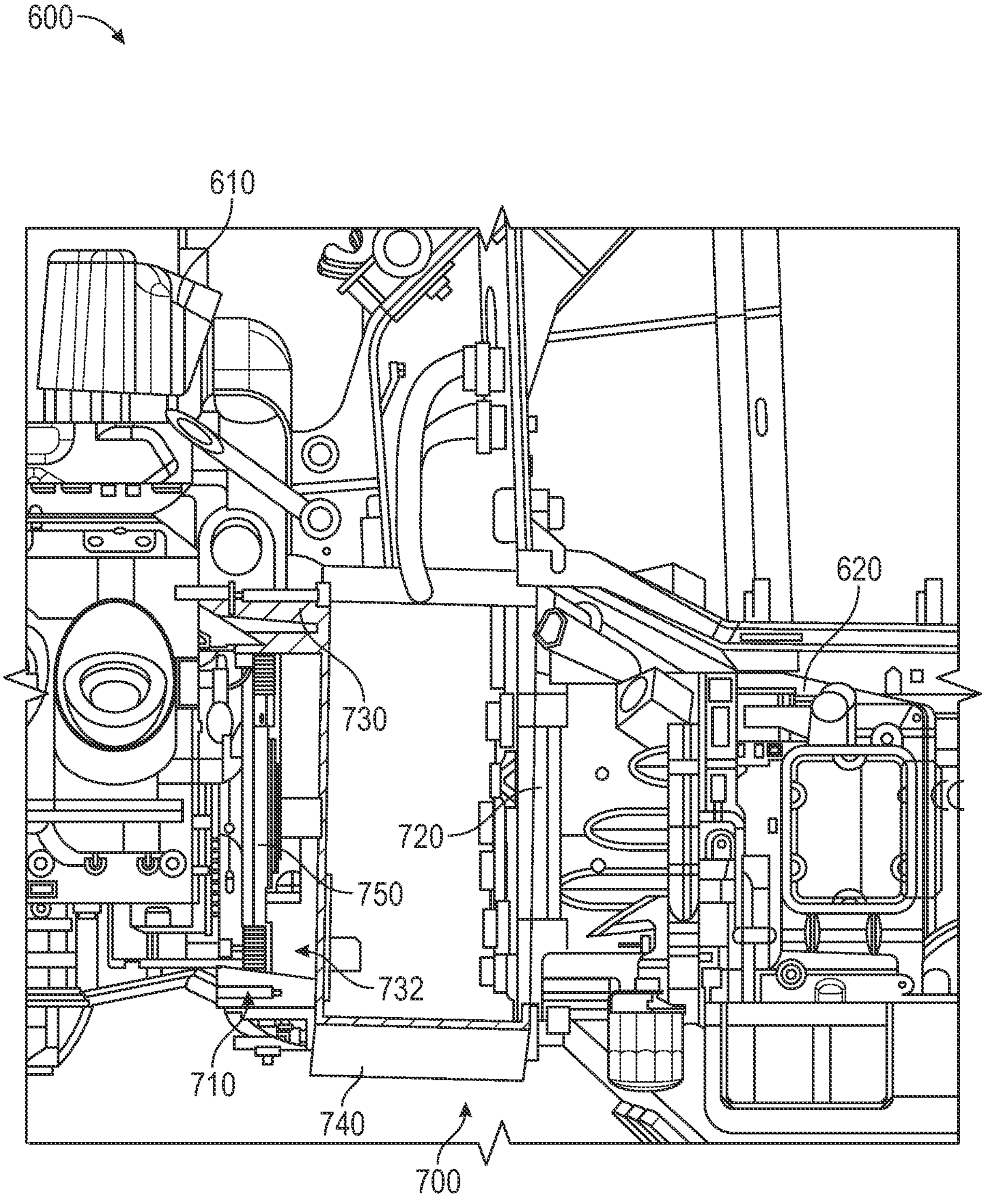
FIG. 13 is a detailed cross-sectional side view of the IMG of the driveline of FIG. 9, according to an exemplary embodiment.
Figure 14:
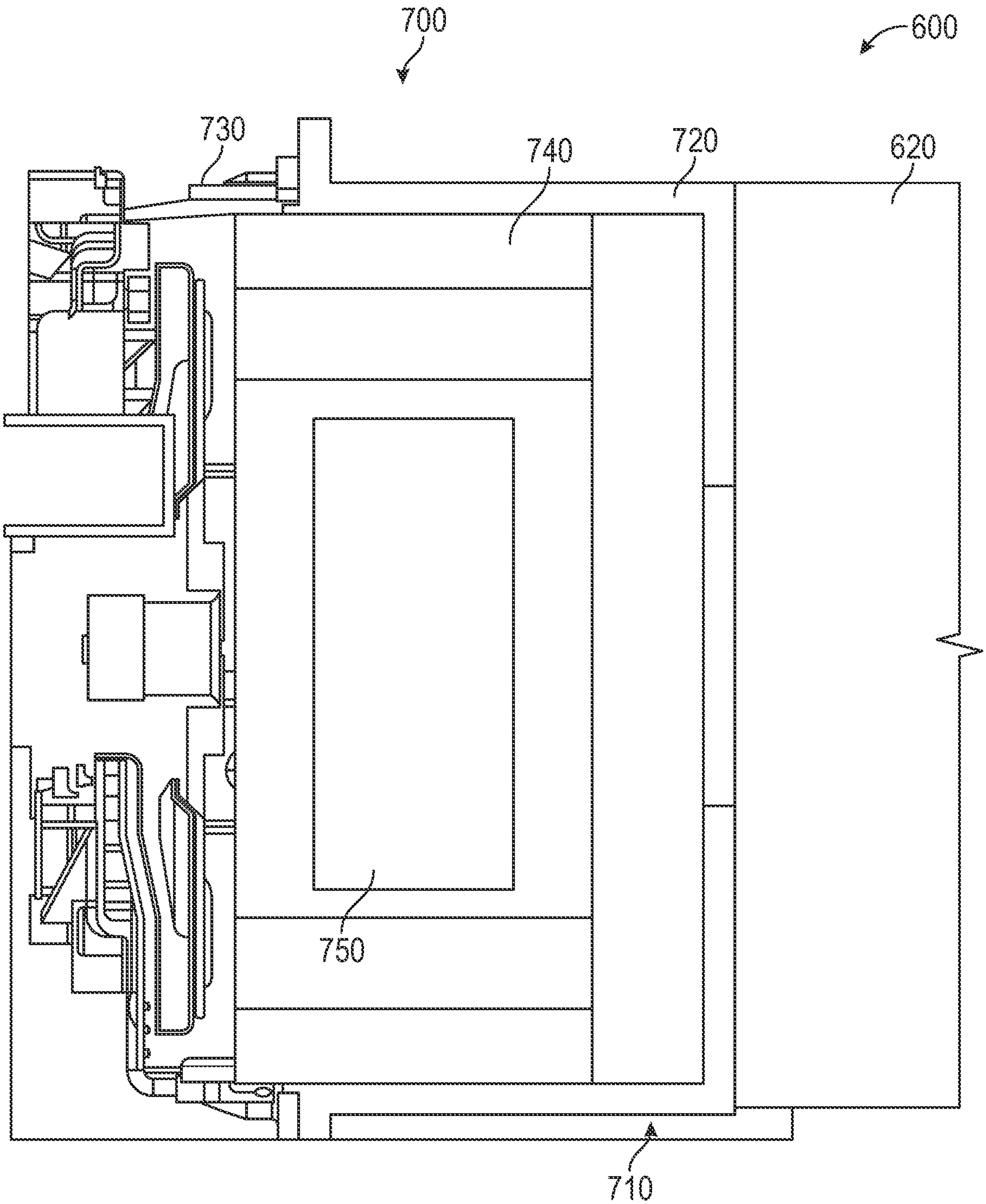
FIG. 14 is a detailed cross-sectional side view of the IMG of the driveline of FIG. 9, according to another exemplary embodiment.

As shown in FIGS. 12-14, the IMG 700 includes a housing, shown as IMG housing 710, including a first portion, shown as backing plate 720, coupled to the transmission 620, and a second portion, shown as engine mount 730, coupled to the engine 610. The IMG 700 further includes an electromagnetic device, shown as motor/generator 740, coupled to the backing plate 720, and a clutch mechanism, shown as engine clutch 750, coupled to the motor/generator 740 and selectively couplable to the engine 610. The motor/generator 740 and the engine clutch 750 are, therefore, positioned between the backing plate 720 and the engine mount 730 and enclosed within the IMG housing 710 (e.g., a single unit).

According to an exemplary embodiment, the engine clutch 750 is controllable (e.g., disengaged, engaged, etc.) to facilitate (i) selectively mechanically coupling the engine 610 and the motor/generator 740 (e.g., to start the engine 610 with the motor/generator 740, to drive the motor/generator 740 with the engine 610 to produce electricity, to drive the motor/generator 740 with the engine 610 to drive the transmission 620, etc.) and (ii) selectively mechanically decoupling the engine 610 and the motor/generator 740 (e.g., to drive the motor/generator 740 with power from the ESS 1000 to drive the transmission 620, the FEAD 800, etc.). In an alternative embodiment, the IMG 700 does not include the engine clutch 750 such that the engine 610 is directly coupled to the motor/generator 740.

As shown in FIGS. 12 and 13, the motor/generator 740 and the engine clutch 750 are arranged in a stacked arrangement with the engine clutch 750 positioned within an interior chamber, shown as cavity 732, of the engine mount 730. As shown in FIG. 14, the motor/generator 740 and the engine clutch 750 are arranged in an integrated arrangement with the engine clutch 750 positioned within an interior chamber, shown as cavity 752, of the motor/generator 740. The integrated arrangement of the motor/generator 740 and the engine clutch 750 facilitates reducing the packaging size of the IMG 700, which facilitates reducing the overall length of the driveline 600.

According to an exemplary embodiment, the engine clutch 750 is a pneumatically-operated clutch that is (i) spring-biased towards engagement with the engine 610 to couple the engine 610 to the other components of the driveline 600 (e.g., the motor/generator 740, the transmission 620, etc.) and (ii) selectively disengaged using compressed air provided from an air compressor (e.g., included in the FEAD 800, air compressor 808, etc.) to decouple the engine 610 from the other components of the driveline 600. Such a spring-biased and air-disengaged clutch ensures that the driveline 600 of the vehicle 10 is operational in the event of damage to the ESS 1000 or if a state-of-charge ("SoC") of the ESS 1000 falls below a minimum SoC threshold (e.g., 20% SoC). As an example, if the engine clutch 750 is disengaged and the motor/generator 740 is driving the vehicle 10, the engine clutch 750 will auto-engage (i) if electrical power is lost due to the ESS 1000 being damaged or the FEAD motor is damaged (which will cause the air compressor of the FEAD 800 to stop providing compressed air to the engine clutch 750) or (ii) if switching to an engine drive mode, which may include stopping the FEAD motor (e.g., in response to the SoC of the ESS 1000 falling below the minimum SoC threshold, which causes the air compressor of the FEAD 800 to stop providing compressed air to the engine clutch 750). In the event of auto-engagement of the engine clutch 750, the engine 610 (if already off) will be started by the inertial forces of the vehicle 10 (if moving), can be started by the motor/generator 740, or can be started by the dedicated engine starter. Such auto-engagement, therefore, ensures that engine 610 is connected to the remainder of the driveline 600 to drive the vehicle 10 in the event of some malfunction in the electrical system or when transitioning from electric drive to engine drive. According to an exemplary embodiment, the components of the driveline 600 do not need to be stopped nor do component speeds need to be matched to switch between engine drive and electric drive.

FEAD

According to an exemplary embodiment, the FEAD 800 is configured to drive (e.g., provide mechanical energy to, provide torque to, provide rotational inertia to, etc.) various accessories of the vehicle 10. As shown in FIGS. 15-17, 19, 22, and 23, the various accessories include a first accessory, shown as air compressor 808, a second accessory, shown as fan 810, a third accessory, shown as motor/generator 822, a fourth accessory, shown as hydraulic pump 832, and a fifth accessory, shown as air conditioning ("A/C") compressor 848. In other embodiments, the FEAD 800 includes additional, fewer, or different accessories. According to an exemplary embodiment, the FEAD 800 is selectively transitionable between different configurations, modes, or states to change a drive source (e.g., to change which of multiple available primary movers, engines, internal combustion engines, electric motors, etc. drive various accessories of the vehicle 10).

E-FEAD

According to the exemplary embodiment shown in FIGS. 15-19, the FEAD 800 is configured as an electrified FEAD ("E-FEAD") having a dual-belt drive arrangement. The FEAD 800 can be selectively driven by either the engine 610 (e.g., in a first mode or state) or the motor/generator 822 (e.g., in a second mode or state). Accordingly, the FEAD 800 and, therefore, the driving of the accessories can be transitioned between an electrified state or mode and an engine-driven state or mode. When the FEAD 800 is in the electrified state or mode, the FEAD 800 can operate independently of operation of the engine 610. For example, when the FEAD 800 is in the electrified state, the FEAD 800 and accessories thereof can operate even when the engine 610 is off or in-operational, thereby operating independently of the engine 610. In another example, when the FEAD 800 is in the electrified state, the FEAD 800 can operate to drive the accessories of the vehicle 10 while the engine 610 operates to drive other driveable elements or systems of the vehicle 10 such as the wheels of the axle assemblies 500, thereby operating independently and simultaneously with operation of the engine 610.

Figure 15:
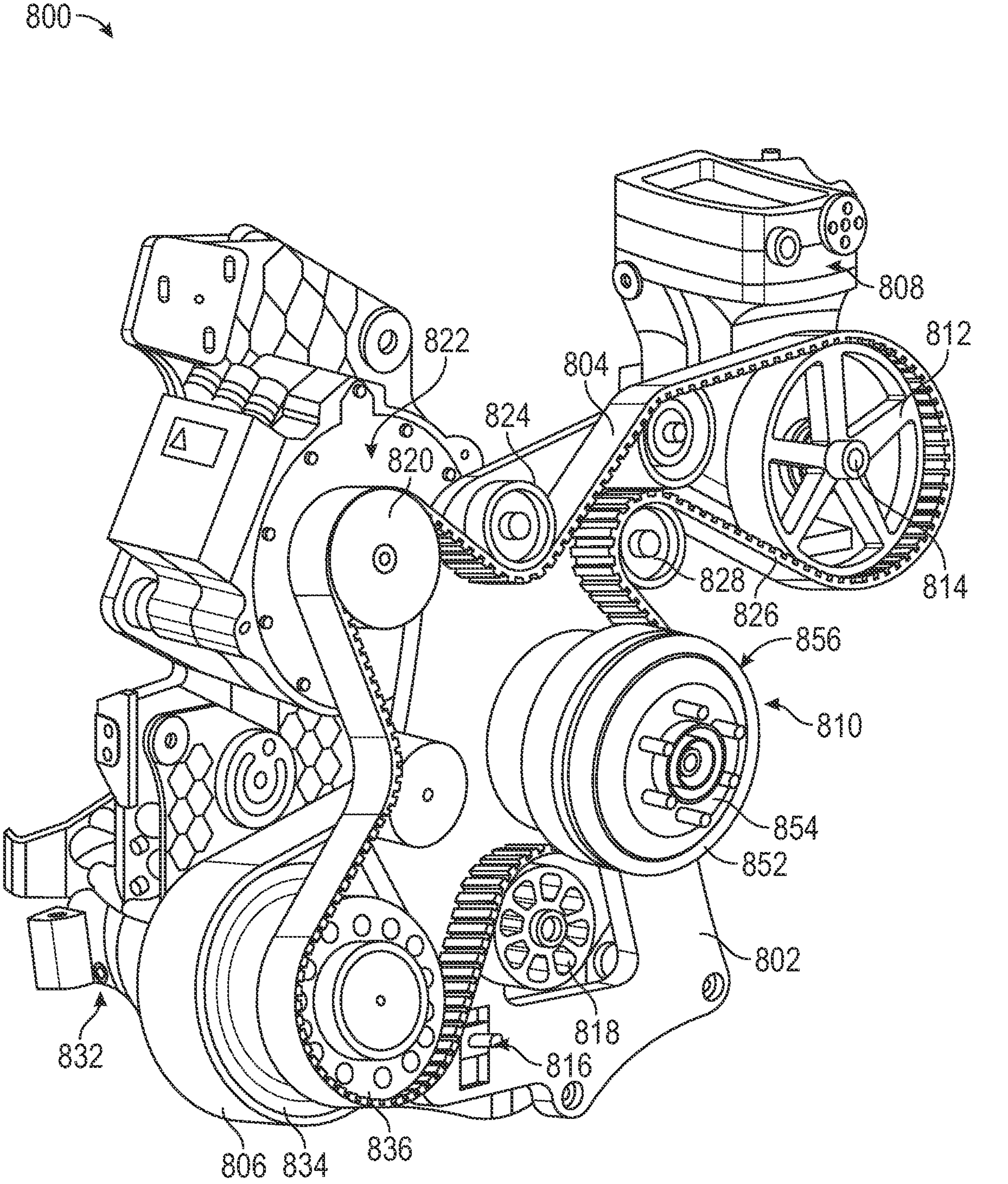
FIG. 15 is a front perspective view of the FEAD of FIG. 9, according to an exemplary embodiment.
Figure 16:
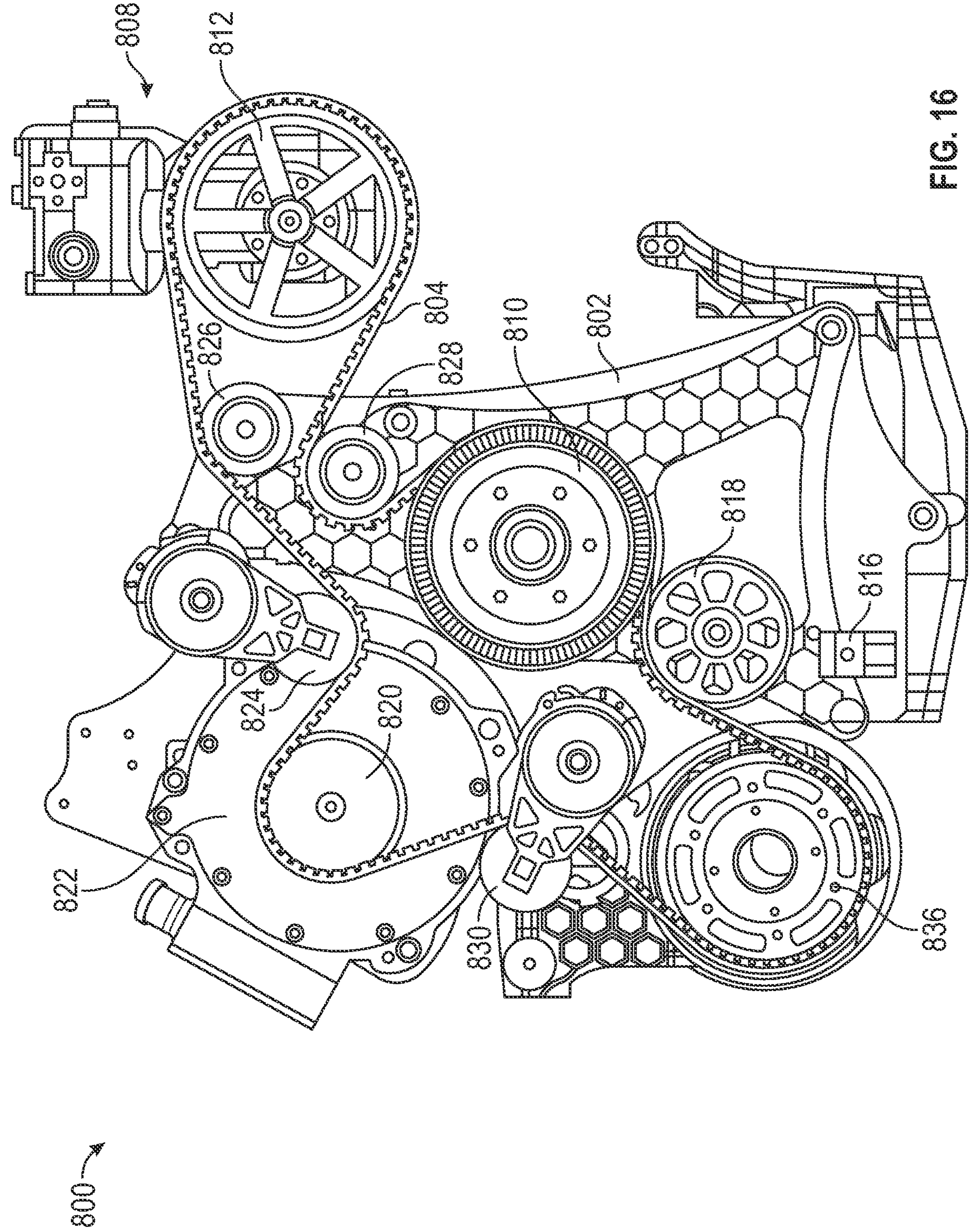
FIG. 16 is a front view of the FEAD of FIG. 15, according to an exemplary embodiment.
Figure 17:
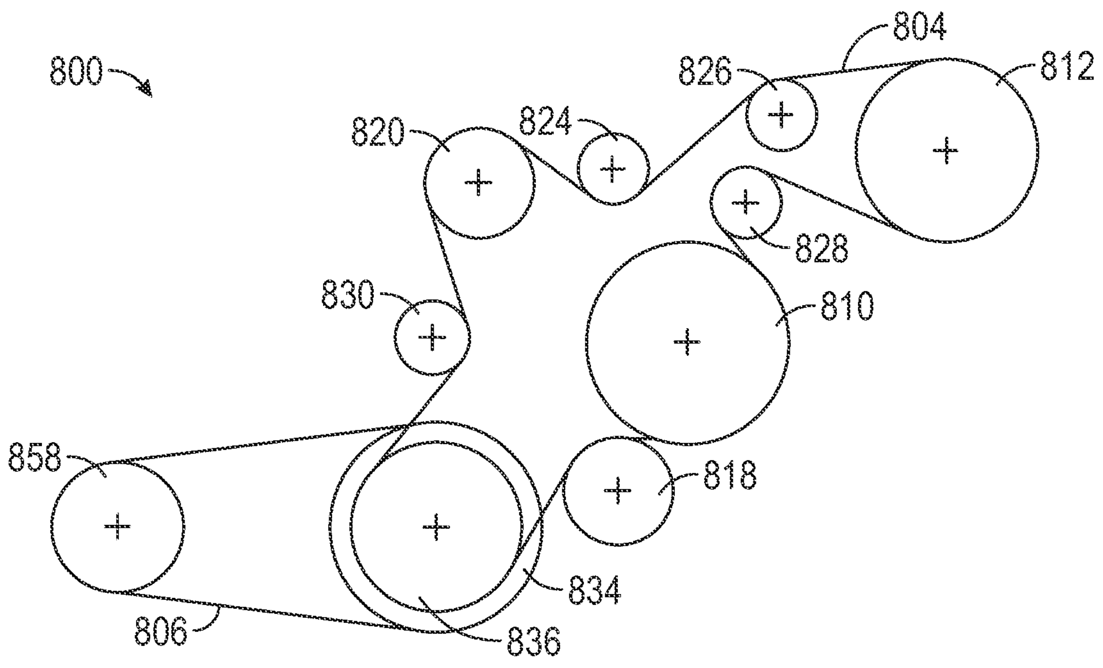
FIG. 17 is a schematic diagram of the FEAD of FIG. 15, according to an exemplary embodiment.

As shown in FIGS. 15-17, the FEAD 800 includes a first belt (e.g., tensile member, chain, power transmitting band, pulley, etc.), shown as FEAD belt 804, and a second belt (e.g., tensile member, chain, power transmitting band, pulley, etc.), shown as engine belt 806. The engine belt 806 is coupled between an output shaft 858 of the engine 610 (e.g., at a front end of the engine 610) and a one-way bearing or clutch, shown as sprag clutch 834. The FEAD belt 804 is coupled with, and defines a power band circuit between, a shaft 820 of the motor/generator 822, a drive member 812 of the air compressor 808 (e.g., an air compressor pulley or sheave), an outer race 852 of a fan clutch 856 of the fan 810, a tensioning pulley 818, a pulley 836 of the sprag clutch 834, a first roller 824, a second roller 826, a third roller 828, and a fourth roller 830 (e.g., roller pulleys). The FEAD belt 804 and the engine belt 806 can be V-belts or synchronous belts and are configured to drive or be driven by any of the coupled components, clutches, shafts, pulleys, rollers, gears, rotatable members, etc. of the FEAD 800 as described in detail herein.

Figure 18:
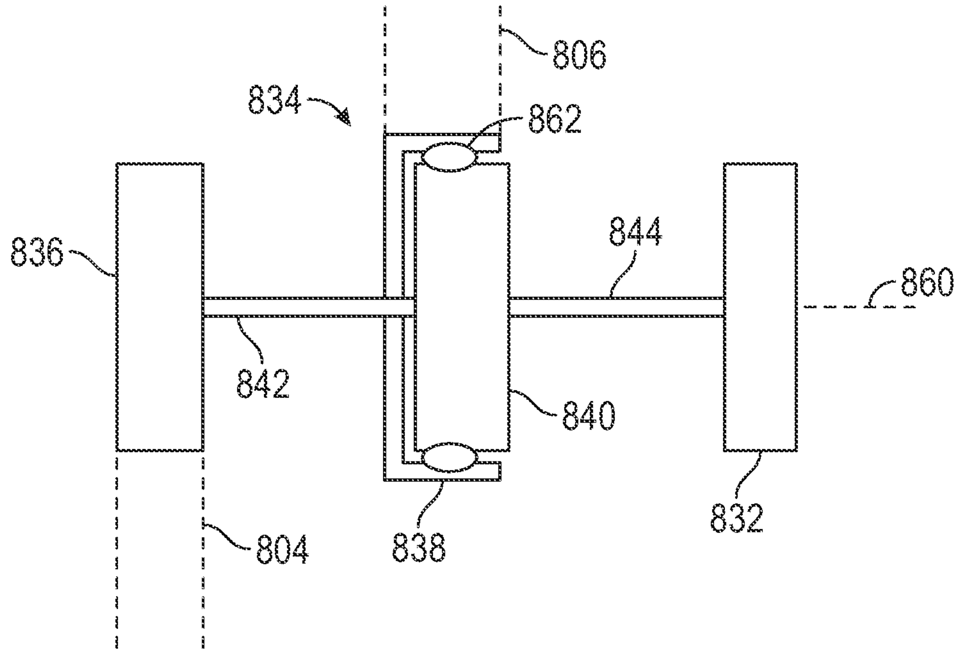
FIG. 18 is a schematic diagram of a sprag clutch of the FEAD of FIG. 15, according to an exemplary embodiment.

The hydraulic pump 832 is configured to be driven (e.g., by providing a torque input at an input shaft 844 of the hydraulic pump 832 as shown in FIG. 18) to pressurize a hydraulic fluid, according to an exemplary embodiment. The hydraulic fluid may be stored in a reservoir or tank, pressurized by the hydraulic pump 832, and provided to different hydraulically driven accessories, accessory systems, hydraulic motors, hydraulic actuators, power steering systems, suspension systems, etc. of the vehicle 10. The hydraulic pump 832 may be a component of a hydraulic circuit of the vehicle 10 that is used for different body operations or body systems of the vehicle 10, or different chassis systems of the vehicle 10 that use hydraulic primary movers (e.g., hydraulic motors, hydraulic linear actuators, etc.). The hydraulic pump 832 can be any of a gear pump, a piston pump, a vane pump, a clutch pump, a dump pump, a refuse pump, etc. or any other hydraulic pump (e.g., clutched) that receives an input torque and pressurizes or drives a hydraulic fluid. In an exemplary embodiment, the hydraulic pump 832 pressurizes the hydraulic fluid for a power steering system and a suspension system of the vehicle 10.

The air compressor 808 is configured to be driven (e.g., by providing a torque input at an input shaft 814 of the air compressor 808 such as by driving, with the FEAD belt 804, the drive member 812 that is fixedly coupled with the input shaft 814) to pressurize air or any other gas, according to an exemplary embodiment. The air may be pressurized and stored in an air tank (e.g., a tank, a reservoir, a pressure vessel, etc.) that is fluidly coupled with the air compressor 808. For example, the air compressor 808 can be configured to operate to maintain a required pressure in the air tank for different chassis operations or systems such as brakes. In an exemplary embodiment, the air compressor 808 is configured to pressurize air for air brakes of the vehicle 10 (e.g., drum brakes that include a brake chamber that is fluidly coupled with the air tank). The air compressor 808 is a component of a fluid circuit for providing pressurized air to different accessories or systems of the vehicle 10, including but not limited to, air brakes of the axle assemblies 500. In some embodiments, the air compressor 808 is configured to pressurize air for other chassis or body operations of the vehicle 10 (e.g., suspension components, etc.).

The fan 810 is configured to be driven (e.g., by providing a torque input, with the FEAD belt 804, through the fan clutch 856 of the fan 810 when the fan clutch 856 is in an engaged state) to drive a rotor or impeller component of the fan 810. The fan 810 is configured to drive an airflow through cooling components (e.g., an engine radiator, a transmission cooler, heat exchangers, a hydraulic cooler, an A/C condenser, a battery cooler, etc.) of the vehicle 10 to provide cooling for the engine 610 and various other systems (e.g., a hydraulic circuit, the transmission 620, the ESS 1000, etc.) of the vehicle 10. The impeller component or assembly can be selectively engaged with the FEAD belt 804 through the fan clutch 856. The fan clutch 856 may be an electric clutch that is selectively engaged or disengaged to thereby couple or de-couple the impeller component or assembly of the fan 810 with the FEAD belt 804. The FEAD belt 804 couples with the outer race 852 of the fan clutch 856, and the impeller assembly of the fan 810 is fixedly coupled with an inner race 854 of the fan clutch 856. Engaging or disengaging the fan clutch 856 couples or decouples the inner race 854 with the outer race 852 of the fan clutch 856. The fan clutch 856 can be transitioned between the engaged state and the disengaged state automatically based on a temperature of the engine 610 or other vehicle components, in response to a user input, in response to a control mode, etc.

As shown in FIGS. 15 and 16, the tensioning pulley 818 is positioned along the FEAD belt 804 between the pulley 836 of the sprag clutch 834 and the fan 810. In other embodiments, the tensioning pulley 818 is otherwise positioned along the FEAD belt 804. The tensioning pulley 818 is adjustable (e.g., physically moveable, translatable, etc.) to increase or decrease a tension of the FEAD belt 804. The tensioning pulley 818 can be adjusted by providing an input to an adjustment member 816 (e.g., lever, knob, etc.) to reposition (e.g., translate, etc.) the tensioning pulley 818.

According to an exemplary embodiment, the motor/generator 822 is configured to function both as a motor and as a generator in different modes of the FEAD 800. When the motor/generator 822 functions as a motor, the motor/generator 822 is configured to consume electrical energy from the ESS 1000 of the vehicle 10 and output a torque to the FEAD belt 804 through the shaft 820 of the motor/generator 822. The FEAD belt 804 transfers the torque or mechanical energy to each of the fan 810, the air compressor 808, and the hydraulic pump 832 so that the motor/generator 822 functions as the primary mover of the FEAD 800 when activated, thereby electrifying the FEAD 800 and facilitating independent operation the FEAD 800 (i.e., operating independently of operation of the engine 610). The FEAD belt 804 can be configured to drive the hydraulic pump 832 through the sprag clutch 834, as described in greater detail below with reference to FIG. 18.

The motor/generator 822 is also configured to function as a generator and be driven by the FEAD belt 804 when the engine 610 operates as the primary mover of the FEAD 800. The engine 610 is configured to drive the sprag clutch 834 through the engine belt 806, which thereby drives (i) the hydraulic pump 832 through the sprag clutch 834 and (ii) the FEAD belt 804 through the sprag clutch 834, and thereby the fan 810, the air compressor 808, and the motor/generator 822 through the pulley 836 of the sprag clutch 834. In some embodiments, the FEAD 800 can be transitioned between the engine-driven mode and the electrified mode by (i) selectively configuring the engine 610 to drive the engine belt 806 (e.g., by engaging a clutch of the engine 610 so that the engine outputs torque to the sprag clutch 834 via the engine belt 806, or by starting or stopping the engine 610) or (ii) activating the motor/generator 822 to drive the FEAD belt 804 (e.g., by providing electrical power to the motor/generator 822 to thereby cause the motor/generator 822 to function as an electric motor and drive the FEAD belt 804). When the engine 610 drives the FEAD 800 through the engine belt 806, the sprag clutch 834, and the FEAD belt 804, the motor/generator 822 may be driven through the shaft 820 and function as a generator (as necessary or continuously) to generate electrical energy based on the driving of the shaft 820 (e.g., now functioning as an input shaft) and provide the electrical energy to various electrical components of the vehicle 10 and/or to the ESS 1000 for storage.

As shown in FIGS. 15 and 16, the FEAD 800 includes a structural member, shown as frame 802, with which each of the motor/generator 822, the air compressor 808, the tensioning pulley 818, the hydraulic pump 832, the sprag clutch 834, the fan 810, and the roller pulleys 824-830 are coupled (e.g., translationally fixedly coupled). According to an exemplary embodiment, the frame 802 is coupled (e.g., mounted, secured, fixedly coupled, fastened, attached, etc.) to a front of the engine 610. In other embodiments, the frame 802 is coupled to the hull and frame assembly 100 (e.g., a portion of the front module 300).

As shown in FIG. 18, the sprag clutch 834 includes a first portion, shown as outer race 838, a second portion, shown as inner race 840, and one-way rotational elements, shown as sprags 862, positioned between the inner race 840 and the outer race 838. The sprags 862 are configured to (i) permit free rotation between the inner race 840 and the outer race 838 when the inner race 840 is rotated relative to the outer race 838 about a central axis 860 thereof (e.g., when the pulley 836, and therefore, the inner race 840 is driven by the motor/generator 822) and (ii) limit or jam when the outer race 838 is rotated relative to the inner race 840 about the central axis 860 (e.g., when the outer race 838 is driven by the engine 610 through the engine belt 806).

As shown in FIGS. 15 and 17, the engine belt 806 is coupled with the outer race 838 of the sprag clutch 834 so that when the engine 610 drives the engine belt 806, the outer race 838 locks with the inner race 840 and both the outer race 838 and the inner race 840 rotate in unison (e.g., due to the sprags 862 locking the inner race 840 with the outer race 838 or limiting relative rotation between the inner race 840 and the outer race 838). The pulley 836 of the sprag clutch 834 is fixedly coupled with the inner race 840 of the sprag clutch 834 (e.g., via a shaft 842) so that rotation of the inner race 840 drives the pulley 836 and the FEAD belt 804. The input shaft 844 of the hydraulic pump 832 is coupled (e.g., rotatably) with the inner race 840 of the sprag clutch 834 such that rotation of the inner race 840 (e.g., in unison with rotation of the outer race 838 when the engine 610 drives the outer race 838 and the inner race 840 in unison through the engine belt 806) also drives the hydraulic pump 832.

As shown in FIG. 18, the pulley 836 and, therefore, the FEAD belt 804 are coupled with the inner race 840 of the sprag clutch 834. When the motor/generator 822 of the FEAD 800 operates as the primary mover of the FEAD 800, the motor/generator 822 drives the FEAD belt 804 (thereby driving the air compressor 808 and/or the fan 810), which drives the pulley 836 and the inner race 840 to rotate relative to the outer race 838 of the sprag clutch 834, thereby also driving the hydraulic pump 832 without driving the outer race 838 and the engine belt 806. In this way, the sprag clutch 834 can function to facilitate driving the FEAD 800 with either the engine 610 or the motor/generator 822. When the motor/generator 822 drives the FEAD 800 and accessories thereof, the inner race 840 of the sprag clutch 834 rotates freely relative to the outer race 838. When the engine 610 drives the FEAD 800 and accessories thereof, the inner race 840 and the outer race 838 of the sprag clutch 834 have limited relative rotation to thereby transfer the torque from the engine 610 and the engine belt 806 to the FEAD 800 and accessories thereof.

It should be understood that while FIG. 18 shows the engine belt 806 being coupled with the outer race 838 of the sprag clutch 834, and the hydraulic pump 832 and the FEAD belt 804 being coupled with the inner race 840 of the sprag clutch 834, in other embodiments, the engine belt 806 is coupled with the inner race 840 of the sprag clutch 834 and the hydraulic pump 832 and the FEAD belt 804 are coupled with the outer race 838 of the sprag clutch 834.

Figure 19:
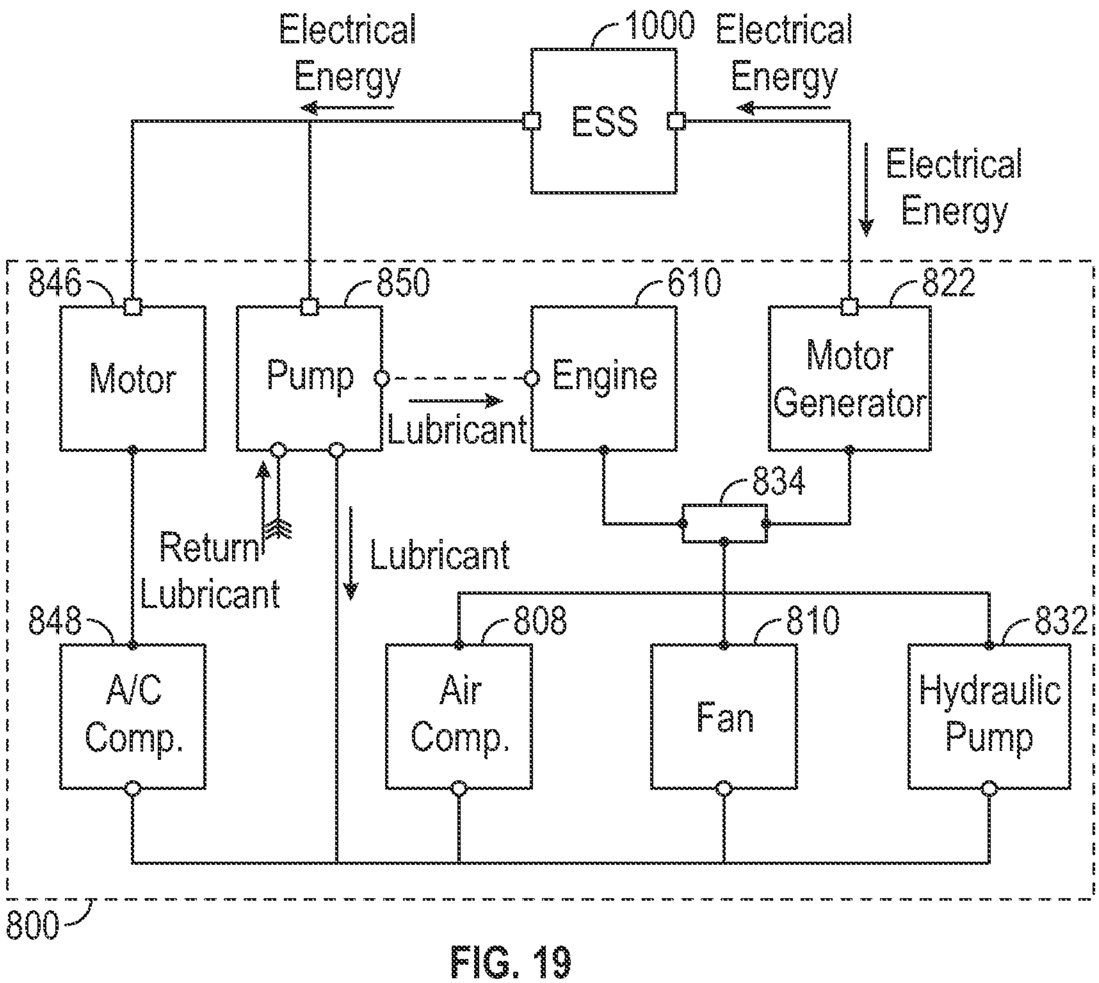
FIG. 19 is a schematic block diagram of the FEAD of FIG. 15 operably coupled with the ESS of FIGS. 9 and 10, according to an exemplary embodiment.

As shown in FIG. 19, the FEAD 800 is operably or electrically coupled with the ESS 1000 so that the ESS 1000 can exchange electrical energy with electrical components of the FEAD 800. The FEAD 800 also includes the A/C compressor 848 and an electric motor 846 that is configured to drive the A/C compressor 848. The A/C compressor 848 and the electric motor 846 can operate independently of the engine 610 and the motor/generator 822 so that the A/C compressor 848 does not depend on operation, drive speed, or on/off status of the engine 610 or the motor/generator 822. The engine 610 or the motor/generator 822 are selectively configured to provide mechanical energy to drive the air compressor 808, the fan 810, or the hydraulic pump 832. When the engine 610 drives the air compressor 808, the fan 810, and the hydraulic pump 832, the engine 610 may also drive the motor/generator 822 so that the motor/generator 822 generates electrical energy. The motor/generator 822 is electrically coupled (e.g., via electrical wiring) with the ESS 1000 and provides generated electrical energy to the ESS 1000 for storage and discharge to other electrical components of the vehicle 10. When the motor/generator 822 operates to drives the FEAD 800 (e.g., in the electrified mode), the motor/generator 822 consumes electrical energy provided by the ESS 1000 (or more specifically batteries thereof) and uses the electrical energy to drive the accessories of the FEAD 800.

As shown in FIG. 19, the FEAD 800 includes a pump (e.g., an oil pump, a lubrication pump, etc.), shown as lubricant pump 850, that is configured to provide lubricant to the A/C compressor 848, the air compressor 808, the fan 810, and/or the hydraulic pump 832. In some embodiments, the lubricant pump 850 is a component in a fluid lubricant circuit that includes a reservoir for the lubricant, one or more filters to filter the lubricant, etc. In some embodiments, the lubricant pump 850 is configured to provide lubricant to the engine 610. The lubricant pump 850 may be selectively fluidly coupled with the accessories of the FEAD 800 (e.g., the A/C compressor 848, the air compressor 808, the fan 810, the hydraulic pump 832, etc.) or lubricant inlets (e.g., grease fittings) of the accessories of the FEAD 800 to provide lubricant (e.g., grease, liquid lubricant, oil-based lubricant, etc.) to reduce friction and reduce wear of the accessories of the FEAD 800. The lubricant fluid circuit including the lubricant pump 850 can include a valve and a branch (e.g., a tee) to selectively direct lubricant to the accessories of the FEAD 800 or moving parts of the accessories of the FEAD 800 as required, automatically, or in response to a user input. The lubricant pump 850 can include an electric motor that consumes electrical energy provided by the ESS 1000 to operate independently of operation of the engine 610 and/or the motor/generator 822 (e.g., operates when the engine 610 and/or the motor/generator 822 are in an off state, not operating to provide torque or generate electrical energy, etc.). The lubricant pump 850 is configured to receive return lubricant from any of the A/C compressor 848, the air compressor 808, the fan 810, the hydraulic pump 832, or the engine 610, and recirculate the return lubricant.

The A/C compressor 848 and the electric motor 846 are configured to operate independently of the engine 610 and the motor/generator 822 to provide A/C for occupants of the vehicle 10. The electric motor 846 operates by consuming electrical power provided by the ESS 1000 (or other batteries of the vehicle 10) and driving the A/C compressor 848. The A/C compressor 848 is configured to compress a refrigerant to pass the refrigerant through a heat exchanger for A/C. Advantageously, the A/C compressor 848 can be operated regardless of the mode of the FEAD 800 (e.g., if the FEAD 800 is being driven by the engine 610, if the FEAD 800 is being driven by the motor/generator 822, if the FEAD 800 is not being driven).

Engine-Only-Driven FEAD

Figure 20:
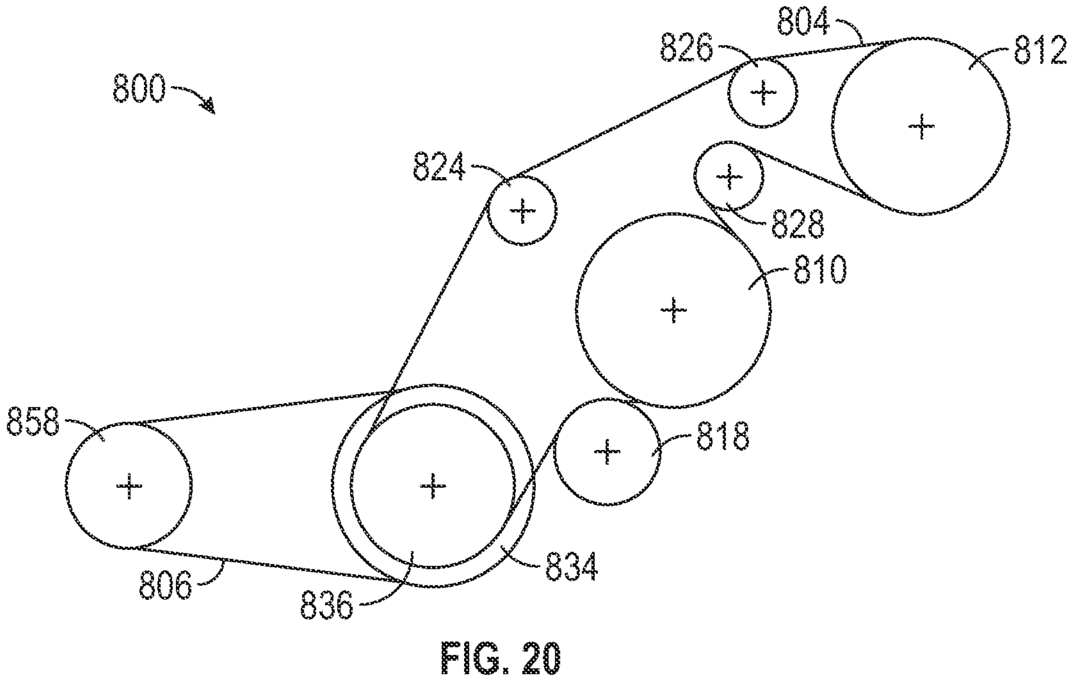
FIG. 20 is a schematic diagram of the FEAD of FIG. 9 without an electric motor/generator, according to another exemplary embodiment.

According to the alternative embodiment shown in FIG. 20, the FEAD 800 does not include the motor/generator 822 and is instead driven solely by the engine 610 through the output shaft 858 of the engine 610 that is coupled with the engine belt 806, thereby driving the FEAD belt 804 through the sprag clutch 834. In such an embodiment, the FEAD 800 may not include the sprag clutch 834. The accessories of the FEAD 800 may, therefore, be directly coupled to the engine belt 806 or the sprag clutch 834 is replaced by two pulleys coupled together (e.g., the pulley 836 and a second pulley that replaces the outer race 838 and the inner race 840 of the sprag clutch 834).

IMG-Driven FEAD

Figure 21:
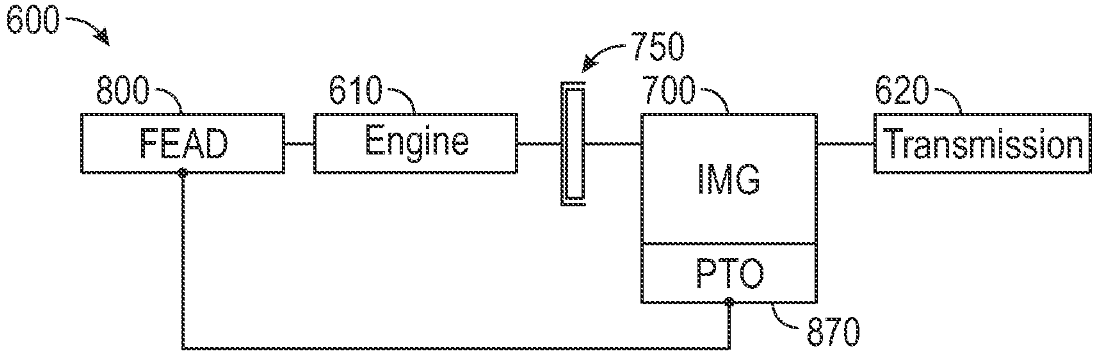
FIG. 21 is a schematic block diagram of the driveline of FIG. 9 including a power take-off ("PTO") that is driven by the IMG and coupled to the FEAD, according to another exemplary embodiment.
Figure 22:
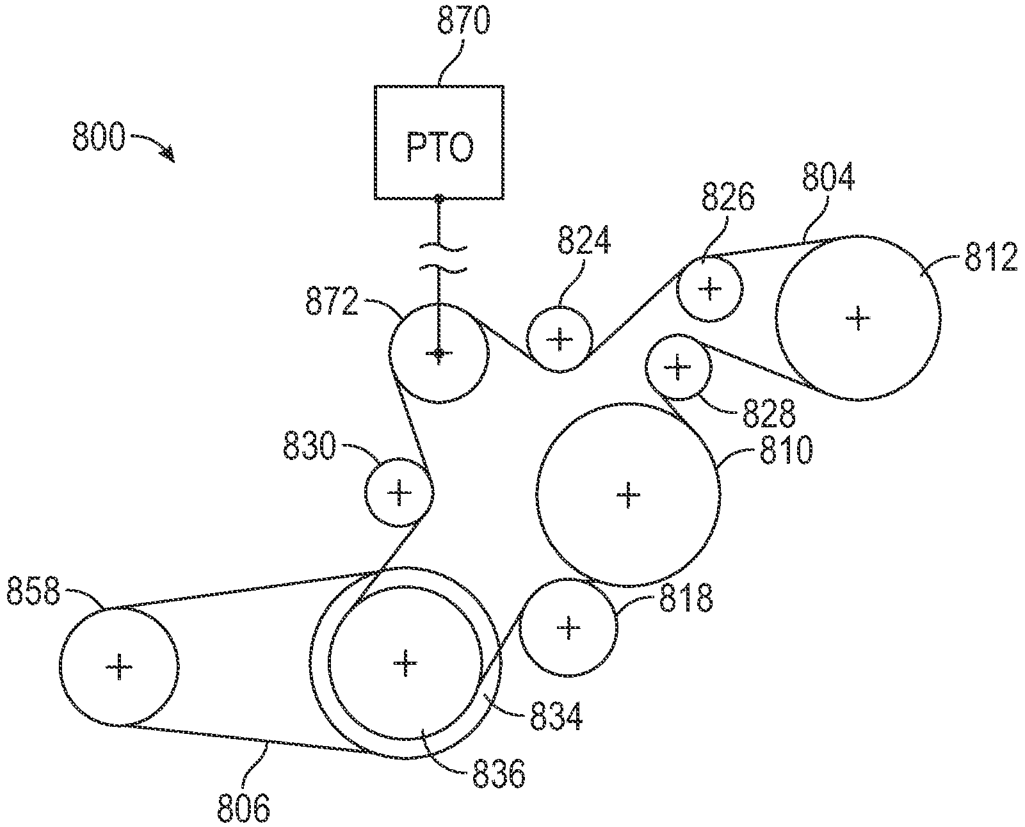
FIG. 22 is a schematic diagram of the FEAD coupled to the PTO of the driveline of FIG. 21, according to an exemplary embodiment.

According to the exemplary embodiment FIGS. 21 and 22, the FEAD 800 or accessories thereof can be driven by the IMG 700 of the driveline 600. As shown in FIG. 21, the driveline 600 includes the engine 610, the engine clutch 750, the IMG 700, and the transmission 620 where the IMG 700 includes a PTO, shown as PTO 870, configured to be driven by an output (e.g., a secondary output, etc.) of the IMG 700. The PTO 870 can be transitionable between an engaged state and a disengaged state. When the PTO 870 is in the engaged state, the PTO 870 can receive output torque from the IMG 700 and transfer the torque to an input pulley 872 of the FEAD 800 for driving the FEAD belt 804. Accordingly, the input pulley 872 may replace the motor/generator 822 of the FEAD 800. The engine 610 may still be configured to drive the FEAD 800 and accessories of the FEAD 800 through the sprag clutch 834 and the engine belt 806 when the FEAD

800 is in the engine-driven mode. When the FEAD 800 is transitioned into the motor/driven or electrified mode, the IMG 700 can consume electrical energy (e.g., from the ESS 1000) and output torque to the PTO 870. The PTO 870 can be transitioned into the engaged state so that the PTO 870 receives the output torque from the IMG 700 and transfers the output torque to the input pulley 872 of the FEAD 800. The input pulley 872 can be configured to drive the FEAD belt 804 similarly to the motor/generator 822 as described in greater detail above with reference to FIGS. 15-19.

Accordingly, the FEAD 800 shown in FIGS. 21 and 22 is transitionable between (i) an engine-driven mode where the FEAD 800 and accessories of the FEAD 800 are driven by the engine 610 and (ii) a motor/driven or electrified mode where the FEAD 800 and accessories of the FEAD 800 are driven by the IMG 700 of the driveline 600 (e.g., through the PTO 870). Transitioning between the engine-driven mode and the motor/driven mode can include (i) transitioning the PTO 870 between the engaged state and the disengaged state and/or (ii) transitioning the IMG 700 between operating as a motor and operating as a generator. Advantageously, driving the FEAD 800 in the motor/driven mode with the IMG 700 reduces the need for an additional motor/generator at the FEAD 800 (e.g., the motor/generator 822). When the FEAD 800 is driven by the IMG 700 through the PTO 870, the engine clutch 750 may be de-coupled from the engine 610 so that the IMG 700 operates independently of operation of the engine 610. In another embodiment, the PTO 870 is coupled to an output (e.g., a secondary output) of the transmission 620 and driven by the IMG 700 and/or the engine 610 to drive the FEAD 800.

Electrified Accessories

Figure 23:
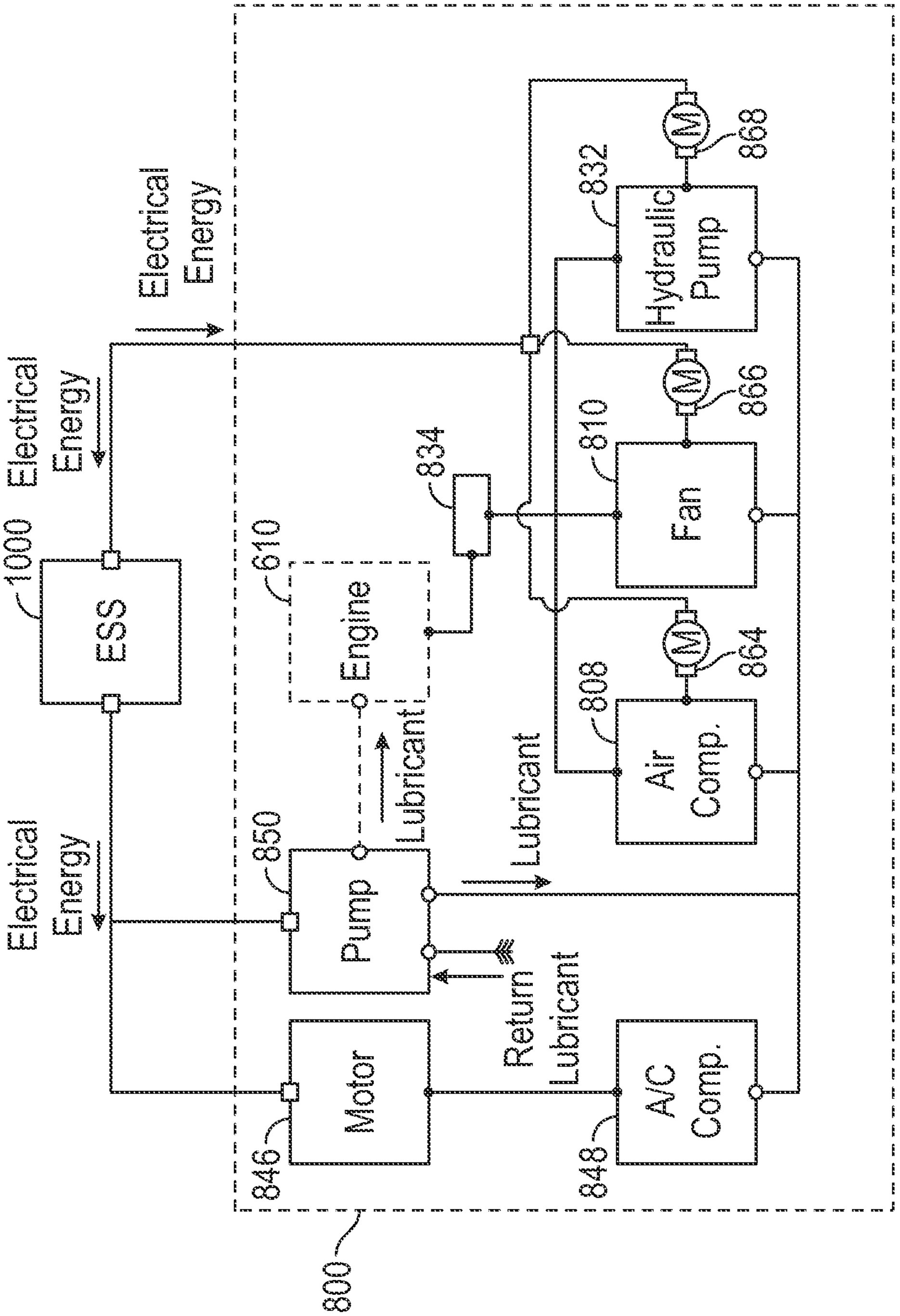
FIG. 23 is a schematic block diagram of the FEAD of FIG. 9 including an electric motor for each of the accessories thereof, according to another exemplary embodiment.

According to the exemplary embodiment shown in FIG. 23, each of the accessories of the FEAD 800 can be individually electrified. As shown in FIG. 23, the FEAD 800 additionally includes an electric motor 864 configured to drive the air compressor 808, an electric motor 866 configured to drive the fan 810, and an electric motor 868 configured to drive the hydraulic pump 832. Each of the electric motor 864, the electric motor 866, the electric motor 868, and the electric motor 846 is configured to consume electrical energy provided by the ESS 1000 to drive their corresponding accessories. Each of the electric motor 864, the electric motor 866, the electric motor 868, and the electric motor 846 can therefore be operated independently of each other and/or independently of the engine 610.

In the embodiment shown in FIG. 23 where each of the accessories is electrified, the engine 610 may be optional as a primary mover for the FEAD 800. If the engine 610 is not used by the FEAD 800 in such an embodiment, the engine 610 may still be provided as a component of the driveline 600 but is not used to provide a torque input to the FEAD 800. If the engine 610 is not used to provide a torque input to the FEAD 800, the engine belt 806, the FEAD belt 804, and the sprag clutch 834 are not used since each of the accessories are independently operated by their corresponding electric motors.

If the engine 610 is used to provide a torque input to the FEAD 800, the electric motor 864, the electric motor 866, and the electric motor 868 can function as motor/generators, and can be driven by the engine 610 to generate electrical energy and provide the electrical energy to the ESS 1000. In some embodiments, one or more of the air compressor 808, the fan 810, and the hydraulic pump 832 are not electrified, while one or more others of the air compressor 808, the fan 810, and the hydraulic pump 832 are electrified. For example, the hydraulic pump 832 and the air compressor 808 can both be electrified and independently operational (e.g., through operation of the electric motor 868 and the electric motor 864) while the fan 810 may be coupled with the engine 610 through the FEAD belt 804 or the engine belt 806 to be driven by the engine 610. Advantageously, providing the electric motors 864-868 facilitates independent operation of each of the air compressor 808, the fan 810, and the hydraulic pump 832 relative to operation of the engine 610, and also relative to operation of each other. For example, the air compressor 808 can be operated independently, regardless of operation of any of the A/C compressor 848, the engine 610, the fan 810, or the hydraulic pump 832. Further, electrification of the accessories may facilitate distributing the accessories variously about the vehicle 10, providing improved component packaging.

Energy Storage System

Capacity, Operating Range, and Charging

Figure 24:
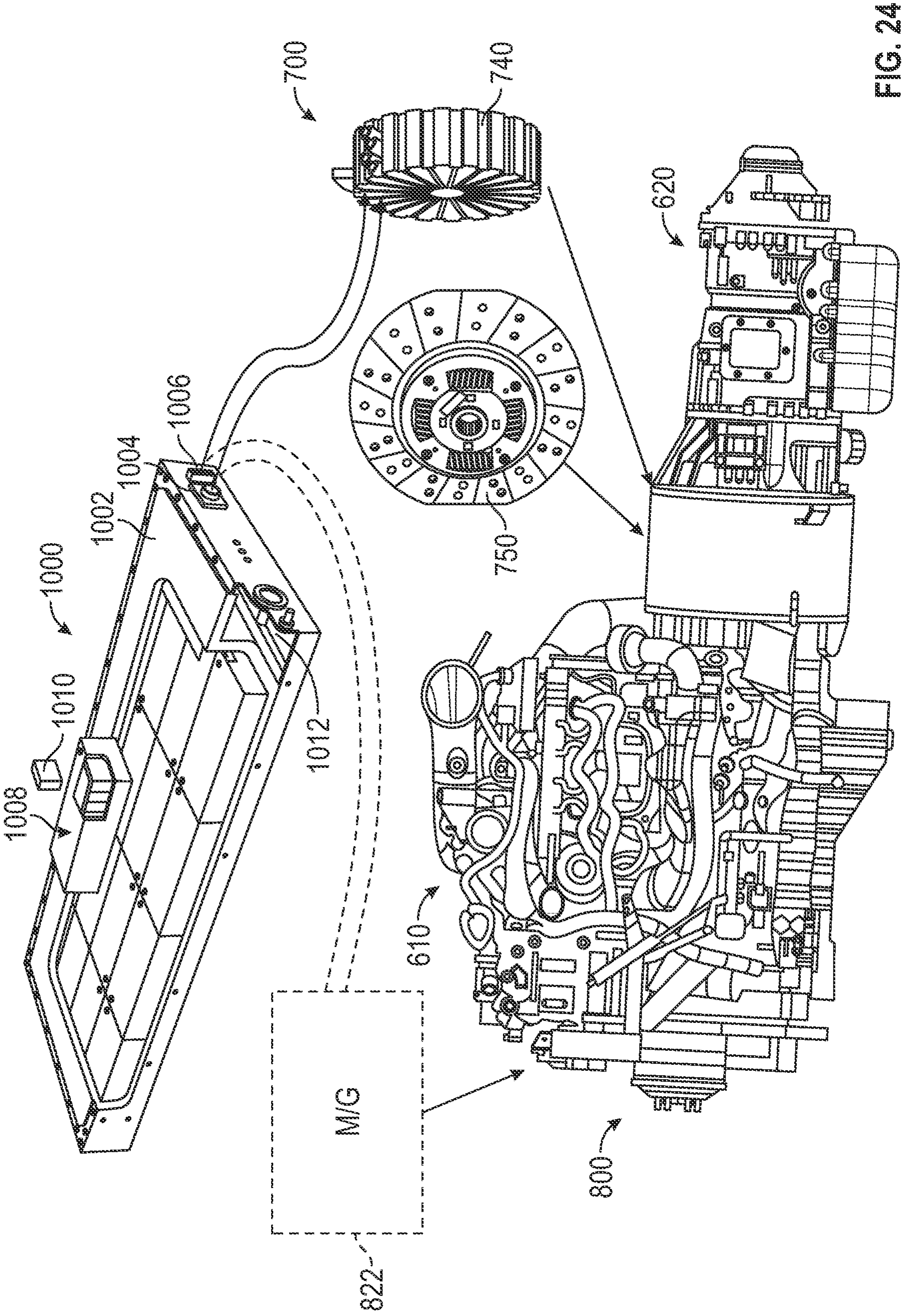
FIG. 24 is a schematic diagram of the ESS of FIG. 9, according to an exemplary embodiment.

As shown in FIG. 24, the ESS 1000 is electrically coupled to the IMG 700. In some embodiments (e.g., embodiments where the FEAD 800 includes the motor/generator 822), the ESS 1000 is also electrically coupled to the motor/generator 822 of the FEAD 800. In an electric drive mode of operation, the ESS 1000 provides power to the IMG 700 to drive the transmission 620 and/or other components/systems of the vehicle 10 (e.g., to the motor/generator 822 to drive the FEAD 800). In a charge mode of operation (e.g., during the engine mode), (i) the IMG 700 is driven by the engine 610 via the engine clutch 750 and electrical power may be generated and provided to the ESS 1000 and/or (ii) the motor/generator 822 may be driven by the engine 610 and electrical power may be generated and provided to the ESS 1000.

As shown in FIG. 24, the ESS 1000 includes a battery storage housing 1002, a power connector 1004 supported by the battery storage housing 1002, and a data connector 1006 supported by the battery storage housing 1002. The power connector 1004 provides power communication between the ESS 1000, the IMG 700, and/or the motor/generator 822. The data connector 1006 provides data communication between the ESS 1000, the IMG 700, and/or the motor/generator 822. The ESS 1000 includes a number of batteries 1008, each including a number of cells 1010. The batteries 1008 are coupled together to provide an energy storage capacity of the ESS 1000.

In some embodiments, the batteries 1008 are configured (e.g., structured, designed, etc.) to operate at 700 volts ("V"). In some embodiments, the batteries 1008 are configured to operate at 24 V. In some embodiments, the batteries 1008 are configured to operate at a voltage between 700 V and 24 V. In an exemplary embodiment, the batteries 1008 are configured to operate at 666 V nominal voltage with a 406 kW discharge power. In some embodiments, the ESS 1000 has an energy storage capacity of 30.6 kWh. In some embodiments, the ESS 1000 is configured to operate at ambient temperatures between −40 degrees Celsius and 80 degrees Celsius.

In some embodiments, the energy storage capacity is defined for a target load. The target load is defined by the vehicle 10 (e.g., weight, transmission design, suspension dynamics, etc.) and can be expressed as an average load in kilowatts ("kW"). In some embodiments, the target load is defined by a specific vehicle and a specific use case. In some embodiments, the vehicle 10 is structured to provide a silent mobility mode where the systems and components the vehicle 10 are operated using energy from the ESS 1000 and the engine 610 is inactive. The silent mobility mode can define the energy storage capacity in part. In some embodiments, the target load is defined at the gross-vehicle-weight-rating ("GVWR") of the vehicle 10. Table 1, reproduced below, depicts six use cases and associated target loads during the silent mobility mode.

In use case "Vehicle 1," the target load is 68 kW average load and results in 22 minutes of run time and 13.5 miles of distance traveled. The energy storage capacity of "Vehicle 1" can be defined as 22 minutes of run time and/or 13.5 miles of distance traveled. In some embodiments, the target load of "Vehicle 1" is at least sixty-five kilowatts (65 kW). In some embodiments, the energy storage capacity of "Vehicle 1" can be defined as at least 20 minutes of run time and/or at least 13 miles of distance traveled.

In use case "Vehicle 2," the target load is 53 kW average load and results in 29 minutes of run time and 6 miles of distance traveled. The energy storage capacity of "Vehicle 2" can be defined as 29 minutes of run time and/or 6 miles of distance traveled. In some embodiments, the target load of "Vehicle 2" is at least fifty kilowatts (50 kW). In some embodiments, the energy storage capacity of "Vehicle 2" can be defined as at least 29 minutes of run time and/or at least 6 miles of distance traveled.

In use case "Vehicle 3," the target load is 40 kW average load and results in 38 minutes of run time and 14.5 miles of distance traveled. The energy storage capacity of "Vehicle 3" can be defined as 38 minutes of run time and/or 14.5 miles of distance traveled. In some embodiments, the target load of "Vehicle 3" is at least forty kilowatts (40 kW). In some embodiments, the energy storage capacity of "Vehicle 3" can be defined as at least 35 minutes of run time and/or at least 14 miles of distance traveled.

In use case "Idle," the goal is to idle the vehicle 10 using the ESS 1000 without requiring activation of the engine 610 (e.g., operate all loads of the vehicle 10 using the ESS 1000). The target load of the "Idle" use case is 17 kW average load and results in 90 minutes of run time. The energy storage capacity of "Idle" can be defined as 90 minutes of run time and/or 0 miles of distance traveled.

In use case "Fuel_Econ," the goal is to maximize the distance traveled by the vehicle 10. The target load is 40 kW average load and results in 22 miles of distance traveled. The energy storage capacity of "Fuel_Econ" can be defined 22 miles of distance traveled.

In use case "25 mph," the goal is to maximize a time of operation while moving the vehicle 10 at 25 mph over ground. The target load is 34 kW average load and results in 44 minutes of run time. The energy storage capacity of "25 mph" can be defined as 44 minutes of run time.

dimensions of about 60.8 inches wide, about 29.5 inches tall, and about 8.5 inches thick. In some embodiments, the battery storage housing 1002 is shaped differently and defines different dimensions (e.g., dependent upon the positioning on the vehicle 10, the desired battery capacity, weight loading requirements, etc.). For example, the battery storage housing 1002 may be between 40 and 80 inches wide, between 10 and 40 inches tall, and between 4 and 12 inches thick. In some embodiments, the battery storage housing 1002 is not structured as a single housing containing multiple batteries. In some embodiments, each battery 1008 or a subset of batteries 1008 may include battery storage housings 1002 that may be collocated on the vehicle 10 or distributed in multiple positions about the vehicle 10.

The batteries 1008 are configured to be maintained at between a lower SoC limit and an upper SoC limit. In one embodiment, the lower SoC limit is 20% of the maximum SoC and the upper SoC limit is 93% of the maximum SoC. In some embodiments, the lower SoC limit is greater than or less than 20% (e.g., 5%, 10%, 15%, 25%, etc.). In some embodiments, the upper SoC limit may be greater than or less than 93% (e.g., 88%, 90%, 95%, etc.).

The ESS 1000 can include a charge controller 1012 structured to control the flow of electrical energy into the batteries 1008 using a charge profile. The charge profile instituted by the charge controller 1012 may be dependent on the battery 1008 chemistry and other considerations. In some embodiments, the energy storage capacity may be defined as the amount of energy available between the lower SoC limit and the upper SoC limit.

Figure 25:
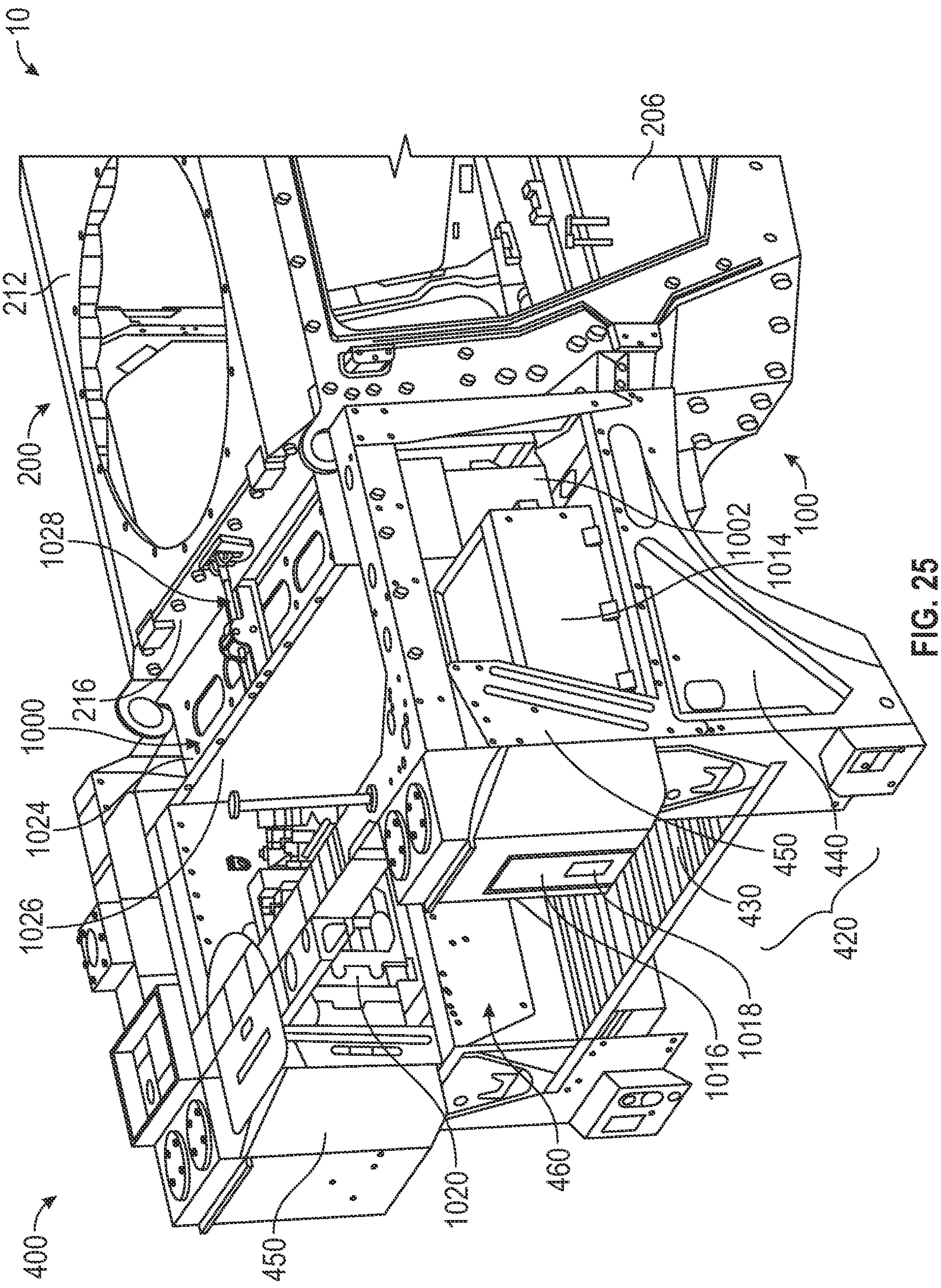
FIG. 25 is a rear perspective view of the vehicle of FIG. 1 including the ESS of FIG. 24, according to an exemplary embodiment.
Figure 26:
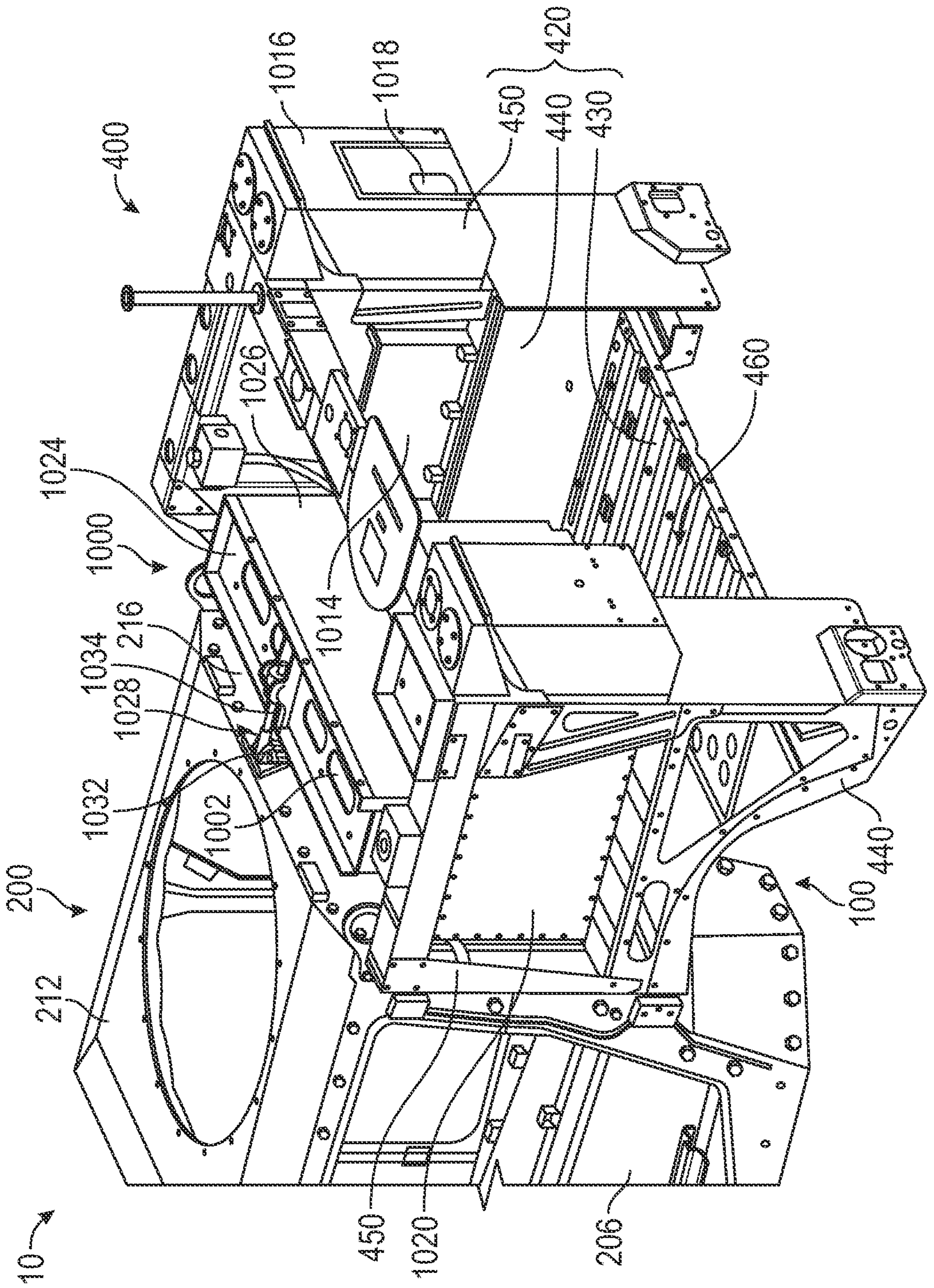
FIG. 26 is another rear perspective view of the vehicle of FIG. 25, according to an exemplary embodiment.

As shown in FIG. 25, power conversion hardware 1014 (e.g., a DC/DC converter) is coupled to the rear module 400 and structured to convert DC power received from either the IMG 700, the motor/generator 822, and/or the ESS 1000 and convert the DC power to power usable by the vehicle systems (e.g., 12 V, 24 V, and/or 48 V). A power panel 1016 is also coupled to the rear module 400 and provides a charging plug 1018 that can be used for plugging the ESS 1000 into an external power station for charging. Additionally, the power panel 1016 can include external power output that receive cords, plugs, or other power connections configured to provide power to external components and systems. An AC power system 1020 includes inverters that convert (i) available DC power from the IMG 700, the motor/generator 822, and/or the ESS 1000 into AC power for consumption by components of the vehicle 10 and/or external systems and/or (ii) AC power from the IMG 700 and/or the motor/generator 82 into DC power for consumption by components of the vehicle 10 and/or external systems. In some embodiments, the charging plug 1018 is an external plug positioned above the rear, driver side wheel well of the rear module 400.

TABLE 1

| Use Case | Vehicle 1 | | Vehicle 2 | | Vehicle 3 | | Idle | Fuel_Econ | 25 mph |
|---|---|---|---|---|---|---|---|---|---|
| Target Load | 68 kW | | 53 kW | | 40 kW | | 17 kW | 40 kW | 34 kW |
| Criteria | Minutes | Miles | Minutes | Miles | Minutes | Miles | Minutes | Miles | Minutes |
| Result | 22 | 13.5 | 29 | 6 | 38 | 14.5 | 90 | 22 | 44 |

In one example, the ESS 1000 includes batteries 1008 that provide 30.6 kWh of energy storage capacity and are capable of providing enough energy for a minimum pure electric vehicle (EV) drive operation (e.g., silent mobility mode) of at least 30 minutes at 25 mph (e.g., 30-35 min at 45 mph).

The battery storage housing 1002 and the batteries 1008 may have a weight of about 818.4 pounds. In some embodiments, the battery storage housing 1002 and batteries 1008 may have a weight of between about 600 pounds and about 1000 pounds. The battery storage housing 1002 may have The engine 610, the IMG 700, the motor/generator 822, the charge controller 1012, and the batteries 1008 are sized such that electrical power generation through engine drive of the IMG 700 and/or the motor/generator 822 of the FEAD 800 is greater than the power depletion through operation of the vehicle 10 in the silent mobility mode. In other words, the charge time through engine 610 generation of electrical power via the IMG 700 and/or the motor/generator 822 of the FEAD 800 is less than the depletion time in an electric vehicle drive mode (i.e., takes less time to charge than to deplete). The batteries 1008 can be charged in a first time by the motor generator (e.g., the motor generator 822 and/or the IMG 700). The batteries 1008 are depleted in the silent mobility mode in a second time. The first time is less than the second time.

In some embodiments, the vehicle 10 is structured to operate in any combination of engine 610 powered, IMG 700 powered, motor/generator 822 powered, engine 610 charging the ESS 1000, etc. For example, a blended power mode can include propulsion of the vehicle 10 via both electrical power and engine generated power. The engine 610 can charge the ESS 1000 while the vehicle 10 is driving or stationary.

Between-the-Wheels Configuration

As shown in FIGS. 25-30, the ESS 1000 is mounted in the bed cavity 460 of the rear module 400 adjacent the rear wall 216 of the passenger capsule 200 in between the wheel wells 440. A bracket 1024 supports the ESS 1000 in position and includes a protective plate 1026 that shields the ESS 1000 from impact. The protective plate 1026 may surround the ESS 1000 to provide protection from vulnerable directions. The bracket 1024 may include a vibration damping material disposed between the bracket 1024, the protective plate 1026, and the ESS 1000 to inhibit vibrational transfer between the hull and frame assembly 100 and the ESS 1000. In some embodiments, the protective plate 1026 is formed from similar materials to the body or frame of the vehicle 10 to inhibit the intrusion of hostile fragments, blasts, or projectiles.

The bracket 1024 is mounted to the vehicle 10 with an upper isolator mount 1028 that is connected between the bracket 1024 and the passenger capsule 200. In some embodiments, the upper isolator mount 1028 is generally centered on the bracket 1024 and connected to the rear wall 216 of the passenger capsule 200. The upper isolator mount 1028 provides front-to-back vibration isolation relative to the passenger capsule 200. In some embodiments, the upper isolator mount 1028 includes a spring damper shock system coupled between the bracket 1024 and the passenger capsule 200. In some embodiments, the upper isolator mount 1028 includes a pneumatic damper or a hydraulic fluid damper. In some embodiments, the upper isolator mount 1028 is coupled between the bracket 1024 and another portion of the vehicle 10 and/or the hull and frame assembly 100. In some embodiments, the upper isolator mount 1028 includes a plate 1032 rigidly coupled to the passenger capsule 200 (e.g., by welding, fastening, etc.) and a rod 1034 coupled to the plate 1032 with a spherical rod end. The rod 1034 is fastened to the bracket 1024 using a nut, a weld, or a captured end. In some embodiments, the ESS 1000 includes a plurality of the upper isolator mounts 1028.

Figure 27:
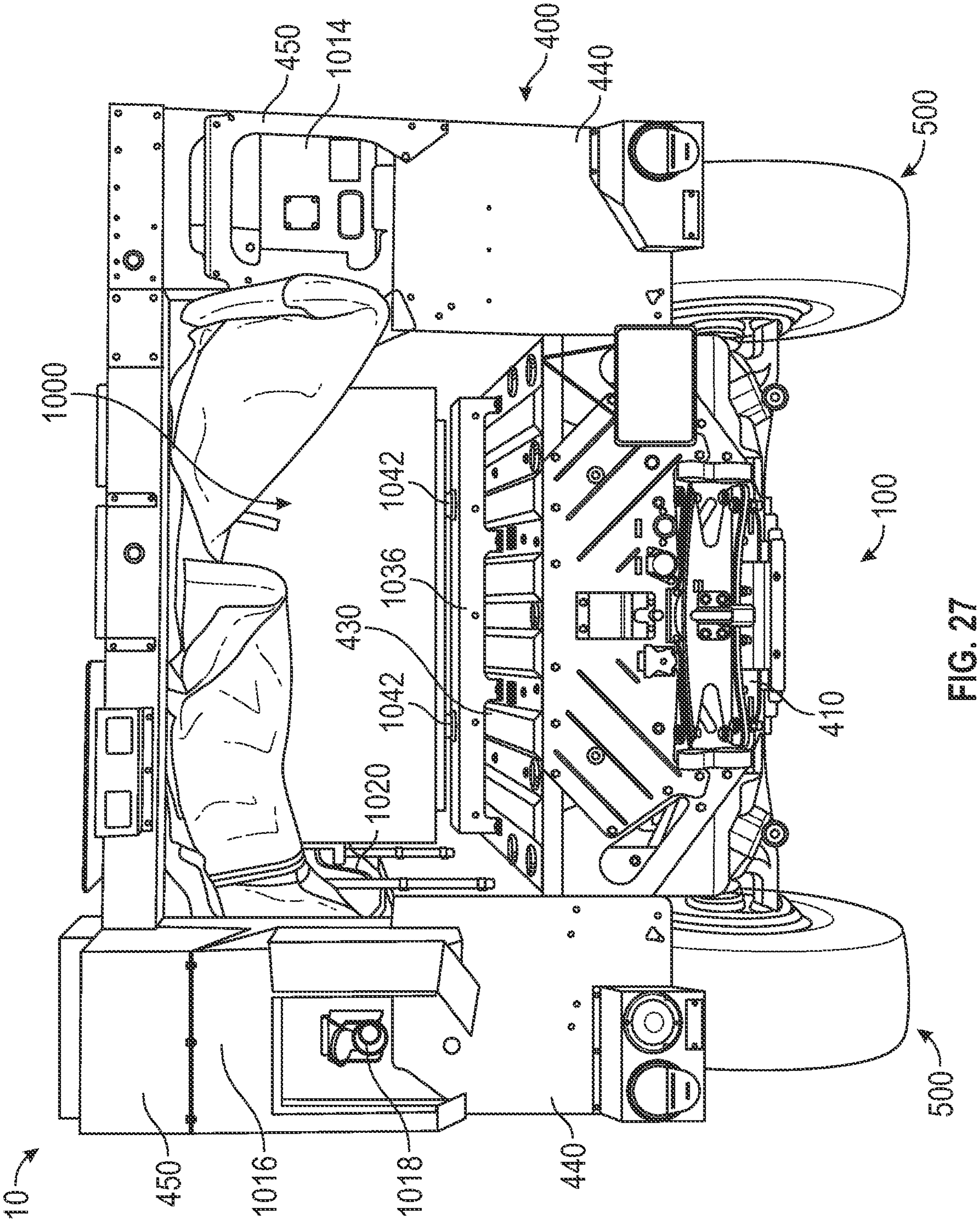
FIG. 27 is a rear view of the vehicle of FIG. 25 having a bed cavity, according to an exemplary embodiment.
Figure 28:
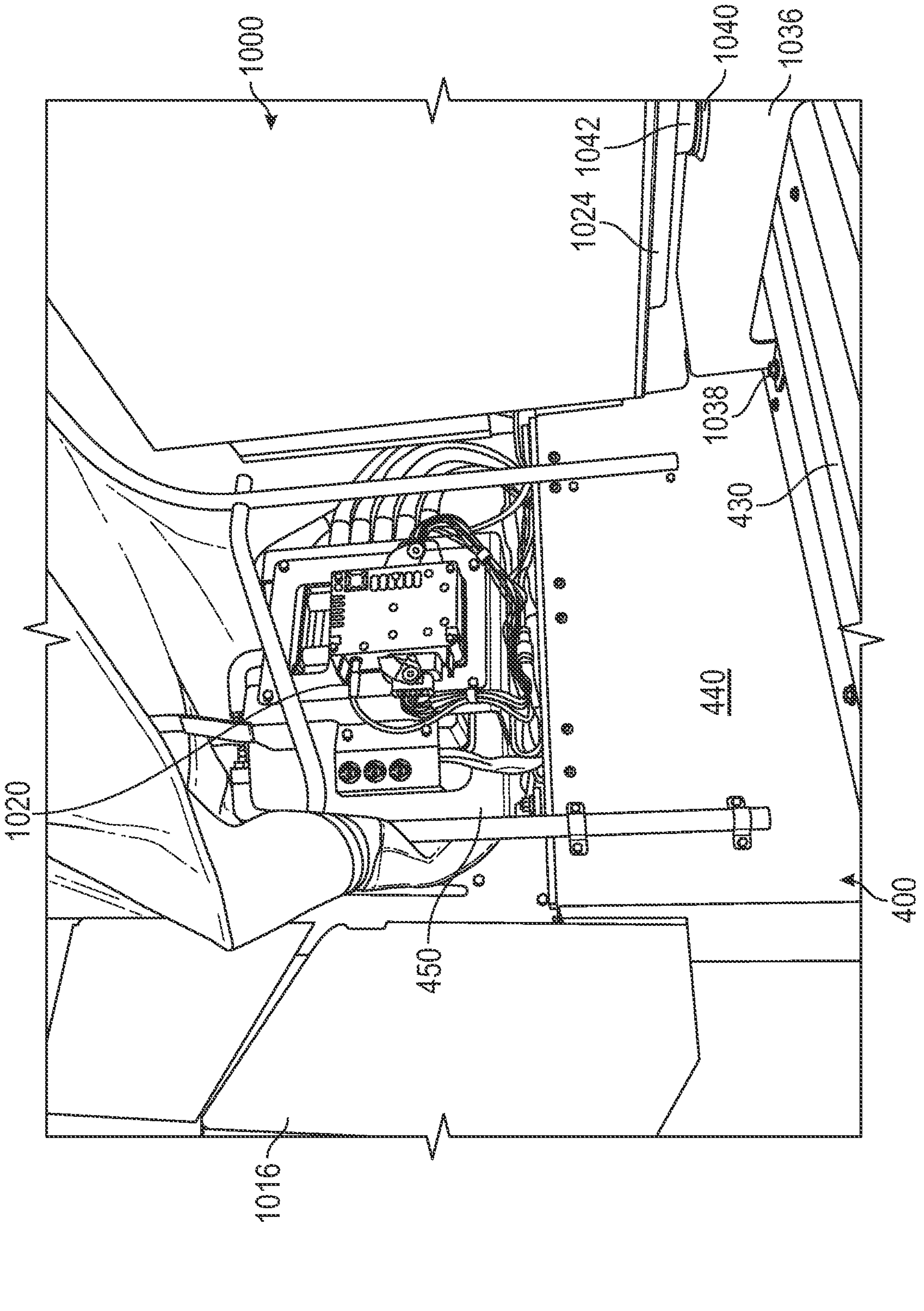
FIG. 28 is a detailed perspective view of the bed cavity of FIG. 27, according to an exemplary embodiment.
Figure 29:
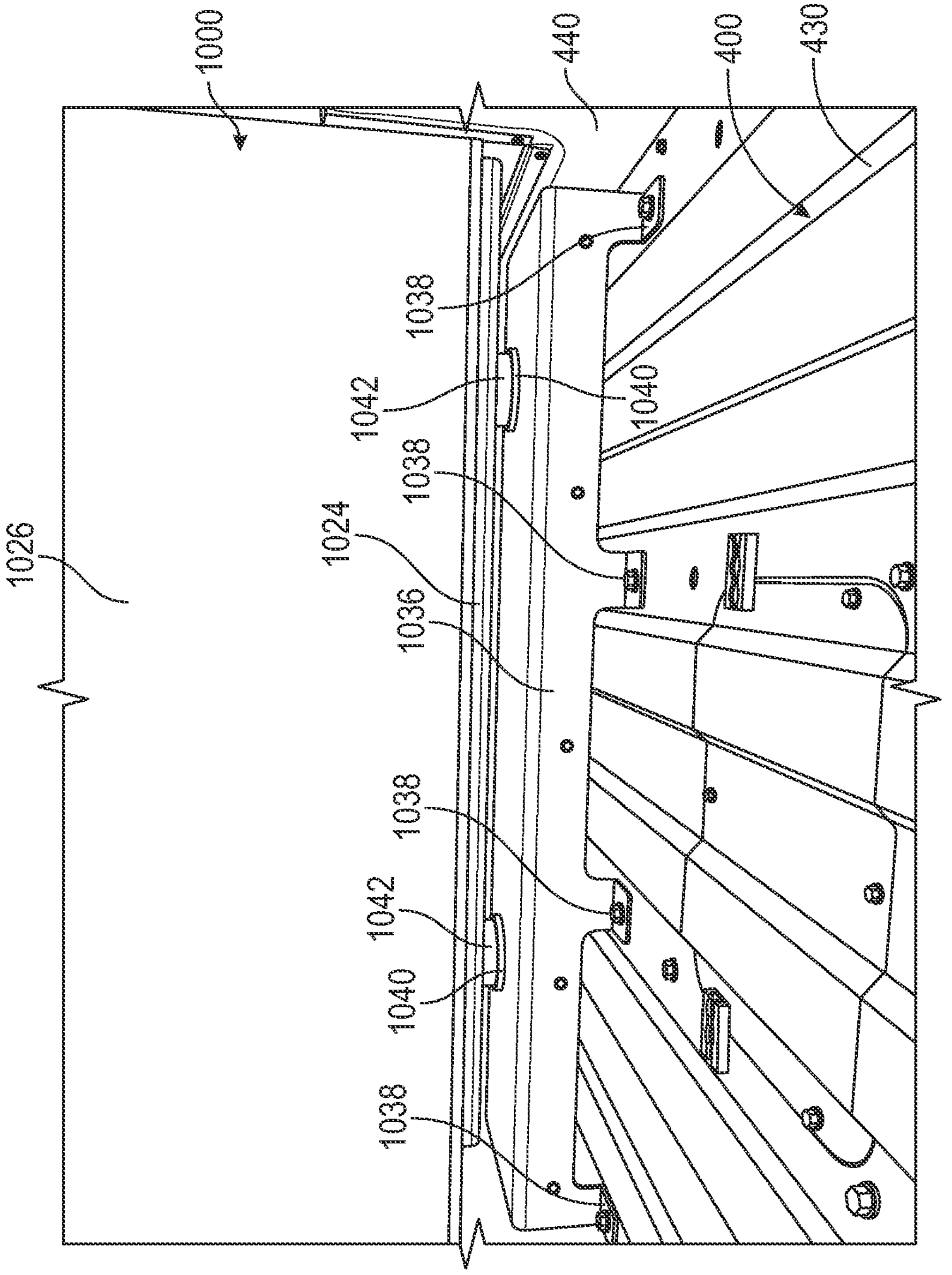
FIG. 29 is another detailed perspective view of the bed cavity of FIG. 27, according to an exemplary embodiment.
Figure 30:
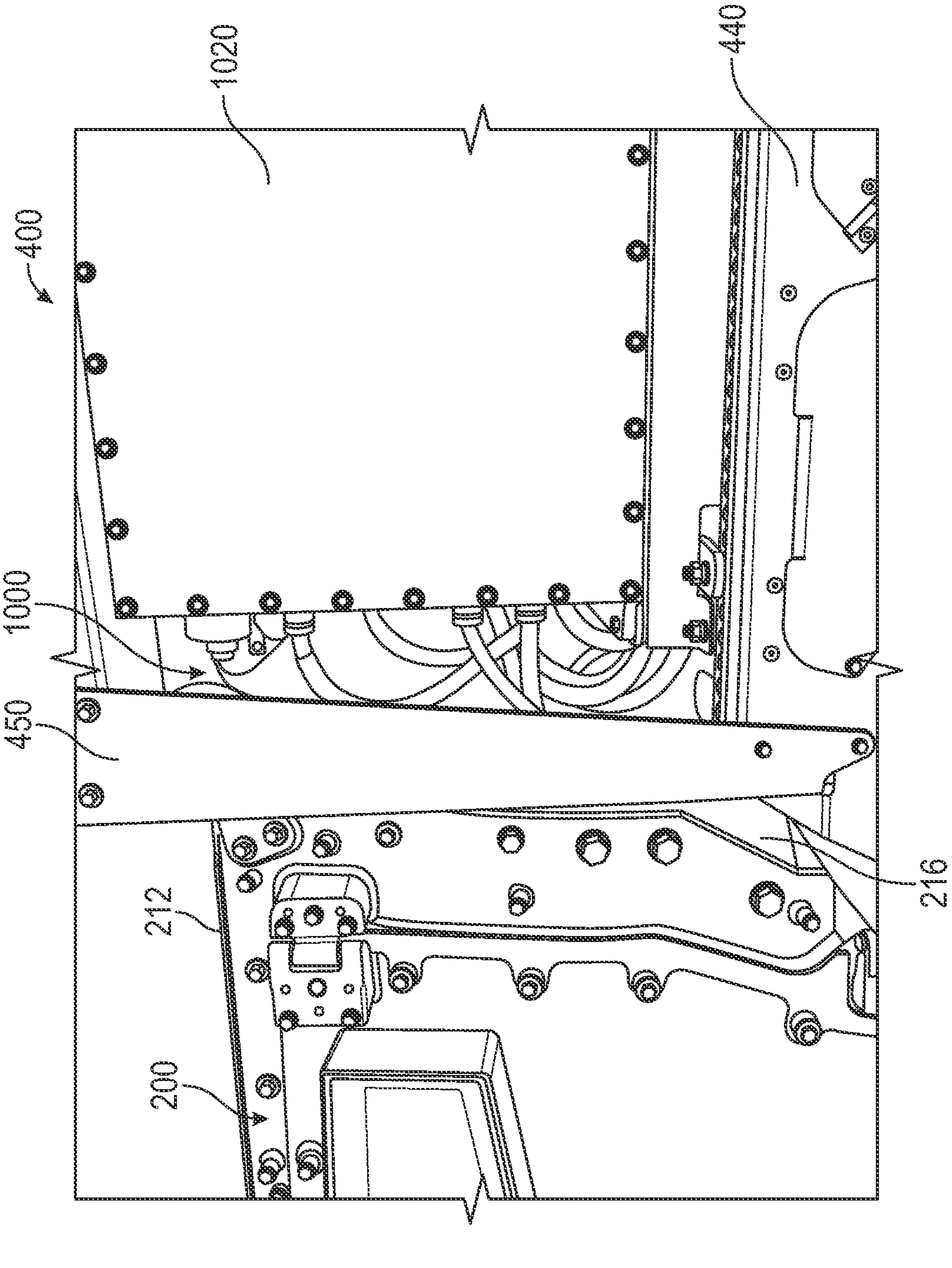
FIG. 30 is a detailed perspective view of a rear portion of the vehicle of FIG. 25, according to an exemplary embodiment.

As shown in FIGS. 27-29, a lower support 1036 is coupled to the bed 430. For example, four legs 1038 are coupled to the bed 430 using fasteners. In some embodiments, more than four or less than four legs 1038 are included. In some embodiments, the lower support 1036 is welded to the bed 430 or formed as a part of the bed 430. The lower support 1036 includes ESS mount structures in the form of recesses 1040 sized to receive lower isolator mounts 1042. In some embodiments, the recesses 1040 are circular and the lower isolator mounts 1042 are secured using adhesive. In some embodiments, the recesses are square, rectangular, oval, or another shape. In some embodiments, the lower isolator mounts 1042 are fastened to the recesses 1040, captured within the recesses 1040, or otherwise held in place between the bracket 1024 and the lower support 1036. As shown in FIG. 29, two lower isolator mounts 1042 are used to support the bracket 1024 on the lower support 1036. In some embodiments, more than two or less than two lower isolator mounts 1042 are included. In some embodiments, the lower isolator mounts 1042 are rubber or another vibration attenuating material. In some embodiments, the bracket 1024 is adhered, fastened to, captured by, or otherwise directly coupled to the lower isolator mounts 1042.

The upper isolator mount 1028 and the lower isolator mounts 1042 maintain the bracket 1024, and thereby the ESS 1000, in position relative to the passenger capsule 200 and the rear module 400 during use of the vehicle 10. The ESS 1000 is positioned within the rear module 400. The weight of the ESS 1000 is supported by the rear subframe 410. The ESS 1000 is centered between the wheel wells 440 within the bed cavity 460 and supported on top of the bed 430.

In some embodiments, the AC power system 1020 (e.g., a high voltage inverter) and power distribution components are positioned in or above driver side stowage box 450 above the rear, driver side wheel well 440 with cables running to through the tunnel slot 208 of the structural tunnel 206 to the IMG 700, the motor/generator 822 of the FEAD 800, and other high voltage components. The power conversion hardware 1014 (700V to 24V) is positioned in or above the passenger side stowage box 450 above the rear, passenger side wheel well 440 and cables run therefrom to low voltage components (e.g., cab electronics, etc.).

Over-the-Wheels Configuration

Figure 32:
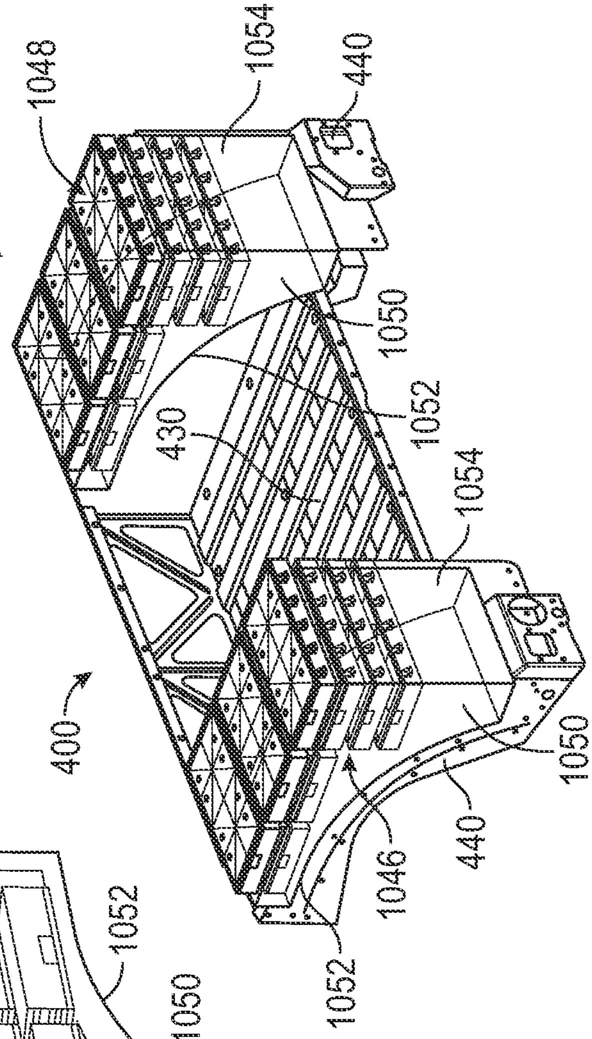
FIGS. 31 and 32 are various views of a portion of the vehicle of FIG. 1 including the ESS of FIG. 24, according to another exemplary embodiment.
Figure 31:
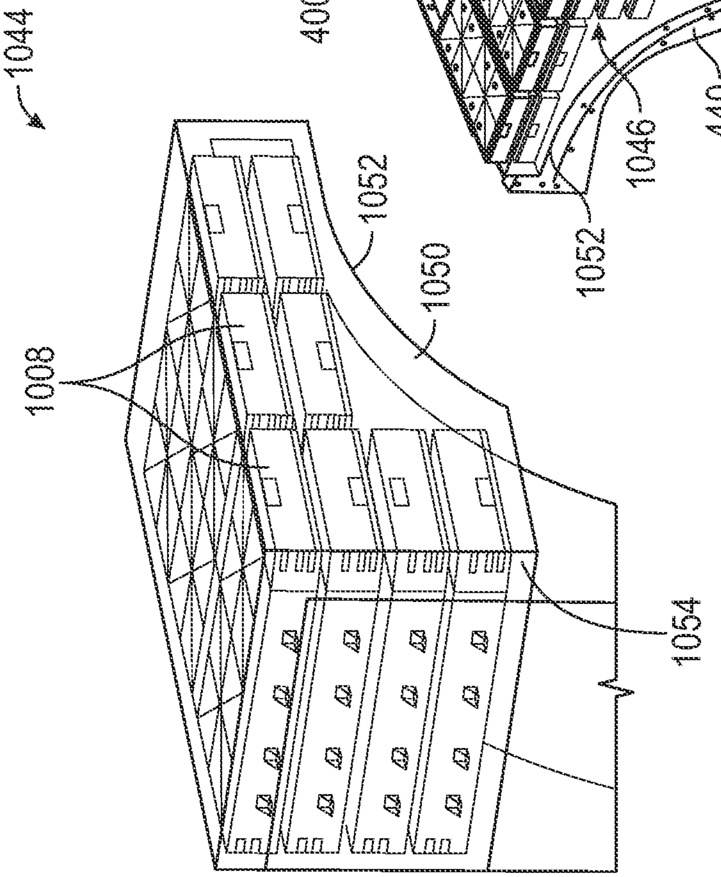

As shown in FIGS. 31 and 32, an ESS 1044 is structured to be supported above the wheel wells 440 of the rear module 400. In some embodiments, the ESS 1044 includes a first battery set 1046 positioned above a driver side wheel well 440 and/or a second battery set 1048 positioned above the passenger side wheel well 440. Each of the first battery set 1046 and the second battery set 1048 can include multiple batteries 1008 or multiple battery cells and be sized as discussed above in the cumulative (i.e., both battery sets) to provide the desired energy storage capacity.

The weight of the ESS 1044 is supported by the rear subframe 410. In some embodiments, the battery sets 1046, 1048 do not occupy space directly above the bed 430 or within the bed cavity 460. In some embodiments, the first battery set 1046 and/or the second battery set 1048 are additionally or alternatively positioned within the stowage boxes 450 above the wheel wells 440.

In some embodiments, the first battery set 1046 and the second battery set 1048 each include a housing 1050 having a curved surface 1052 shaped to conform to the wheel wells 440. The housing 1050 defines an internal volume sized to receive the batteries 1008. In some embodiments, the housing 1050 defines a rear portion 1054 with a substantially rectangular cross-section that is sized to accommodate one or more batteries 1008. In other words, the rear portion 1054 is positioned aft of the wheel well 440 and defines an area at least as big as a single battery 1008.

In some embodiments, the first battery set 1046 and the second battery set 1048 are fastened to the wheel wells 440. In some embodiments, the first battery set 1046 and the second battery set 1048 are formed as a part of the wheel wells 440 or the rear module 400 (e.g., the housing 1050 is formed as a part of the rear module 400). In some embodiments, the first battery set 1046 and the second battery set 1048 are held to the rear module 400 using brackets, welds, isolator mounts, vibrational dampers, or other rigid connections.

Under Cab Configuration

Figure 33:
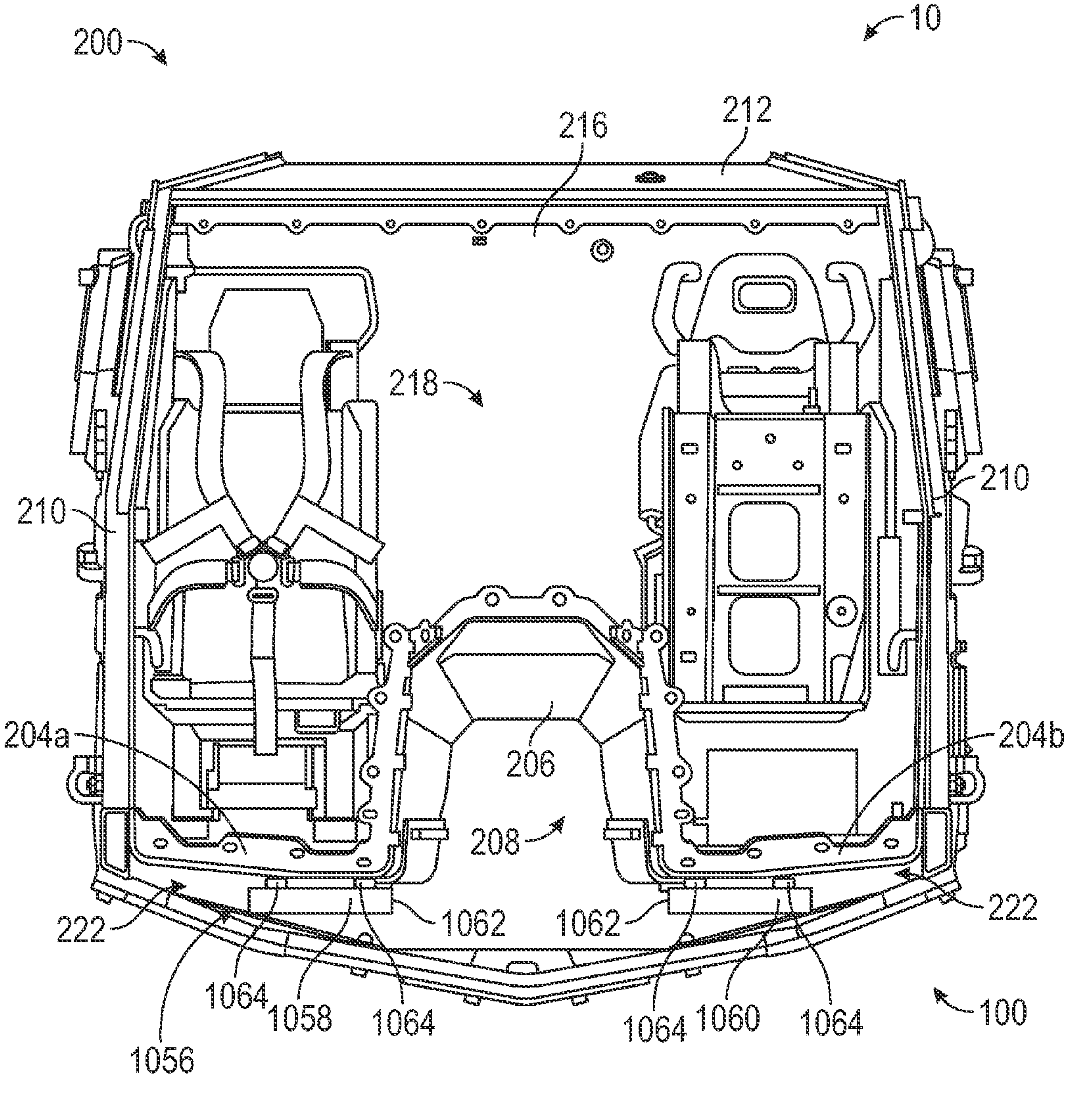
FIG. 33 is a section view of the vehicle of FIG. 1 including the ESS of FIG. 24, according to another exemplary embodiment.

As shown in FIG. 33, an ESS 1056 includes a first battery set 1058 and/or a second battery set 1060 coupled to the floor portions 204 of the passenger capsule 200 and positioned laterally outside of the structural tunnel 206 and spaced above the v-shaped belly deflector 220 within the air gap 222. Each of the first battery set 1058 and the second battery set 1060 includes a housing 1062 coupled to the floor portion 204 with isolator mounts 1064. In some embodiments, the housings 1062 are coupled to the v-shaped belly deflector 220 via isolator mounts in addition to, or as a replacement for, the isolator mounts 1064. In some embodiments, the housing 1062 includes a resilient bottom material to inhibit damage from impacts from below. For example, if the v-shaped belly deflector 220 is damaged, the housing 1062 can be structured to protect the ESS 1056 from damage. In some embodiments, the housing 1062 is formed from the same material as the v-shaped belly deflector 220. In some embodiments, the housing 1062 has a shape corresponding to the air gap 222 to substantially fill the air gap 222 and maximize the amount of battery capacity of the ESS 1056 within the air gap 222.

The weight of the ESS 1056 is carried by the hull and frame assembly 100 and/or the passenger capsule 200. In some embodiments, the weight of the ESS 1056 is supported by the floor portion 204 of the passenger capsule 200. Each of the first battery set 1058 and the second battery set 1060 can include multiple batteries 1008 or multiple battery cells and be sized as discussed above in the cumulative (i.e., both battery sets) to provide the desired energy storage capacity.

The position of the ESS 1056 below the floor portion 204 provides a low center of gravity. In some embodiments, the weight of the ESS 1056 is substantially all below the natural center of gravity of the vehicle 10 and the addition of the ESS 1056 lowers the center of gravity of the vehicle 10. In some embodiments, the ESS 1056 extends longitudinally along the length of the passenger capsule 200 and provides fore-aft stability ballast.

Extended Wheelbase Configuration

Figure 34:
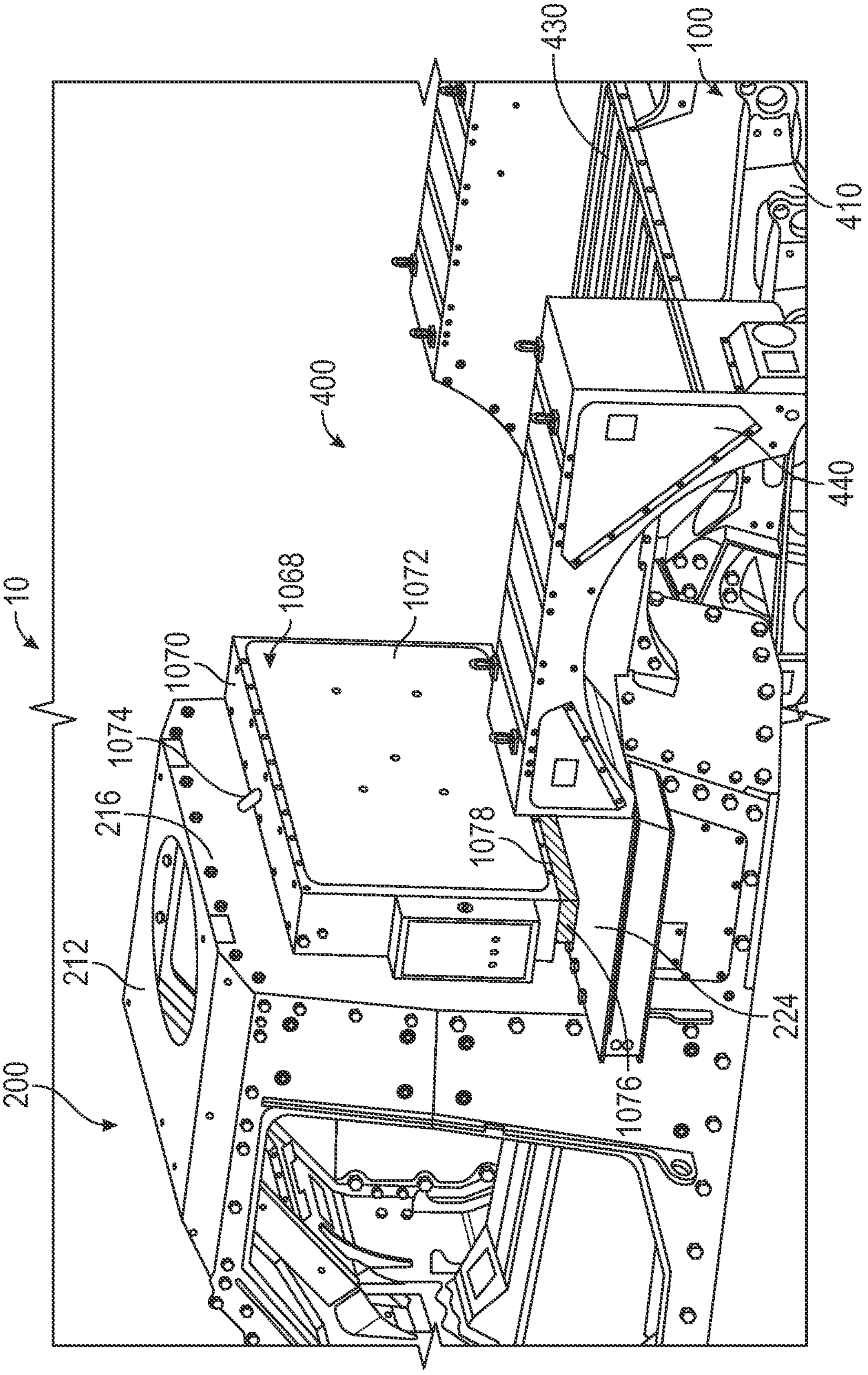
FIG. 34 is a perspective view of the vehicle of FIG. 8 including the ESS of FIG. 24, according to an exemplary embodiment.
Figure 35:
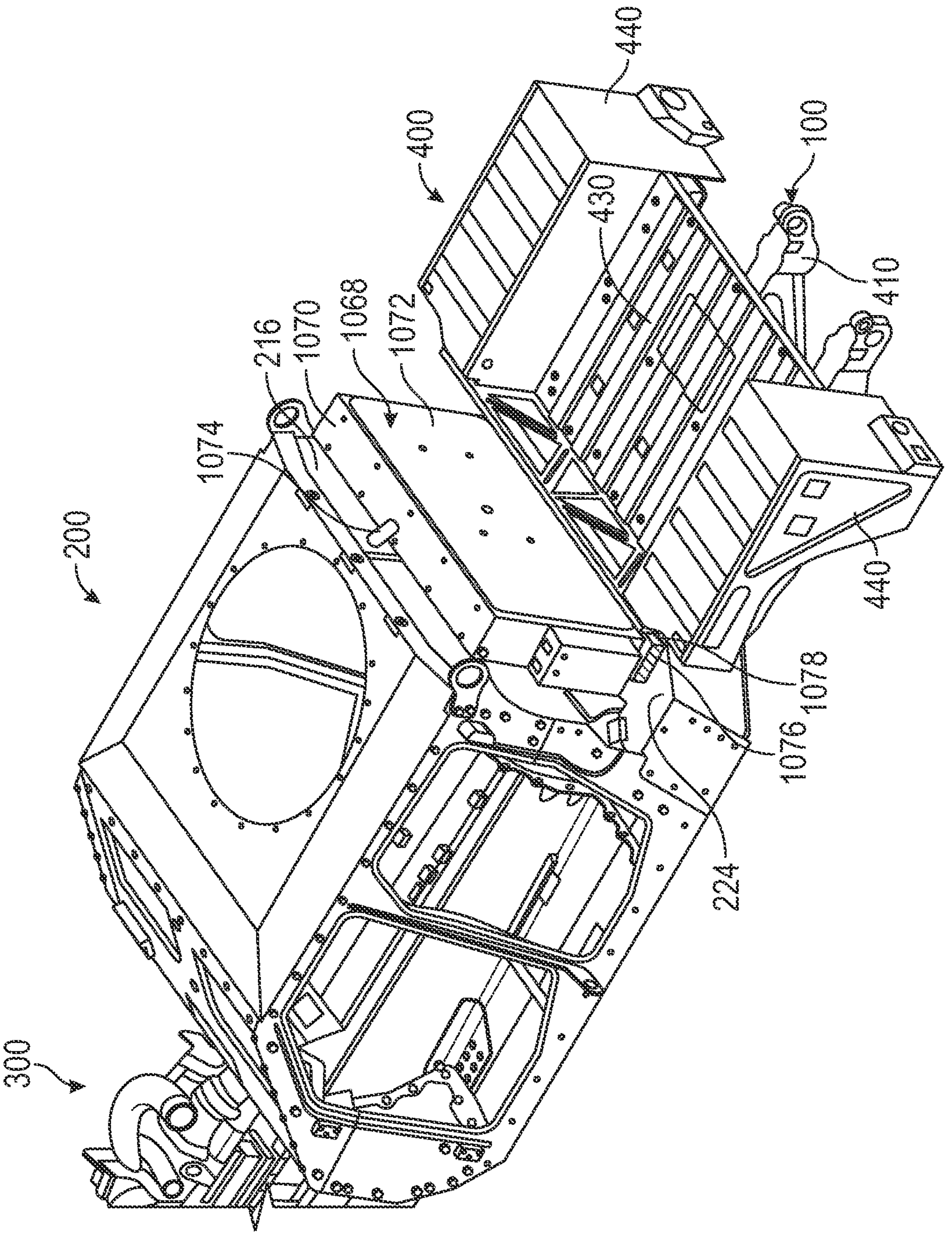
FIG. 35 is a perspective view of the vehicle of FIG. 7 including the ESS of FIG. 24, according to an exemplary embodiment.

As shown in FIGS. 34 and 35, an ESS 1068 is mounted on the capsule extension 224 of the passenger capsule 200 in between the rear wall 216 of the passenger capsule 200 and in front of the cargo body assembly 420. In some embodiments, a bracket 1070 supports the ESS 1068 in position and includes a protective plate 1072 that shields the ESS 1068 from impact. The protective plate 1072 may surround the ESS 1068 to provide protection from vulnerable directions (e.g., the rear and sides). The bracket 1070 may include a vibration damping material disposed between the bracket 1070, the protective plate 1072, and the ESS 1068 to inhibit vibrational transfer between the hull and frame assembly 100 and the ESS 1068. In some embodiments, the protective plate 1072 is formed from, similar materials to the body or frame of the vehicle 10 to inhibit the intrusion of hostile fragments, blasts, or projectiles.

The bracket 1070 is mounted to the vehicle 10 with an upper isolator mount 1074 that is connected between the bracket 1070 and the passenger capsule 200. In some embodiments, the upper isolator mount 1074 is generally centered on the bracket 1070 and connected to the rear wall 216 of the passenger capsule 200. The upper isolator mount 1074 provides front-to-back vibration isolation relative to the passenger capsule 200. In some embodiments, the upper isolator mount 1074 includes a spring damper shock system coupled between the bracket 1070 and the passenger capsule 200. In some embodiments, the upper isolator mount 1074 includes a pneumatic damper or a hydraulic fluid damper. In some embodiments, the upper isolator mount 1074 is coupled between the bracket 1070 and another portion of the vehicle 10 and/or the hull and frame assembly 100. In some embodiments, the upper isolator mount 1074 includes a plate rigidly coupled to the passenger capsule 200 (e.g., by welding, fastening, etc.) and a rod coupled to the plate with a spherical rod end. The rod is fastened to the bracket 1070 using a nut, a weld, or a captured end. In some embodiments, the ESS 1068 includes a plurality of the upper isolator mounts 1074.

A lower support 1076 is coupled to the capsule extension 224. For example, four legs are coupled to the capsule extension 224 using fasteners. In some embodiments, more than four or less than four legs are included. In some embodiments, the lower support 1076 is welded to the capsule extension 224 or formed as a part of the capsule extension 224. The lower support 1076 includes ESS mount structures in the form of recesses sized to receive lower isolator mounts 1078. In some embodiments, the recesses are circular and the lower isolator mounts 1078 are secured therein using adhesive. In some embodiments, the recesses are square, rectangular, oval, or another shape. In some embodiments, the lower isolator mounts 1078 are fastened to the recesses, captured within the recesses, or otherwise held in place between the bracket 1070 and the lower support 1076. In some embodiments, two lower isolator mounts 1078 are used to support the bracket 1070 on the lower support 1076. In some embodiments, more than two or less than two lower isolator mounts 1078 are included. In some embodiments, the lower isolator mounts 1078 are rubber or another vibration attenuating material. In some embodiments, the bracket 1070 is adhered, fastened to, captured by, or otherwise directly coupled to the lower isolator mounts 1078.

The upper isolator mount 1074 and the lower isolator mounts 1078 maintain the bracket 1070, and thereby the ESS 1068, in position relative to the passenger capsule 200 and the rear module 400, and on the capsule extension 224 during use of the vehicle 10. The ESS 1068 is positioned outside the rear module 400 (and the bed cavity 460 thereof) and is supported by the passenger capsule 200 and the hull and frame assembly 100. The weight of the ESS 1068 is supported by the capsule extension 224. The ESS 1068 may be centered between the wheel wells 440 or extend beyond the wheel wells 440.

In some embodiments, the extended wheel base utilizing the capsule extension 224 provides a fifteen inch gap between rear wall 216 and the rear module 400. In other words, the capsule extension 224 has a longitudinal length of at least fifteen inches. In some embodiments, the longitudinal length of the capsule extension 224 is less than or greater than fifteen inches. The longitudinal length of the capsule extension 224 accommodates the ESS 1068. In other words, the thickness of the ESS 1068 is equal to or less than the longitudinal length of the capsule extension 224.

The position of the ESS 1068 on the capsule extension 224 forward of the rear module 400 moves the center of gravity of the vehicle 10 toward to true center of the vehicle 10 and can improve handling characteristics of the vehicle 10 and overall vehicle stability. Additionally, the ESS 1068 is not positioned within the bed cavity 460 thereby providing a larger storage capacity of the rear module 400.

False Floor Configuration

Figure 36:
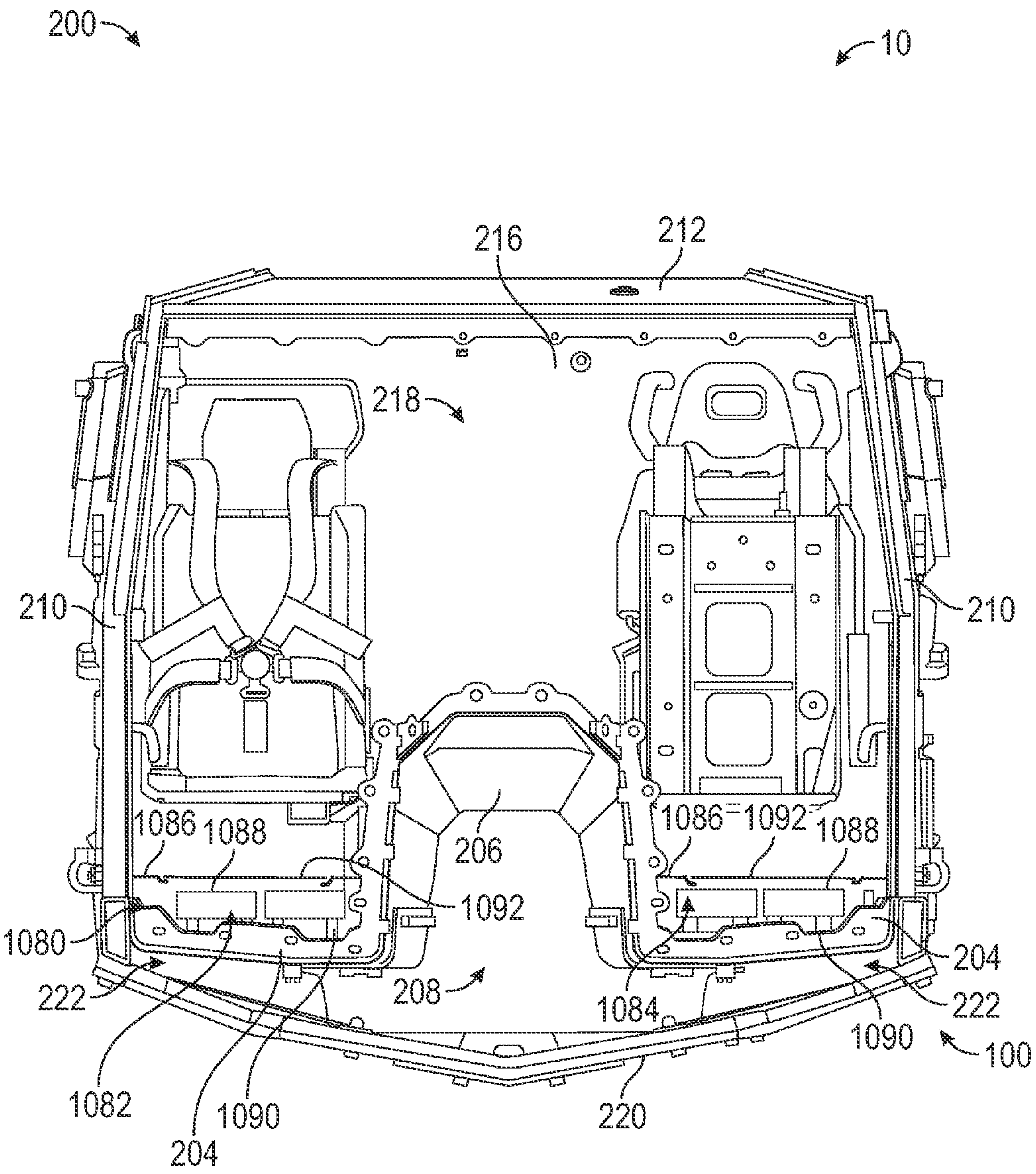
FIG. 36 is a section view of the vehicle of FIG. 1 including the ESS of FIG. 24, according to another exemplary embodiment.

As shown in FIG. 36, an ESS 1080 includes a first battery set 1082 and/or a second battery set 1084 coupled to the floor portions 204 of the passenger capsule 200 laterally outside of the structural tunnel 206 and spaced above the floor portions 204 and under a false floor 1086. Each of the first battery set 1082 and the second battery set 1084 includes a housing 1088 coupled top the floor portion 204 with isolator mounts 1090. In some embodiments, the housings 1088 are coupled to the false floor 1086 via isolator mounts in addition to, or as a replacement for, the isolator mounts 1090. In some embodiments, the housing 1088 is formed from the same material as the v-shaped belly deflector 220 and/or the floor portion 204.

The false floor 1086 includes a door or removable panel 1092 that provides access to the ESS 1080 from within the passenger compartment 218 of the passenger capsule 200. In some embodiments, the removable panel 1092 is a plate that is fastened in place. In some embodiments, the removable panel 1092 is hingedly coupled to the false floor 1086. In some embodiments, the removable panel 1092 is locked in place with a key.

The weight of the ESS 1080 is carried by the hull and frame assembly 100 and/or the passenger capsule 200. In some embodiments, the weight of the ESS 1080 is supported by the floor portion 204 of the passenger capsule 200. Each of the first battery set 1082 and the second battery set 1084 can include multiple batteries 1008 or multiple battery cells and be sized as discussed above in the cumulative (i.e., both battery sets) to provide the desired energy storage capacity.

The position of the ESS 1080 adjacent the floor portion 204 provides a low center of gravity. In some embodiments, the weight of the ESS 1080 is substantially all below the natural center of gravity of the vehicle 10 and the addition of the ESS 1080 lowers the center of gravity of the vehicle 10. In some embodiments, the ESS 1080 extends longitudinally along the length of the passenger capsule 200 and provides fore-aft stability ballast.

In some embodiments, the ESS 1000, the ESS 1044, the ESS 1056, the ESS 1068, and/or the ESS 1080 are used in combination.

Controls

Figure 37:
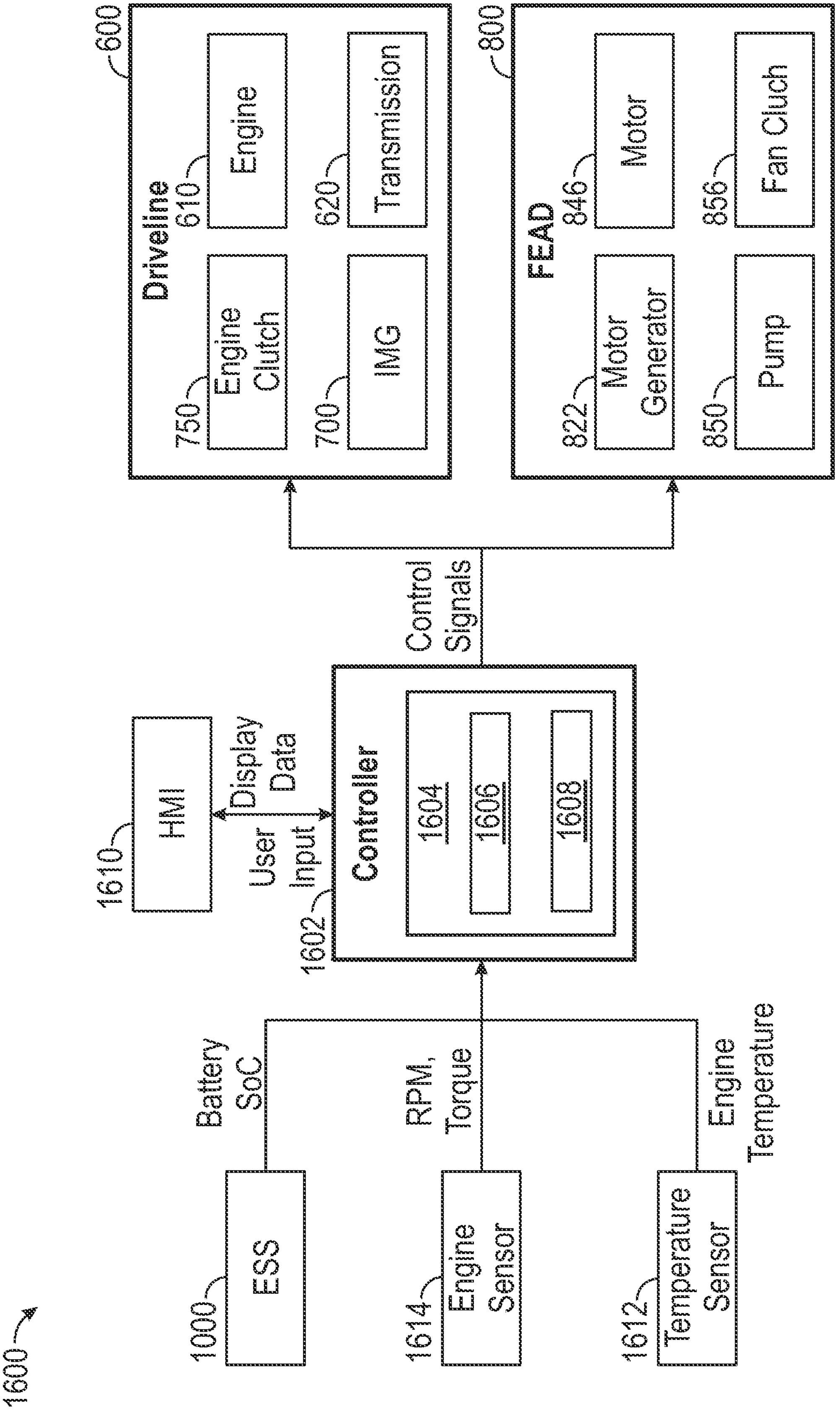
FIG. 37 is a block diagram of a control system for the vehicle of FIG. 1, according to an exemplary embodiment.
Figure 38:
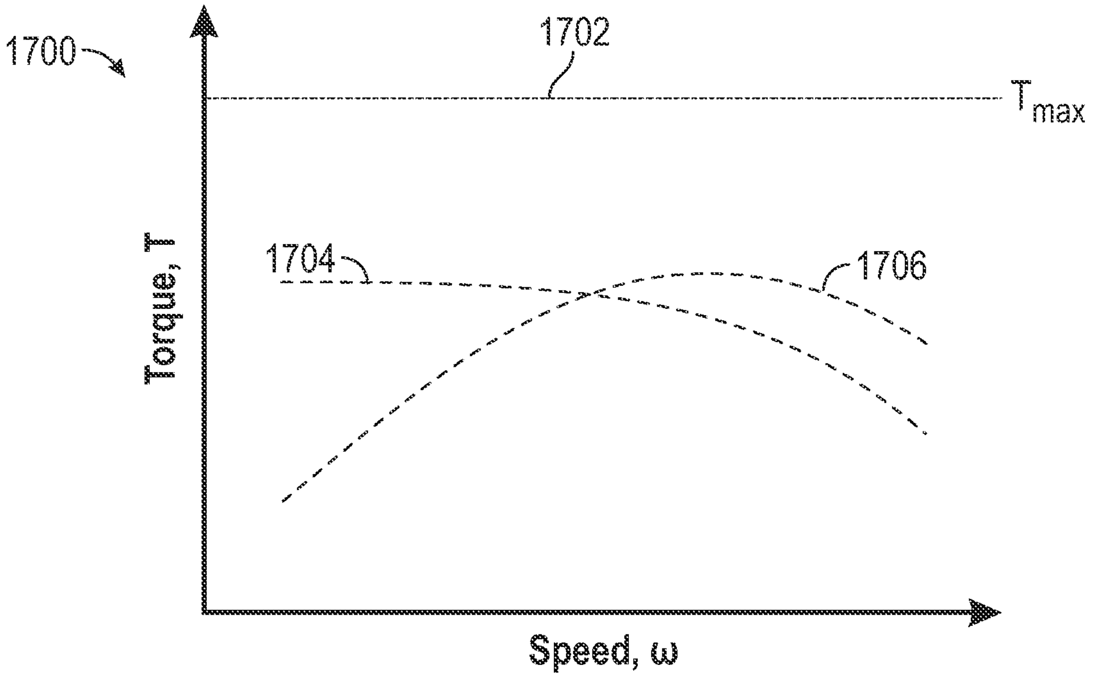
FIG. 38 is a graph showing torque versus speed for an internal combustion engine and an electric motor, the graph including a maximum torque as defined by a transmission of the driveline of FIG. 9, according to an exemplary embodiment.
Figure 39:
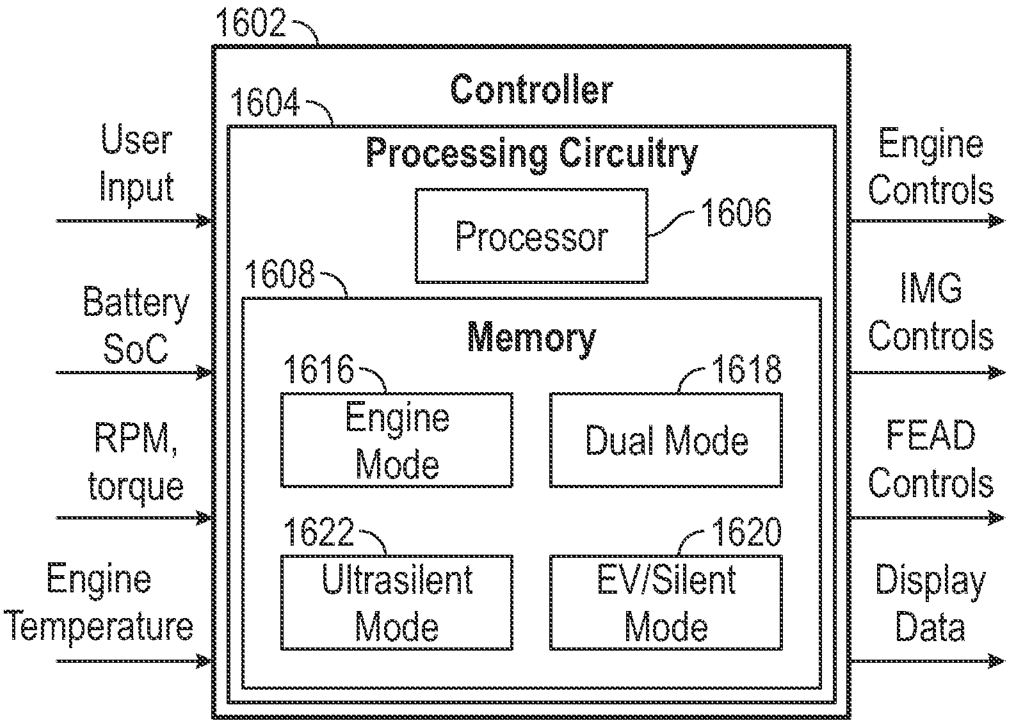
FIG. 39 is a block diagram of a controller of the control system of FIG. 37, according to an exemplary embodiment.

Referring to FIGS. 37-39, the vehicle 10 can include a control system 1600 for controlling the vehicle 10 or systems of the vehicle 10 between and according to different modes of operation. In some embodiments, the vehicle 10 is operable in an engine mode, a dual-drive mode, an EV/silent mode, and/or an ultrasilent mode. The control system 1600 includes a controller 1602 configured to transition the vehicle 10 between the different modes. According to exemplary embodiment, the control system 1600 is configured to provide control signals to the driveline 600 (e.g., the engine 610, the transmission 620, the IMG 700, the FEAD 800, etc.) to transition the driveline 600 and the FEAD 800 between the different modes.

As shown in FIG. 37, the control system 1600 includes the controller 1602, an operator interface, shown as human machine interface ("HMI") 1610, the ESS 1000 (and/or sensors or controllers of the ESS 1000), a temperature sensor 1612, and an engine sensor 1614. The ESS 1000 is configured to provide detected battery SoC of batteries or energy storage devices of the ESS 1000 to the controller 1602. The engine sensor 1614 can be a sensor of the engine 610, feedback from a controller of the engine 610, etc. to provide current speed ω of the engine 610 (e.g., revolutions per minute "RPM") and/or current torque r of the engine 610. The temperature sensor 1612 is configured to provide a detected, measured, or sensed temperature of the engine 610 and/or of other components of the vehicle 10 (e.g., the ESS 1000, the transmission 620, etc.) to the controller 1602. The HMI 1610 is configured to receive a user input and provide the user input to the controller 1602 (e.g., a selection of a specific mode). The controller 1602 is configured to use any of the battery SoC, the current speed ω of the engine 610, the current torque r of the engine 610, the temperature of the engine 610 (or other components), and/or the user input to transition the vehicle 10 (e.g., the driveline 600 and the FEAD 800) between the different modes, and to operate the vehicle 10 (e.g., the driveline 600 and the FEAD 800) according to the different modes. The HMI 1610 can be positioned within the passenger compartment 218 of the passenger capsule 200 of the vehicle 10.

As shown in FIGS. 37 and 39, the controller 1602 includes a processing circuit 1604 including a processor 1606 and memory 1608. The processing circuit 1604 can be communicably connected to a communications interface such that the processing circuit 1604 and the various components thereof can send and receive data via the communications interface. The processor 1606 can be implemented as a general purpose processor, an application specific integrated circuit ("ASIC"), one or more field programmable gate arrays ("FPGAs"), a group of processing components, or other suitable electronic processing components.

The memory 1608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 1608 can be or include volatile memory or non-volatile memory. The memory 1608 can include database components, object code components, script components, or any other type of information structure for supporting the various activities and information structures described in the present application. According to some embodiments, the memory 1608 is communicably connected to the processor 1606 via the processing circuit 1604 and includes computer code for executing (e.g., by the processing circuit 1604 and/or the processor 1606) one or more processes described herein.

As shown in FIG. 39, the memory 1608 includes an engine mode 1616, a dual-drive mode 1618, an EV/silent mode 1620, and an ultrasilent mode 1622, according to an exemplary embodiment. The processing circuit 1604 is configured to transition between the different modes and operate the vehicle 10 according to an active one of the engine mode 1616, the dual-drive mode 1618, the EV/silent mode 1620, or the ultrasilent mode 1622. The controller 1602 may transition between the modes in response to a user input, or at least partially automatically (e.g., based on sensor data). The controller 1602 generates engine control signals for the engine 610, the engine clutch 750, and/or the transmission 620, IMG control signals for the IMG 700, FEAD control signals for the FEAD 800 or controllable components thereof, and display data for the HMI 1610 according to the active one of the modes 1616-1622. The HMI 1610 can be or include any of a display screen, a touch screen, input buttons, levers, a steering wheel, a joystick, alert lights, alert speakers, etc., or any other component configured to facilitate input of data from the user to the controller 1602 or output of data from the controller 1602 to the HMI 1610.

Engine Mode

According to an exemplary embodiment, the control system 1600 is configured to operate the vehicle 10 according to the engine mode 1616. In some embodiments, the controller 1602 transitions the vehicle 10 into the engine mode 1616 when a user input is received from the HMI 1610 to operate the vehicle 10 according to the engine mode 1616. In some embodiments, the engine mode 1616 is a default mode of operation of the vehicle 10.

When the vehicle 10 is operated by the controller 1602 according to the engine mode 1616, control signals are generated by the controller 1602 and provided to the driveline 600 so that the engine 610 operates to drive the driveline 600 through the IMG 700 and the transmission 620. The controller 1602 can also provide control signals to the IMG 700 so that the IMG 700 functions as a generator, is driven by the engine 610, and generates electrical energy that is provided to the ESS 1000 for storage, and/or provided to electrical components of the vehicle 10 for consumption. The engine 610 also drives the FEAD 800 in the engine mode 1616, according to some embodiments. In some embodiments, in the engine mode 1616, the controller 1602 is configured to provide control signals to the motor/generator 822 of the FEAD 800 such that the motor/generator 822 functions as a generator and is driven by the engine 610. The motor/generator 822 of the FEAD 800 generates electrical energy when driven by the engine 610 and provides the electrical energy to the ESS 1000 for storage and later use, and/or provides the electrical energy to electrical components of the vehicle 10 for consumption. In the engine mode 1616, the engine 610 may therefore drive the IMG 700, the FEAD 800, and/or the transmission 620. The engine 610 drives the axle assemblies 500 or tractive elements thereof by driving the transmission 620.

The engine 610 drives the FEAD 800 and the accessories of the FEAD 800 (e.g., the hydraulic pump 832, the air compressor 808, the fan 810, the motor/generator 822). The engine 610 may also selectively drive the fan 810 through selective engagement of the fan clutch 856. In some embodiments, the controller 1602 is configured to use the engine temperature from the temperature sensor 1612 to transition the fan clutch 856 between an engaged state and a disengaged state. For example, when the engine temperature exceeds a predetermined value, the controller 1602 may transition the fan clutch 856 into the engaged state so that the fan 810 is driven by the engine 610 to cool the engine 610 (and/or other components of the vehicle 10). When the engine temperature decreases below another predetermined temperature, the controller 1602 can generate control signals for the fan clutch 856 to transition the fan clutch 856 into the disengaged state. In some embodiments, the controller 1602 is configured to operate the HMI 1610 to provide an alert or display to the user that the fan clutch 856 is about to be actuated to the engaged state. In some embodiments, the controller 1602 operates the HMI 1610 to display a current status of the fan clutch 856.

Dual-Drive Mode

According to an exemplary embodiment, the controller 1602 is configured to transition the vehicle 10 into the dual-drive mode 1618 and operate the vehicle 10 according to the dual-drive mode 1618. In another embodiment, the controller 1602 does not include the dual-drive mode 1618. In the dual-drive mode 1618, both the engine 610 and the IMG 700 operate to provide torque to tractive elements of the vehicle 10 through the transmission 620. The engine 610 and the IMG 700 can both operate to provide a maximum torque to the transmission 620 as defined by specifications or ratings of the transmission 620. In the dual-drive mode 1618, the IMG 700 and the engine 610 cooperatively operate to drive the driveline 600.

As shown in FIG. 38, a graph 1700 illustrates a maximum allowable torque 1702, an electric motor torque speed curve 1704, and an engine torque speed curve 1706. The maximum allowable torque 1702 is defined by a rating or capability of the transmission 620. When the vehicle 10 is in the dual-drive mode 1618, the controller 1602 is configured to (i) monitor torque and speed of the engine 610 (e.g., as provided by the engine sensor 1614, a defined by a predetermined torque-speed curve for the engine 610, etc.) and (ii) determine, based on the maximum allowable torque 1702 (e.g., based on a comparison between the current torque of the engine 610 and the maximum allowable torque 1702), an additional amount of torque that can be supported by the transmission 620. If the transmission 620 can support additional torque, the controller 1602 is configured to operate the IMG 700 (e.g., by generating and providing control signals to the IMG 700) to provide additional torque to the transmission 620. In some embodiments, the controller 1602 is configured to operate the IMG 700 to provide additional torque so that a combined torque output by the IMG 700 and the engine 610 is equal to or less than the maximum allowable torque 1702 supported by the transmission 620.

The dual-drive mode 1618 can be similar to the engine mode 1616 but with the additional torque provided to the transmission 620 by the IMG 700 (e.g., with the IMG 700 operating as an electric motor). In some embodiments, the IMG 700 and the engine 610 both operate to provide combined torque to the transmission 620 at a same speed. In some embodiments, the speeds of the IMG 700 and the engine 610 are different.

Advantageously, the dual-drive mode 1618 can be used when the vehicle 10 climbs a hill, when the vehicle 10 is under enemy fire, etc. to provide enhanced acceleration and gradeability. In some embodiments, the dual-drive mode 1618 includes operating the engine 610 and the IMG 700 cooperatively to consistently (e.g., over time, or when the dual-drive mode 1618 is active) provide the maximum allowable torque 1702 to the transmission 620. In some embodiments, the controller 1602 is configured to transition the vehicle 10, or more specifically the driveline 600, into the dual-drive mode 1618 in response to a user input received via the HMI 1610. In some embodiments, the controller 1602 is configured to automatically transition the driveline 600 into the dual-drive mode 1618 in response to sensor data indicating a slope, tilt, roll, or angle of the vehicle 10 (e.g., to detect when the vehicle 10 is climbing a hill and additional or assisting torque from the IMG 700 may be advantageous).

Silent Mode

According to an exemplary embodiment, the controller 1602 includes the EV/silent mode 1620 and is configured to operate the driveline 600 according to the EV/silent mode 1620 in response to receiving a user input from the HMI 1610 to operate according to the EV/silent mode 1620. In the EV/silent mode 1620, the controller 1602 is configured to generate control signals for the engine 610 and provide the control signals to the engine 610 to shut off the engine 610. Advantageously, shutting off the engine 610 reduces a sound output of the vehicle 10 to facilitate substantially quieter operation of the vehicle 10. When the engine 610 is shut off, the driveline 600 (e.g., tractive elements of the axle assemblies 500) is driven by the IMG 700. The IMG 700 can function as an electric motor, consuming electrical energy from the ESS 1000 to drive the vehicle 10 (e.g., for transportation of the vehicle 10). Advantageously, shutting off the engine 610 also reduces a thermal signature of the vehicle 10 to facilitate concealment or harder thermal detection of the vehicle 10.

In the EV/silent mode 1620, the FEAD 800 is driven by the motor/generator 822 as described in greater detail above with reference to FIGS. 15-19. Shutting off the engine 610, driving the transmission 620 with the IMG 700, and driving the FEAD 800 with the motor/generator 822 can reduce an operational sound level of the vehicle 10 (relative to the engine mode 1616) by a significant amount. By way of example, Applicant performed a drive-by test in the engine mode and the silent mode, which resulted in about a 25 decibels (dB) reduction in sound when switching from the engine mode to the silent mode. The fan 810 and fan clutch 856 can be operated based on the temperature received from the temperature sensor 1612 as described in greater detail above with reference to the engine mode 1616. In some embodiments, the controller 1602 is configured to monitor the battery SoC of the ESS 1000 to determine an amount of energy remaining and an estimated remaining runtime of the vehicle 10 in the EV/silent mode 1620. In some embodiments, when the SoC of the ESS 1000 reduces to or below a first threshold, the controller 1602 operates the HMI 1610 to provide a warning to the user regarding the SoC of the ESS 1000. In some embodiments, the controller 1602 is configured to monitor electrical energy consumption or a rate of energy consumption of the ESS 1000 during the EV/silent mode 1620 to determine an estimated amount of runtime remaining for the vehicle 10 in the EV/silent mode 1620. In some embodiments, when the SoC of the ESS 1000 reduces to a minimum allowable level (e.g., 20% SoC), the controller 1602 is configured to automatically transition the vehicle 10 into the engine mode 1616 (e.g., starting the engine 610 by engaging the engine clutch 750). In some embodiments, the controller 1602 is configured to operate the HMI 1610 to notify the user prior to transitioning into the engine mode 1616. In some embodiments, the user can provide an input to override the automatic transition into the engine mode 1616, or to transition the vehicle 10 into the ultrasilent mode 1622.

When the vehicle 10 is operated according to the EV/silent mode 1620, the vehicle 10 may be configured to operate for at least 30 minutes at a speed of at least 25 mph (e.g., 30-35 minutes at 45 mph). In some embodiments, when in the EV/silent mode 1620, the FEAD 800 and, therefore, the fan 810 are driven by the motor/generator 822, independently of a speed of the IMG 700 that is used to drive the vehicle 10 for transportation (e.g., the transmission 620). In some embodiments, operating the fan 810 independently of operation of the IMG 700 facilitates operating the fan 810 at a constant speed (e.g., 1400 RPM) regardless of a speed of the IMG 700 (which prevents sound fluctuations that would otherwise occur due to increasing and decreasing the fan speed). However, when the vehicle 10 is operated in the engine mode 1616 and the engine 610 drives the FEAD 800, the speed of the fan 810 may vary based on variations of the speed of the engine 610.

Ultra-Silent Mode

According to an exemplary embodiment, the controller 1602 includes the ultrasilent mode 1622 and is configured to operate the vehicle 10 according to the ultrasilent mode 1622. In another embodiment, the controller 1602 does not include the ultrasilent mode 1622. When the vehicle 10 is operated according to the ultrasilent mode 1622, the controller 1602 is configured to maintain or transition the engine 610 in an off state (e.g., to reduce sound output) and drive the driveline 600 by operating the IMG 700 (e.g., to provide an output torque to the transmission 620). The ultrasilent mode 1622 can be similar to the EV/silent mode 1620 but with additional operations to further reduce sound output of the vehicle 10.

In some embodiments, the ultrasilent mode 1622 includes shutting off operation of the fan 810 by disengaging the fan clutch 856. Shutting off operation of the fan 810 by disengaging the fan clutch 856 can further reduce sound output of the vehicle 10. In some embodiments, during operation of the vehicle 10 in the ultrasilent mode 1622, automatic transitioning of the vehicle 10 into the engine mode 1616 (or more particularly, starting of the engine 610) is limited. In some embodiments, during operation of the vehicle 10 in the ultrasilent mode 1622, operation of the fan 810 of the FEAD 800, and activation of the engine 610 is limited, regardless of the temperature provided by the temperature sensor 1612, and the SoC of the batteries of the ESS 1000. In this way, the vehicle 10 can be operated in the ultrasilent mode 1622 even to the point of complete depletion of the ESS 1000. In some embodiments, the controller 1602 is configured to provide alerts, notifications, alarms, etc. to the user or operator of the vehicle 10 via the HMI 1610 to notify the operator that the batteries of the ESS 1000 are about to be depleted, that an overheat condition is proximate, etc. The operator may manually transition the vehicle 10 out of the ultrasilent mode 1622 (e.g., to start the engine 610 to charge the batteries of the ESS 1000 and/or to engage the fan 810 of the FEAD 800) as desired. Advantageously, operating the vehicle 10 according to the ultrasilent mode 1622 facilitates improved noise and thermal concealment of the vehicle 10.

Alternative Drivelines

Figure 40:
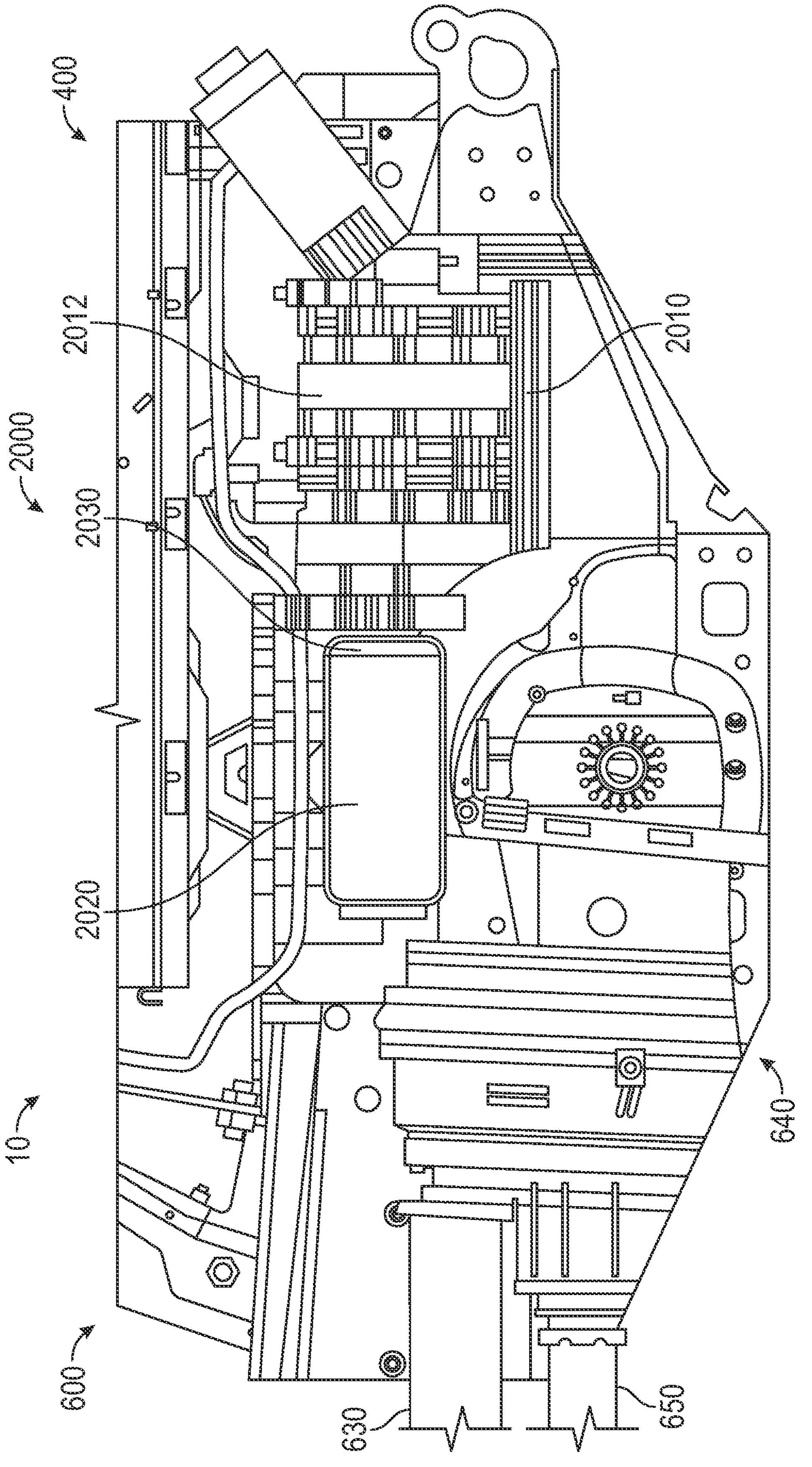
FIG. 40 is a partially transparent side view of the vehicle of FIG. 1 having a driveline including an engine, a transmission, a transaxle drive motor, and a gearbox, according to another exemplary embodiment.
Figure 41:
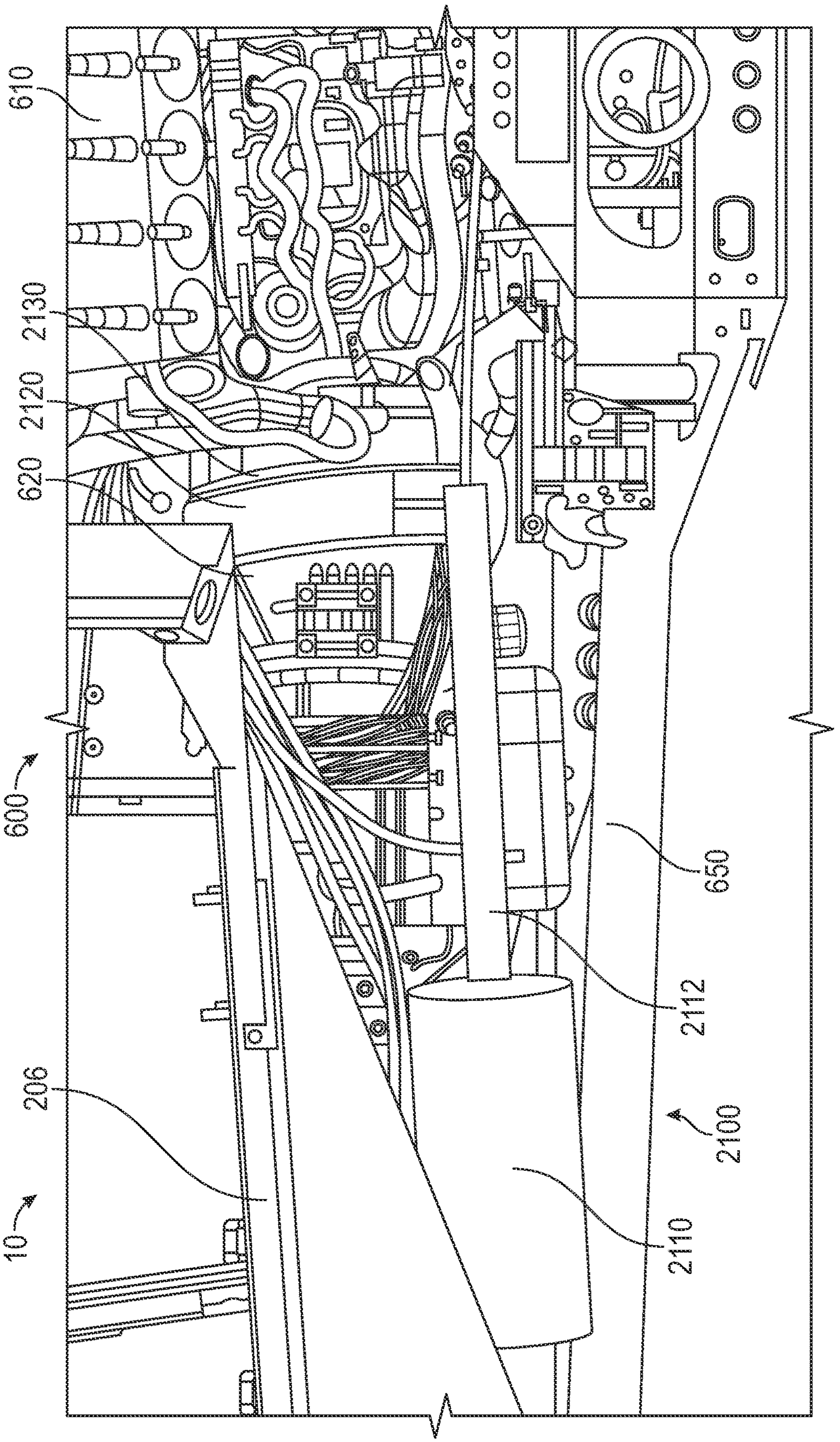
FIG. 41 is a partially transparent side view of the vehicle of FIG. 1 having a driveline including an engine, a transmission, a drive motor, and a gearbox arranged in a rear engine power take-off arrangement, according to another exemplary embodiment.
Figure 42:
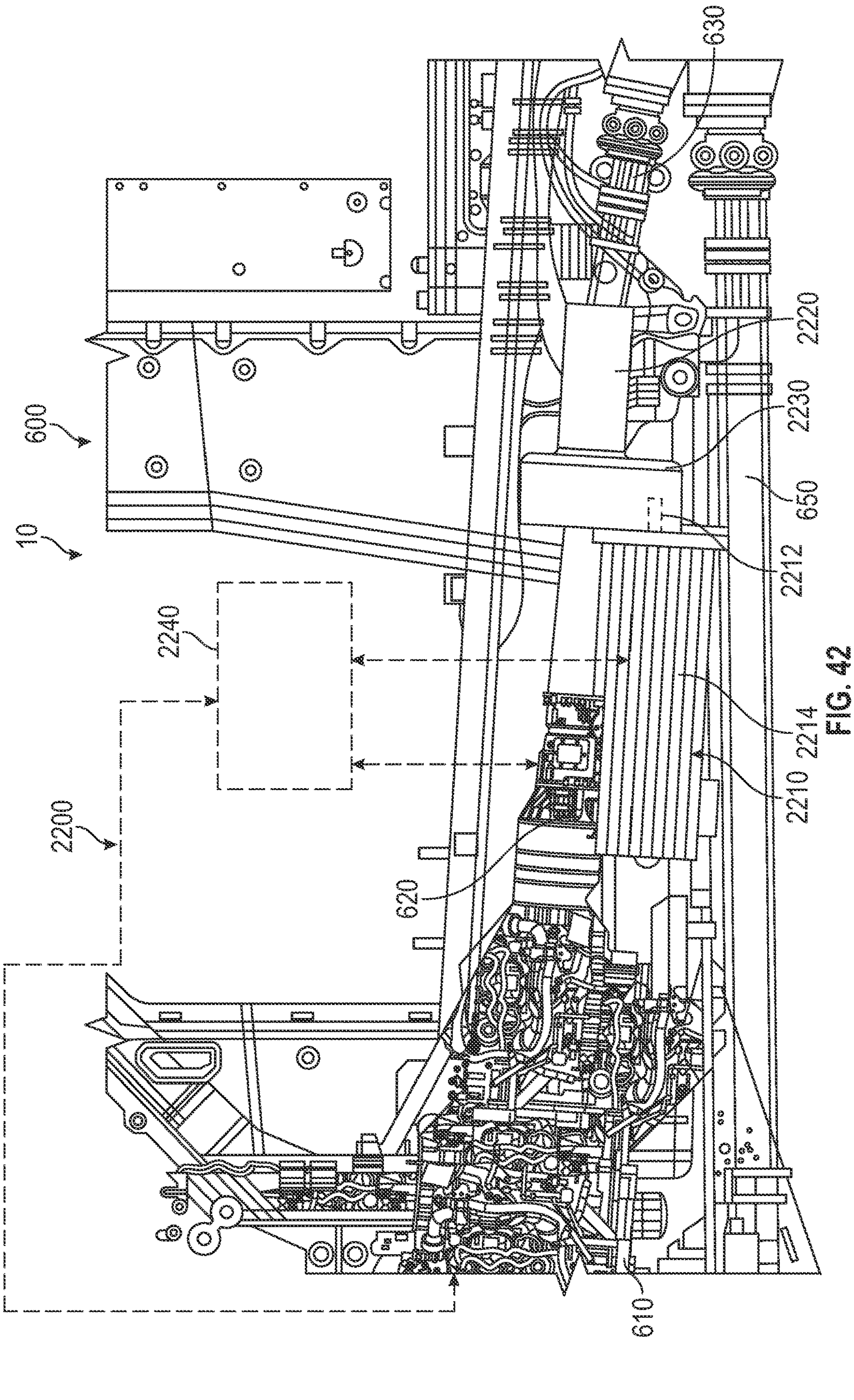
FIG. 42 is a partially transparent side view of the vehicle of FIG. 1 having a driveline including an engine, a drive motor, a transmission, and a gearbox, according to another exemplary embodiment.

According to the various embodiments shown in FIGS. 40-42 various other driveline arrangements for the driveline 600 (e.g., that do not include the IMG 700) can be incorporated into the vehicle 10 to enable multiple modes of vehicle travel. As discussed in detail below, a variety of alternative arrangements can provide the vehicle 10 with one or more of (i) an engine-only travel mode, (ii) an electric-motor only travel mode, and (iii) a hybrid or dual-drive travel mode where each of the engine 610 and an electric motor may variously function, depending on different traveling conditions (e.g., traveling downhill, uphill, below a threshold speed, above a threshold speed, etc.). In some examples, the driveline 600 can be arranged to operate the motor/generator 740 as a booster motor, such that each of the engine 610 and the motor/generator 740 simultaneously drive the transmission 620, and therefore the transaxle drive shaft 630 and the front axle drive shaft 650, providing a maximum output.

Electrified Transaxle

As shown in FIG. 40, the driveline 600 of the vehicle 10 includes a second electrified driveline arrangement replacing the IMG 700 with an electrified transaxle, shown as electrified transaxle assembly 2000. The electrified transaxle assembly 2000 is generally positioned within the rear module 400 (e.g., within the rear subframe 410), and is configured to supply rotational power to each of the rear axle and front axle assemblies 500 to drive the vehicle 10. The electrified transaxle assembly 2000 can be positioned opposite the engine 610 and transmission 620, and can be configured to selectively impart rotational motion to each of the transaxle drive shaft 630 and front axle drive shaft 650 to drive the vehicle 10.

The electrified transaxle assembly 2000 generally includes an electric drive motor 2010 and a gearbox 2020 positioned forward of and coupled to a driveshaft of the electric drive motor 2010. The gearbox 2020 can include one or more gears that engage with the transaxle 640 (e.g., one or more gears thereof), which then imparts rotational motion from the electric drive motor 2010 into each of the rear axle and front axle assemblies 500 to drive the vehicle 10. In some examples, the transaxle 640 further includes a clutch assembly that can selectively decouple or disengage electric drive motor 2010 from the transaxle 640, such that the vehicle 10 can be driven by the engine 610 and independent of the electric drive motor 2010 in certain instances (e.g., to execute an engine drive operation mode). The transmission 620 may be shifted to a neutral gear to decouple the electrified transaxle assembly 2000 from the engine 610 such that the vehicle 10 can be driven by the electric drive motor 2010 and independent of the engine 610 in certain instances (e.g., to execute a silent drive operation mode). In some examples, the electric drive motor 2010 is configured similarly to the motor/generator 740 described above, such that the electric drive motor 2010 can be configured to both draw power from, and generate and provide power to the ESS 1000, depending on the mode the vehicle 10 is in.

Using the vehicle 10 and the electrified transaxle assembly 2000, each of the travel modes described above can be performed by the vehicle 10. For example, in the engine-only travel mode, the engine 610 can once again supply rotational power to the transmission 620, which in turn rotates the transaxle drive shaft 630. The transaxle drive shaft 630 can in turn drive the transaxle 640, which drive the rear axle assembly 500, as well as the front axle drive shaft 650 to drive the front axle assembly 500. In some examples, rotation of the transaxle 640 can be used to drive the electric drive motor 2010 to generate electricity, which can be supplied to the ESS 1000. For example, when the transaxle clutch assembly 2030 is engaged and a gear within the gearbox 2020 engages the transaxle 640, rotation of the transaxle 640 will transmit rotational force through the gearbox 2020 to the driveshaft of the electric drive motor 2010. If the electric drive motor 2010 is configured as a motor/generator 740, as described above, rotation of the drive shaft within an electric drive motor housing 2012 (which includes wound coils) will generate electricity. The electricity generated can then be supplied to or otherwise transferred to the ESS 1000 for subsequent use. In some examples, the electric drive motor 2010 includes a transformer and/or an inverter (or rectifier) that are used to condition and step down or step up the generated electrical power prior to being supplied back to the ESS 1000.

In examples where the electric drive motor 2010 is configured as a motor only (e.g., and is not configured to generate and/or supply electrical power to the ESS 1000), the electric drive motor 2010 can be decoupled from the transaxle 640 using the transaxle clutch assembly 2030. The transaxle clutch assembly 2030 can decouple or disengage one or more of the gears within the gearbox 2020 from the transaxle 640, which then allows the transaxle 640 to rotate without transmitting rotational power through the gearbox 2020 and/or to the electric drive motor 2010. In some examples, the gears within the gearbox 2020 remain in contact with the transaxle 640, but are disengaged with a gearbox shaft or countershaft so that the gears freely spin and do not transmit torque. Accordingly, in this arrangement, the engine 610 and transmission 620 power each of the transaxle drive shaft 630 and the front axle drive shaft 650 while the electric drive motor 2010 is inactive (e.g., no or limited power is supplied to the electric drive motor 2010).

If a silent or reduced fuel mode is selected, the driveline 600 of the vehicle 10 is reconfigured. First, the engine 610 can be turned off, which in turn halts the rotation of the transmission 620. In some examples, the engine clutch 750 disengages the transmission 620, such that the transmission 620 is free to rotate independently (or nearly independently) of the drive shaft of the engine 610. Eliminating the rotation of the transmission 620 in turn ceases rotational power transmission from the transmission 620 to the transaxle drive shaft 630, which then stops (or slows) the vehicle 10 from moving.

With the engine 610 and transmission 620 disengaged from the electrified transaxle assembly 2000 of the driveline 600, the electrified transaxle assembly 2000 can be activated. First, the transaxle clutch assembly 2030 can engage the gearbox 2020. The gearbox 2020 then creates a rotational link between the transaxle 640 and the drive shaft of the electric drive motor 2010. With this coupling created, the ESS 1000 can supply electrical power to the electric drive motor 2010. In some examples, the ESS 1000 includes an inverter to convert stored DC electric power within the ESS 1000 to AC electric power that can be used by the electric drive motor 2010. Once activated, the electric drive motor 2010 rotates its drive shaft, which in turn imparts a torque to the transaxle 640. Because the transaxle 640 is coupled to the rear axle assembly 500, rotation of the transaxle 640 drives the rear wheels of the vehicle 10. Similarly, the rotation of the transaxle 640 transmits torque to the front axle drive shaft 650, which in turn drives the front axle assembly 500 to provide all-wheel (or four-wheel, in some embodiments) drive to the vehicle 10 in the silent or quieter electric-motor-only travel mode. In some examples, the ESS 1000 and electric drive motor 2010 can allow the vehicle 10 to travel in the silent or electric-motor-only mode for greater than 30 minutes at speeds of 25 miles per hour or higher. To accomplish these tasks, the electric drive motor 2010 can be configured to produce approximately 70 kW of continuous output power, with a peak output rating of 200 kW or more.

Similarly, hybrid modes of travel can be accomplished. For example, in some embodiments, the vehicle 10 operates in the electric-motor-only travel mode until a certain threshold traveling speed (e.g., 25 mph) is reached. When the threshold traveling speed is reached, the engine 610 can be activated and engaged with the transmission 620, while the electric drive motor 2010 can be deactivated and decoupled from the transaxle 640. In some examples, the engine 610 is activated upon the vehicle 10 reaching a first threshold speed (e.g., 25 mph) and the engine clutch 750 and/or transmission 620 are engaged to couple the engine 610 to the driveline 600 upon the vehicle 10 reaching a second threshold speed (e.g., 30 mph). In some examples, the driveline 600 transitions back to an electric-motor-only mode after the vehicle 10 has been traveling below the first threshold speed for a predetermined time period (e.g., 30 seconds, 60 seconds, 120 seconds, etc.). Using the above-described electrified transaxle assembly 2000 with the driveline 600, various different vehicle modes can be executed, including engine-only, electric-motor-only, and hybrid. As described above, different embodiments of the vehicle 10 can include an electric drive motor 2010 having a structure similar to the motor/generator 740, which allows for electricity to be generated and stored within the ESS 1000, for use in driving the electric drive motor 2010 at a later time.

Rear Engine PTO

As shown in FIG. 41, the driveline 600 of the vehicle 10 includes a third electrified driveline arrangement replacing the IMG 700 with a rear engine PTO ("REPTO"), shown as REPTO 2100. The REPTO 2100, like the electrified transaxle assembly 2000, includes an electric drive motor 2110 that can be selectively coupled with the transmission

620 using a gearbox 2120 and a REPTO clutch assembly 2130. The gearbox 2120 and the REPTO clutch assembly 2130 of the REPTO 2100 are positioned between the engine 610 and the transmission 620, and the electric drive motor 2110 is positioned within the tunnel slot 208 of the structural tunnel 206 of the passenger capsule 200. The electric drive motor 2110 is configured to supply rotational power the gearbox 2120 to drive the transmission 620 and, thereby, each of the rear axle and front axle assemblies 500 to drive the vehicle 10. Specifically, the REPTO 2100 can be configured to selectively impart rotational motion to each of the transaxle drive shaft 630 and the front axle drive shaft 650 through the transmission 620 and the transaxle 640 to drive the vehicle 10. Once again, the vehicle 10 can be configured to drive in each of the engine-only mode, the electric drive-motor-only mode, and a hybrid mode. In embodiments where the electric drive motor 2110 is configured like the motor/generator 740, the electric drive motor 2110 can generate and provide electrical power to the ESS 1000 for storage and subsequent use.

The electric drive motor 2110 of the REPTO 2100 is positioned behind the engine 610, and is configured to provide an alternative torque to the transmission 620 to drive the vehicle 10. As shown in FIG. 41, the electric drive motor 2110 includes a drive shaft 2112 that is driven by the electric drive motor 2110. The drive shaft 2112 extends forward, toward the engine 610 and parallel to the transaxle drive shaft 630. The drive shaft 2112 is coupled to (e.g., in a splined or geared engagement) with one or more gears within the gearbox 2120 positioned forward of the transmission 620 and behind the engine 610. The one or more gears within the gearbox 2120 can be selectively engaged with the transmission 620, such that rotation of the drive shaft 2112 rotates and transmits a torque to the transmission 620 and the transaxle drive shaft 630 to drive the vehicle 10. In some examples, the gearbox 2120 includes the REPTO clutch assembly 2130 that is configured to selectively engage the drive shaft 2112 with the transmission 620 to transmit torque from the electric drive motor 2110 through to the axle assemblies 500 to drive the vehicle 10. In other examples, the gearbox 2120 remains engaged with the drive shaft 2112 such that when the electric drive motor 2110 is inactive, torque is transferred from the engine 610, through the gearbox 2120, and to the drive shaft 2112, which rotates to generate electrical power that can be subsequently provided to the ESS 1000.

The REPTO 2100 is configured to provide the same multi-mode functionality as described above. For example, when the engine 610 is operating and the vehicle 10 is traveling at high speeds, the electric drive motor 2110 can be disengaged from the transmission 620 (e.g., through the REPTO clutch assembly 2130 disengagement), which in turn permits the transmission and/or gears within the gearbox 2120 to rotate without imparting a significant torque onto the drive shaft 2112 of the electric drive motor 2110. The torque produced by the engine 610 is supplied to the transmission 620, which then rotates the transaxle drive shaft 630 and transaxle 640. Rotation of the transaxle 640 in turn drives the front axle drive shaft 650, thereby transmitting torque to each of the front axle and rear axle assemblies 500 to drive the vehicle 10. In other examples, the electric drive motor 2110 remains clutched to the gearbox 2120 and the transmission 620, such that rotation of the engine 610 (e.g., the engine output shaft) rotates the drive shaft 2112, which in turn generates electricity within the coils of the electric drive motor 2110.

The REPTO 2100 is also configured to operate in a silent mode. To operate the REPTO 2100 in the silent mode, the engine 610 is decoupled from the transmission 620 (e.g., using a clutch assembly). The gearbox 2120 is then engaged with the transmission 620 (e.g., using the REPTO clutch assembly 2130) to create a mechanical linkage between the electric drive motor 2110 and the transaxle drive shaft 630. Then, the electric drive motor 2110 is activated. As discussed above, rotation of the electric drive motor 2110 rotates the transmission 620 shaft, which in turn rotates the transaxle 640 to drive each of the rear and front axle assemblies 500 using only electric power from the electric drive motor 2110. With the engine 610 deactivated, the vehicle 10 is able to drive in a "stealth mode" that makes the vehicle 10 more difficult to hear and less detectable by enemies. In some examples, the vehicle 10 is configured to transition between the stealth mode and the engine-only mode based upon traveling speed or remaining state of charge of the ESS 1000, for example. As discussed above, various different timing strategies can also be used to transition the vehicle 10 between driving modes during operation.

Motor/Gearbox

As shown in FIG. 42, the driveline 600 of the vehicle 10 includes a fourth electrified driveline arrangement replacing the IMG 700 with a motor and gearbox assembly, shown as an upper motor drive shaft and gearbox assembly 2200. The upper motor drive shaft and gearbox assembly 2200 includes a separate electric drive motor 2210 that can be selectively coupled with the transmission 620 and/or the transaxle drive shaft 630 using a gearbox 2220 and a rear clutch assembly 2230. As shown in FIG. 42, the electric drive motor 2210, the gearbox 2220, and the rear clutch assembly 2230 are each positioned within the tunnel slot 208 of the structural tunnel 206 of the passenger capsule 200 and behind the transmission 620. In some examples, the gearbox 2220 is positioned in-line with the transaxle drive shaft 630, which allows the electric drive motor 2210 to impart torque onto the transaxle drive shaft 630 to drive the vehicle 10 independently of the engine 610.

The electric drive motor 2210 includes a drive shaft 2212 that is engaged with one or more gears within the gearbox 2220. The drive shaft 2212 extends approximately parallel (e.g., +/−10 degrees) to the transaxle drive shaft 630, and is configured to drive each of the transaxle drive shaft 630, the transaxle 640, and the front axle drive shaft 650 when the vehicle 10 is operating in the silent or stealth mode. Like the electric drive motor 2010 and the electric drive motor 2110, the electric drive motor 2210 can be an asynchronous or induction AC electric motor that can be controlled using a variable frequency drive. The electric drive motor 2210 can be supplied with electricity from the ESS 1000, which can include an inverter to convert DC power stored within the ESS 1000 to AC power that can be used by the electric drive motor 2210.

The electric drive motor 2210 can also be configured as a motor/generator. Accordingly, when the vehicle 10 is in an engine-only drive mode, and the transaxle drive shaft 630 is being driven by the engine 610, torque can be transmitted to the drive shaft 2212 of the electric drive motor 2210 through the gearbox 2220. When the drive shaft 2212 is rotated within the housing 2214 of the electric drive motor 2210, AC electricity is generated. The generated electricity can be passed to a rectifier and/or one or more transformers to condition the generated electric power before being supplied back to the ESS 1000. In some examples, the electric drive motor 2210 is decoupled from the transaxle drive shaft 630 when the vehicle 10 is in the engine-only drive mode, such that rotation of the transaxle drive shaft 630 does not transmit a significant amount of torque through the gearbox 2220 and into the drive shaft 2212. The rear clutch assembly 2230 can selectively disengage one or more gears from the gearbox 2220, which in turn decouples the drive shaft 2212 from the transaxle drive shaft 630.

The upper motor drive shaft and gearbox assembly 2200 arrangement can also be used to perform any of the engine-only mode, electric-motor-only (e.g., stealth or silent) mode, or hybrid modes, as discussed above. In the engine-only mode, the electric drive motor 2210 is decoupled from the transaxle drive shaft 630 using the rear clutch assembly 2230. As indicated above, the rear clutch assembly 2230 can disengage one or more gears within the gearbox 2220 from a shaft or countershaft within the gearbox 2220, which allows the gear(s) to freely rotate relative to the shaft and/or the countershaft, such that limited torque is transmitted from the transaxle drive shaft 630 to the drive shaft 2212. Accordingly, the torque within the transaxle drive shaft 630 is transmitted to the transaxle 640 and the front axle drive shaft 650, and not to the drive shaft 2212.

The stealth or silent mode can be engaged by turning off the engine 610 and decoupling the drive shaft from the transmission 620. Then, the electric drive motor 2210 can be linked to the transaxle drive shaft 630 using the rear clutch assembly 2230, which engages one or more gears within the gearbox 2220 to the transaxle drive shaft 630. With the transaxle drive shaft linked to the electric drive motor 2210, the electric drive motor 2210 can be activated. Torque produced by the electric drive motor 2210 can then be transmitted through to the transaxle 640, to drive the rear axle assembly 500, and through to the front axle drive shaft 650, to drive the front axle assembly 500. The vehicle 10 can include a control system or engine control unit (ECU) 2240 that communicates between the various components of the driveline 600 to ensure appropriate timing between the different clutches and the electric drive motor 2210, which allows the vehicle to shift between engine-only and electric-motor-only modes while the vehicle 10 is operating.

Using the various above-described arrangements of the driveline 600, the vehicle 10 can transition between several driving modes, including a silent or "stealth" mode that allows the vehicle 10 to drive while producing a limited amount of noise and a limited thermal signature. A compact motor/generator can be incorporated to charge the ESS 1000, which enables extended electric-motor-only use. Different clutch mechanisms and couplings can be used to allow each of the engine 610 and electric motor (e.g., the IMG 700, the electric drive motor 2010, the electric drive motor 2110, the electric drive motor 2210, etc.) to drive the vehicle 10 independently of one another.

Mission Planning

Referring to FIGS. 43-49, the vehicle 10 can use mission planning or mission profiles to automatically transition between various modes of operation, prompt an operator to transition the vehicle 10 between various modes of operation, or to change an operational parameter, function, or other operation of the vehicle 10 based on the mission profile or mission plan, and in response to a position of the vehicle 10 along a planned route of the mission profile or mission plan, current conditions detected at the vehicle 10, etc. In some embodiments, the mission plan includes a planned route (e.g., a geographic route from a first location to a second location, or from a first location to a second location to a third location, etc.) and one or more zones or areas along the route that have increasing alert level. For example, portions of the route that have a high alert may result in the vehicle 10 operating differently than portions of the route through an areas that has a low alert. In some embodiments, the mission plan or mission profile provides instructions or guidance for the operator of the vehicle 10 to manually operate the vehicle 10 so that one or more parameters or conditions are met at the vehicle 10 (e.g., fully charged batteries) by the time the vehicle 10 reaches a particular location along the route or by the time the vehicle 10 reaches the second location (e.g., a destination). The mission plans or profiles can include, but are not limited to, a geographic route between different geographic locations, a map, correspondingly recommended speeds for the vehicle 10 and modes of operation of the vehicle 10 along the route, different zones having varying alert severity, information associated with current locations along the route or nearby the route, etc.

The mission plan or mission profile can be generated based on artificial intelligence (e.g., a neural network or machine learning) using training data or aggregate data from a population of multiple vehicles 10 that each transmit detected information or user input information to a cloud computing system. When a new vehicle 10 requests a mission plan from a starting location to an ending location (e.g., the destination), the neural network may use historical data or currently obtained data from other vehicles 10 in the nearby geographic area, or from across the globe to determine the mission plan or the mission profile. In some embodiments, the neural network may also use satellite imaging data, map data, elevation or contour maps, terrain maps, known locations of hostile forces, etc., for determining the mission plan or the mission profile.

The systems and methods described herein with reference to FIGS. 43-49 facilitate transitioning of the vehicle 10 between different modes based on a mission profile, according to some embodiments. For example, the systems and methods may result in initially using an engine mode or a hybrid mode (e.g., the engine mode 1616 or the dual mode 1618) of operation to transport the vehicle 10, and then transitioning into a fully electric mode (e.g., the EV/silent mode 1620 or the ultrasilent mode 1622) to facilitate reduced detectability (e.g., silence) or reduced heat signature, as required by the mission profile or mission plan. The systems and methods described herein may also facilitate achieving a particular level of the battery SOC (e.g., 100% or some other value) by running the engine 610 to charge the batteries 1008 of ESS 1000 by the time the vehicle 10 arrives at an area that requires stealth, and also facilitating running the vehicle 10 on electrical energy as long as possible. Advantageously, charging the batteries 1008 of the ESS 1000 with the engine 610 along a known portion of a route may facilitate the batteries 1008 being sufficiently charged to run an electronic weapon when a target location is reached or the vehicle 10 is engaged by hostile forces. In some embodiments, when the vehicle 10 is in the areas that require stealth, the engine 610 is limited from turning on. In some embodiments, the systems and methods described herein include forcing the engine mode 1616 until a destination is reached, and then switch to the EV/silent mode 1620 or the ultrasilent mode 1622 based on the mission profile or plan and/or a current geographic location of the vehicle 10. The systems and methods described herein can also use artificial intelligence ("AI") to learn routes to use (e.g., based on a cloud database and recorded data), and a predictive algorithm to predict energy usage of the vehicle 10. In some embodiments, the systems and methods facilitate autonomous or semi-autonomous operation of the vehicle 10. In some embodiments, if the mission plan or profile has a high threat route, or the vehicle 10 is likely to encounter hostile forces along the route, the battery SOC of the batteries 1008 are maintained near 100% so that electrical energy is available (e.g., for transportation or for electric weaponry) if the vehicle 10 needs to operate an electric weapon or flee from an enemy.

System Overview

Figure 43:
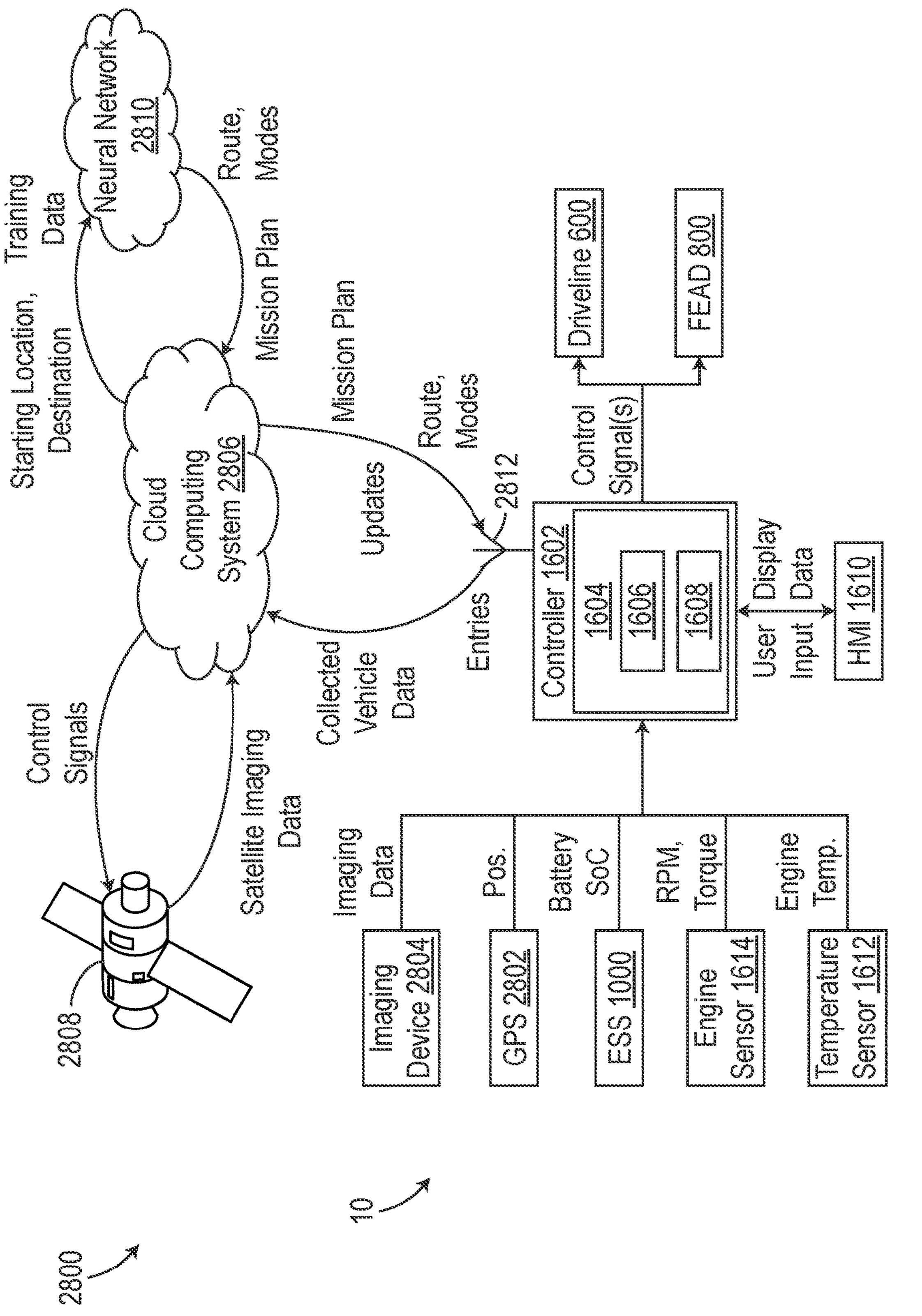
FIG. 43 is a block diagram of a system for generating and using a mission plan, according to an exemplary embodiment.

Referring to FIG. 43, a mission planning system 2800 (e.g., a control system, a computing system, a computer system, a system of circuitry, etc.) includes the vehicle 10 (and/or a fleet of the vehicle 10), a cloud computing system 2806, the controller 1602 of the vehicle 10, and a neural network 2810, according to some embodiments. In some embodiments, the neural network 2810 is a portion of the cloud computing system 2806. The cloud computing system 2806 and/or the neural network 2810 may represent, or the functionality of the cloud computing system 2806 and/or the neural network 2810 as described herein may be implemented on, a processing circuit, a server, distributed processors, processing circuitry, a cloud processing system, a system of servers that cooperatively operate, etc. In some embodiments, the cloud computing system 2806 is configured to obtain satellite imaging data from the satellite 2808 (e.g., image data of a geographic location or area, image data of the vehicle 10, etc.). In some embodiments, the satellite 2808 includes or is a military reconnaissance satellite, a navigation satellite, a military communications satellite, a drone satellite, a geostationary satellite (GEO), a global positioning system (GPS) satellite, a geocentric orbit satellite, etc. In some embodiments, the cloud computing system 2806 is configured to generate control signals for the satellite 2808 to operate the satellite 2808 to obtain image data of a particular geographic area of the earth. In some embodiments, the cloud computing system 2806 is configured to retrieve image data and/or elevation data from a database of satellite image data. In some embodiments, the cloud computing system 2806 is configured to use the image data provided by the satellite 2808 to determine elevation of land of the satellite image data.

Referring still to FIG. 43, the controller 1602 is configured to communicate with the cloud computing system 2806 using a wireless transceiver 2812 of the vehicle 10. In some embodiments, the wireless transceiver 2812 is configured to establish wireless communication with the cloud computing system 2806 via a satellite, a radio tower, cellular communications, etc. In some embodiments, the wireless transceiver 2812 is configured to establish communication with the cloud computing system 2806 using wireless transmissions such as amplitude modulation (AM) radio or frequency modulation (FM) radio. The wireless transceiver 2812 may establish real-time communication with the cloud computing system 2806. In some embodiments, the controller 1602 is configured to store any data of the vehicle 10 (e.g., obtained from any sensors, systems, sub-systems, units, etc., of the vehicle 10) in the memory 1608 along with corresponding time stamps. The controller 1602 may transmit any of the data of the vehicle 10 to the cloud computing system 2806 once communication is established between the transceiver 2812 and the cloud computing system 2806 (e.g., when a signal strength between the wireless transceiver 2812 and the cloud computing system 2806 is sufficient, when the vehicle 10 returns to a base location or hanger, etc.). In this way, the controller 1602 may transmit data in real-time with the cloud computing system 2806 (e.g., send or receive) if communications are established and there is sufficient bandwidth between the cloud computing system 2806 and the transceiver 2812, may transmit historical data regarding a previous time period to the cloud computing system 2806 (e.g., once the vehicle 10 has completed a mission and returned to the base location, once the wireless transceiver 2812 and the cloud computing system 2806 reconnect with each other after a period of disconnection, etc.).

Collected Vehicle Data

As shown in FIG. 43, the controller 1602 is configured to transmit collected vehicle data to the cloud computing system 2806. The collected vehicle data can include any imaging data from an imaging device 2804 of the vehicle 10 (e.g., including any of or any combination of image data of visible light of an area at the vehicle 10, thermal imaging data of the area at the vehicle 10, infrared imaging data of the area at the vehicle 10, ultraviolet imaging data of the area at the vehicle 10, etc.), position data form a GPS 2802 of the vehicle 10, battery SOC from the ESS 1000 of the vehicle 10, RPM and/or torque from the engine sensor 1614 of the vehicle 10, engine temperature from the temperature sensor 1612 of the vehicle 10, user input data from the HMI 1610, etc. In some embodiments, the vehicle 10 includes other sensors or systems that the controller 1602 obtains data from, and which the controller 1602 transmits to the cloud computing system 2806. Any of the collected vehicle data described herein can be obtained from systems, sensors, sub-systems, units, control units, etc., of the vehicle 10, the collected vehicle data may be or include, but is not limited to:

- imaging data obtained from a sensor (e.g., the imaging device 2804) of the vehicle 10, or from a population of vehicles 10 (e.g., camera data, thermal imaging data, infrared imaging data, ultraviolent imaging data, ultrasonic imaging data, etc.);
- a current position of the vehicle 10 (e.g., obtained from the GPS 2802 of the vehicle 10), or current positions of each of a population or fleet of vehicles 10;
- a historical position of the vehicle 10;
- a predicted future position of the vehicle 10;
- a starting location of the vehicle 10 (e.g., GPS coordinates);
- a destination for the vehicle 10 (e.g., GPS coordinates);
- one or more stops between the starting location and the destination of the vehicle 10 (e.g., an array of GPS coordinates);
- specifications of the vehicle 10 including, but not limited to:
  - torque output;
  - maximum speed;
  - total weight;
  - weaponry types and numbers;
  - battery capacity;
  - maximum discharge rate of energy from batteries of the vehicle 10;
  - model;
  - driveline configuration;
- detected terrain and corresponding location obtained from sensors of the vehicle 10 (or from a fleet of vehicles 10);
- user inputs indicating approximate locations of hostile forces;
- controlled area network (CAN) bus data of the vehicle 10;
- data from an engine control unit (ECU) of the vehicle 10;
- data from a transmission control unit (TCU) of the vehicle 10;
- a current SOC of batteries of the vehicle 10;
- a currently selected mode of the vehicle 10;

- available modes of operation of the vehicle 10;
- RPM and/or torque of an engine, motor, or tractive elements of the vehicle 10;
- engine temperature of the vehicle 10;
- environmental conditions (e.g., temperature, humidity, degree of sunlight, etc.) at the vehicle 10;
- number of occupants in the vehicle 10;
- whether the vehicle 10 is transporting in a convoy from the starting location to the destination;
- current or historical data of temperatures of one or more batteries of the vehicle 10;
- signal strength of a transceiver of the vehicle 10;
- sound data from a microphone or radio system of the vehicle 10;
- signal strength between the vehicle 10 and one or more other vehicles or bases;
- current or historical altitude of the vehicle 10;
- a cargo type of the vehicle 10;
- a rank of one or more occupants of the vehicle 10;
- an armor level of the vehicle 10;
- whether the vehicle 10 is towing a trailer;
- food or water levels of the vehicle 10, and/or an estimate of how far the vehicle 10 can travel based on the food or water levels of the vehicle 10 given the number of occupants;
- a distance between the vehicle 10 and a nearest location where the vehicle 10 can charge the batteries, replenish food and water, etc.;
- a maximum allowable runtime given an environmental temperature of the vehicle 10;
- maintenance or degradation levels of one or more components of the vehicle 10 (e.g., oil change, brake pads, tire tread, etc.);
- first aid or emergency equipment that is present in the vehicle 10; and/or
- types of radio equipment on the vehicle 10 and available range of the radio equipment on the vehicle 10.

Referring still to FIG. 43, the cloud computing system 2806 is configured to use any of the collected data provided by the vehicle 10 and the satellite imaging data provided by the satellite 2808 to determine a mission plan including a route and one or more modes of operation for the vehicle 10 along different portions of the route. The mission plan can also include various settings, parameters (e.g., engine parameters, alert parameters, etc.) for the vehicle 10 or occupants of the vehicle 10 along different portions of the route. The route may be a geographic route from the starting location of the vehicle 10 to the destination for the vehicle 10. In some embodiments, the mission plan includes identification of one or more zones, areas, or locations and an associated level of alert for each of the one or more zones, areas, or locations. The levels of alert may vary from a low to a high level of alert.

The controller 1602 of the vehicle 10 may use the route to autonomously operate the vehicle 10, or may display the route on the HMI 1610. The controller 1602 can also present notifications on the HMI 1610 so that the operator of the vehicle 10 transitions the vehicle 10 into the suggested modes of operation. In some embodiments, the controller 1602 is configured to use the modes of operation and the current position of the vehicle 10 along the route (e.g., provided by the GPS 2802) to automatically transition the vehicle 10 between the modes of operation as indicated in the mission plan.

The cloud computing system 2806 may also be configured to transmit updates for the mission plan (e.g., updates to the route or updates to the modes of operation for different portions of the route). In some embodiments, the cloud computing system 2806 can transmit updates to the route after the vehicle 10 has initiated transportation along the route. The cloud computing system 2806 may obtain information from a population of vehicles 10 and identify new information, new areas or zones of high alert, etc., appropriately update the mission plan (e.g., change the route, change the modes of operation for the route, update different zones with varying alert severity, etc.), and transmit the updates to the controller 1602. In some embodiments, the cloud computing system 2806 is configured to use current status or currently obtained collected vehicle data from the controller 1602 when determining the updates or an updated mission plan. For example, the cloud computing system 2806 may receive data from other vehicles 10 of the population which indicates that the mission plan for the vehicle 10 should be updated. The cloud computing system 2806 can obtain the collected vehicle data in response to the data received from the other vehicles 10 indicating that the mission plan should be updated, and re-perform the functionality performed to generate the initial mission plan, using the current position of the vehicle 10 as the starting location.

Population-Based Data

Figure 44:
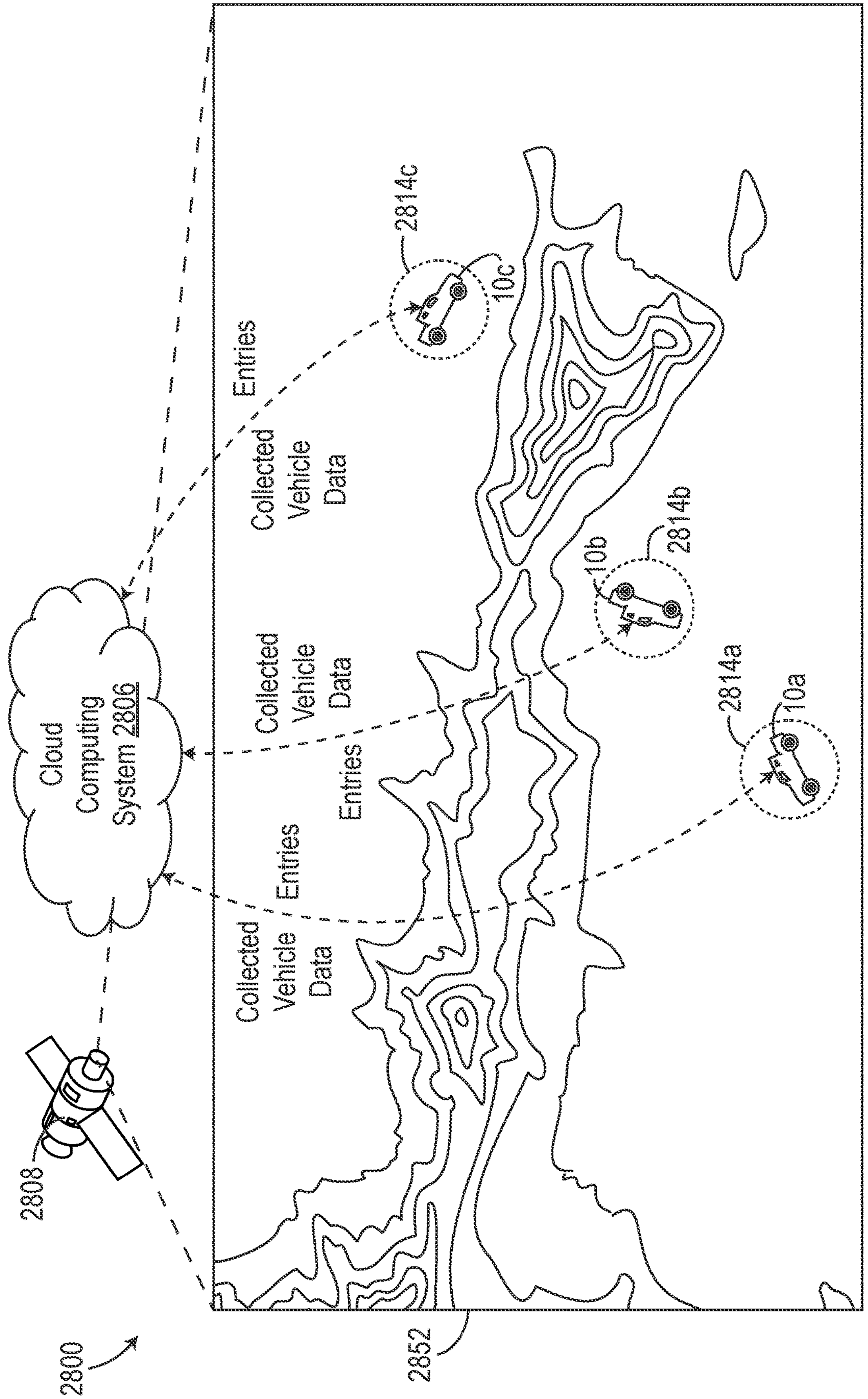
FIG. 44 is a diagram illustrating a fleet of vehicles providing information to a cloud computing system, according to an exemplary embodiment.

Referring to FIGS. 43 and 44, the cloud computing system 2806 is configured to obtain collected vehicle data from any vehicles of a population of vehicles 10, according to some embodiments. In some embodiments, each of the vehicles 10 include sensors (e.g., imaging devices, cameras, infrared cameras, heat mapping devices, terrain sensors, etc.) that are configured to obtain sensor data of nearby locations 2814. For example, a first vehicle **10*a* may report collected vehicle data regarding the first vehicle 10*a* and nearby locations 2814*a*, a second vehicle 10*b* may report collected vehicle data regarding the second vehicle 10*b* and the nearby locations 2814*b*, and a third vehicle 10*c* may report collected vehicle data regarding the third vehicle 10*c* and nearby locations 2814*c*. The vehicles 10 are shown in FIG. 44 on a geographic map 2852 in various locations. The geographic map 2852 may be image data obtained from the satellite 2808 and can include contours or lines that illustrate different elevations of the geographic area. The geographic map 2852 can also include icons of base locations, previously identified hostile forces, villages or towns, roads, landmarks, icons of the vehicles 10, etc. In some embodiments, the geographic map 2852 as shown in FIG. 44 is generated and/or stored by the cloud computing system 2806. The geographic map 44 may illustrate a graphic (e.g., an interact graphic) that is displayed on a screen of the HMI 1610 of any of the vehicles 10**.

In some embodiments, the cloud computing system 2806 is configured to use the collected vehicle data obtained from the vehicles 10 for updating the mission plans for any of the vehicles 10. For example, if the vehicle **10*b* encounters an enemy force or a friendly force, the vehicle 10*b* can provide a notification to the cloud computing system 2806 so that the cloud computing system 2806 prompts the nearby vehicle 10*a* to provide assistance to the vehicle 10*b*, or to update the mission plan (e.g., the route) of the vehicle 10*b* and/or the vehicle 10*a* to avoid the enemy force. The collected vehicle data from any of the vehicles 10 can also be used to update the geographic map 2852. For example, if the geographic map 2852 indicates that a bridge is present across a river, but one of the vehicles 10 arrives at the bridge and detects (e.g., based imaging data or based on a user input) that the bridge is out, the cloud computing system 2806 can use this information to update mission plans (e.g., the route) for other vehicles 10 that have a route which uses the bridge to arrive at the destination (e.g., to prompt the vehicle 10 to follow a detour). Similarly, if one or more of the vehicles 10 encounters a dead-zone where the vehicles 10 loses radio connection with other of the vehicles 10 or with the cloud computing system 2806, the cloud computing system 2806 can update the mission plan for the other vehicles 10 to avoid the dead-zone, or to provide an alert that the specific area has a dead-zone and that the vehicles 10** will lose connectivity in the dead-zone.

In another example, the vehicles 10 can detect obstructions (e.g., in the road, burned vehicles, objects, etc.) using the image data obtained from the imaging devices 2804 of the vehicles 10 or using a user input. For example, the occupants of the vehicle 10 can report (e.g., to the cloud computing system 2806) various entries of the current location, the vehicle 10 can identify the various entries based on sensor data from any sensors of the vehicle 10, or the cloud computing system 2806 can use any of the collected vehicle data with a neural network or identification technique (e.g., image analysis or recognition technique), etc. The entries that can be entered by the occupant of the vehicles 10, detected by controllers 1602 of the vehicles 10, or identified by the cloud computing system 2806 based on the collected vehicle data may include but are not limited to:

- whether a potentially hostile force is sighted, and an approximate location of the potentially hostile force and/or number of the potentially hostile forces;
  - equipment that the potentially hostile force has;
  - whether the hostile force is a ground force, has a vehicle, is a base station, etc.;
- detection of an improvised explosive device (IED) nearby;
- detection of a radio jammer nearby;
- detection of an obstruction or obstacle in a path;
- detection of flooding;
- detection of quicksand;
- detection of fallen trees;
- detection of a bridge that is out of service;
- detection of terrain elevation that does not match the geographic map;
- detection of aerial drones;
- detection of weather or environmental conditions such as blizzards, storms, sandstorms, avalanches, excessive heat, etc.;
- detection of broken or thin ice;
- detection of a friendly force; and/or
- detection of and position of another of the vehicles 10 that has lost radio connection with the other vehicles 10 and/or the cloud computing system 2806.

In some embodiments, any of the entries listed above can also be detected or identified by the cloud computing system 2806 based on the satellite imaging data provided by the satellite 2808. In some embodiments, the cloud computing system 2806 can use the entries provided by the vehicles 10 (e.g., provided with the collected vehicle data) in order to calibrate, update, or improve the accuracy of the satellite image data provided by the satellite 2808. In some embodiments, the cloud computing system 2806 is configured to use any of the entries provided by the vehicles 10 (e.g., any of the entries listed above) to update, adjust, or re-calculate mission plans (e.g., routes, defined areas of alert levels, alert levels for previously defined areas, what modes of operation to use across specific portions of the route, etc.).

AI-Based Mission Planning

Referring still to FIGS. 43 and 44, the cloud computing system 2806 can provide training data to the neural network 2810 (e.g., an AI), a machine learning algorithm, a neural network, a deep learning algorithm, etc.). The training data can include any of the collected vehicle data and/or entries provided by the vehicles 10 (e.g., the first vehicle 10*a*, the second vehicle 10*b*, and the third vehicle 10*c*). It should be understood that while FIG. 44 shows only three vehicles 10, the cloud computing system 2806 can be configured to obtain collected vehicle data and/or entries from any number of vehicles 10 with which the cloud computing system 2806 establishes communication. The training data may also include the satellite imaging data of an appropriate location, and one or more extracted parameters of the satellite imaging data (e.g., elevation, identification of roads and bridges, identification of types of terrain, etc.). The one or more extracted parameters of the satellite imaging data may be identified by the cloud computing system 2806 using image recognition techniques.

The neural network 2810 can use the training data to train a model (e.g., determine weights of various neurons or nodes) in order to predict a route and appropriate modes of operation of the vehicle 10 between an input starting location and a destination to any of (a) minimize power consumption of the vehicle 10, (b) minimize transportation of the vehicle 10 through one or more high alert level zones or areas, (c) achieve the fastest possible route between the starting location and the destination, (d) have a specific SOC of the ESS 1000 when the vehicle 10 enters high alert level zones or when the vehicle 10 approaches the destination, (e) minimize detectability of the vehicle 10, etc., or (f) any combination of (a), (b), (c), (d), and (e) with the different goals of (a), (b), (c), (d), (e), and (f) given different weightings. In some embodiments, the neural network 2810 is configured to analyze an amount of fuel consumed by the vehicles 10 as the vehicles 10 transport along a route, determine relationships between energy consumption of the batteries 1008 and at least one of elevation changes, speed of transport of the vehicle 10, mode of operation of the vehicle 10, etc. In some embodiments, the neural network 2810 includes multiple neural networks for determining any of the route, the suggested modes of operation of the military vehicle 10 along portions of the route, suggested speeds for the vehicle 10 along portions of the route, in order to achieve any of (a)-(f) given inputs of starting location and a destination. The operator of the vehicle 10 may be presented with the various mission plans for (a)-(e) via the HMI 1610, and may select from the multiple mission plans (e.g., mission plan with minimal power consumption by the vehicle 10, mission plan with minimal transportation through one or more high alert level zones, mission plan with fastest possible route between the starting location and the destination, mission plan to achieve a specific or desired SOC when the vehicle 10 enters high alert level zones or when the vehicle 10 approaches the destination, etc.). In some embodiments, a system administrator can view the mission plans generated by the neural network 2810 and select a mission plan for the vehicle 10 that best suits the vehicle 10 given the goals of the mission. The neural network can be any of, or any combination of a convolutional neural network (CNN), a multilayer perceptron network, a feed forward neural network, a perceptron neural network, a recurrent neural network (RNN), an artificial neural network (ANN), a deconvolutional network, or any other neural network. The neural network 2810 is, more generally, trained based on the training data in order to generate a model for predicting mission plans that can be used to generate new mission plans for vehicles 10. In some embodiments, the neural network 2810 is periodically updated, calibrated, or re-trained in response to new training data being provided by the cloud computing system 2806.

Once the neural network 2810 is trained (e.g., based on the training data which may include historical data of the collected vehicle data from any of the vehicles 10), the neural network 2810 can be queried by the cloud computing system 2806 and provided with at least the starting location and the destination for the vehicle 10. In some embodiments, the starting location is a current location of the vehicle 10 (e.g., in response to the cloud computing system 2806 re-calculating or re-determining the mission plan due to another vehicle 10 providing an entry which prompts update of the mission plan). In some embodiments, the starting location is a location or geographic position of a home base or hanger for the vehicle 10. The destination can be a desired final geographic location of the vehicle 10 (e.g., specific geographic coordinates, geographic coordinates of the home base or hanger for the vehicle 10, etc.). The neural network 2810 may also receive other inputs from the cloud computing system 2806 that are used to generate or determine the mission plan such as a desired battery SOC of the ESS 1000 of the vehicle 10 by a specific location (e.g., when the vehicle 10 is within 1 mile of the destination, the SOC should be 100%).

Heuristic-Based Mission Planning

Figure 45:
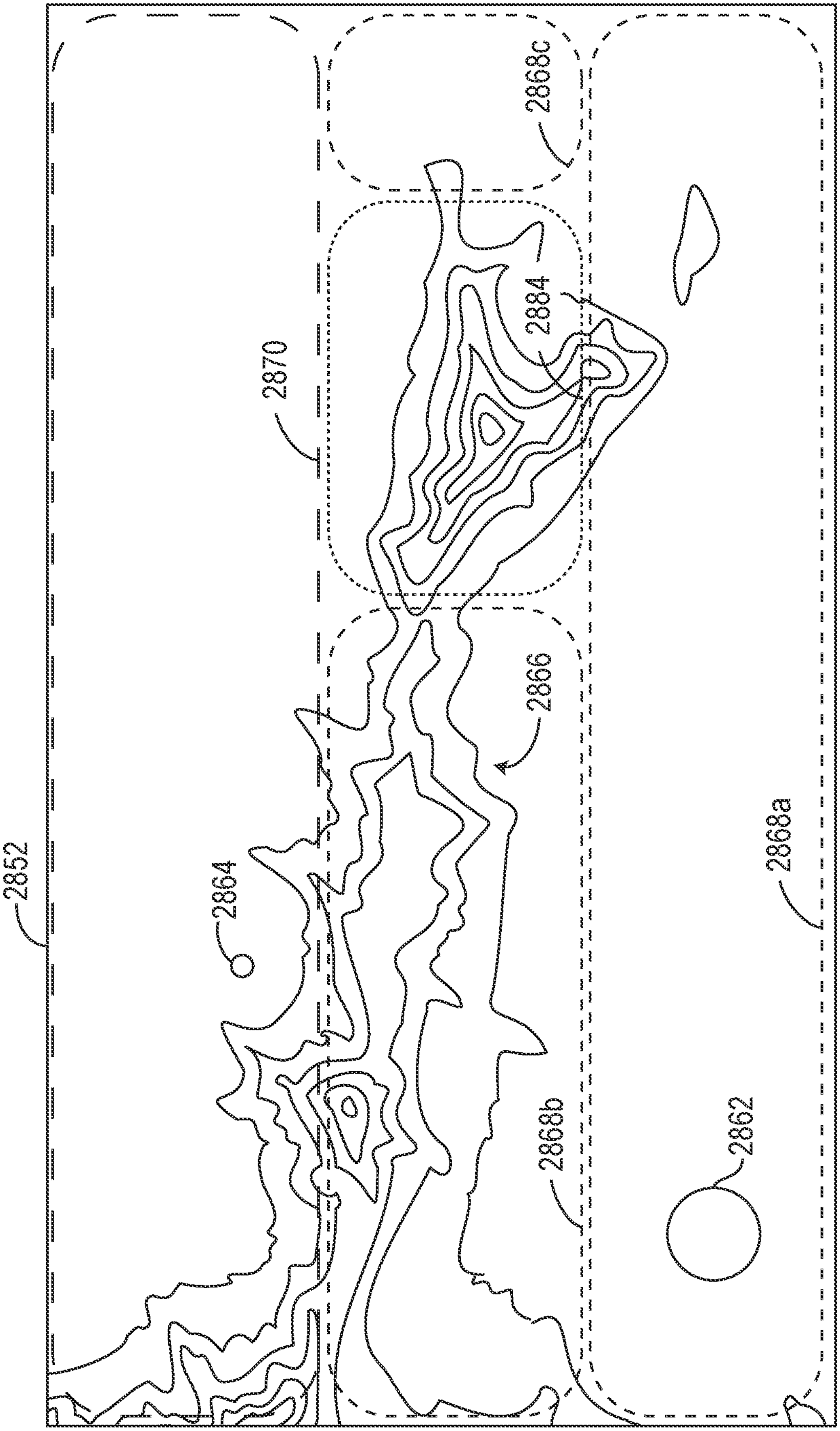
FIG. 45 is a geographic map illustrating a starting location, a destination, and different alert level zones, according to an exemplary embodiment.
Figure 46:
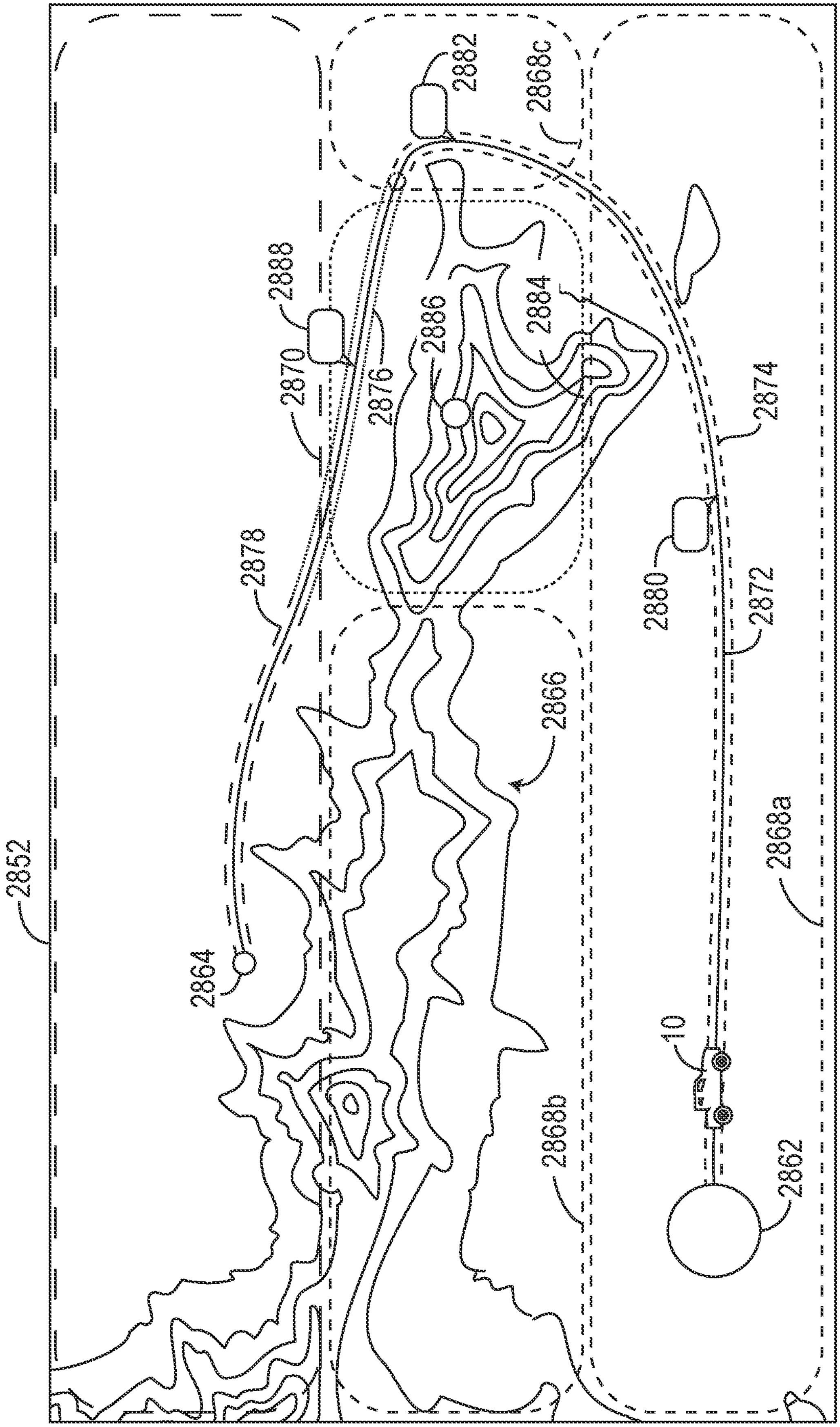
FIG. 46 is a diagram of a mission plan for the geographic map of FIG. 45 including a route, notifications, and different modes of operation for different portions of the route, according to an exemplary embodiment.

Referring to FIGS. 43 and 45-46, the cloud computing system 2806 is configured to determine the mission plan based on a rules based or heuristic based procedure. For example, the cloud computing system 2806 may initially implement a route planning procedure to generate a route that has, over the entirety of the route, a least amount of transportation time or a least amount of torque output required to transport along the route (e.g., based on elevation data provided by the satellite imaging data and/or the collected vehicle data). In some embodiments, the cloud computing system 2806 uses the collected vehicle data from any of the vehicles 10, or the entries provided by any of the vehicles 10 to determine the route. In some embodiments, the cloud computing system 2806 is configured to identify, based on the collected vehicle data and/or the satellite image data, one or more high alert level areas, one or more medium alert level areas, one or more low alert level areas, one or more dead-zones, etc. Once the cloud computing system 2806 determines the route, the cloud computing system 2806 can identify portions of the route that pass through the high alert level areas, the medium alert level areas, the low alert level areas, the dead-zones, etc. The cloud computing system 2806 can determine suggested operating parameters and modes of operation for the vehicle 10 so that the vehicle 10 operates according to a suitable mode through the different zones, and so that the vehicle 10 has sufficient SOC before entering high alert level areas, or before arriving at the destination (e.g., if the destination is in a high alert level area).

For example, the cloud computing system 2806 may determine that the vehicle 10 should be operated in the ultrasilent mode 1622 or the silent mode 1620 through the high alert level areas so that detectability of the vehicle 10 is minimized. The cloud computing system 2806 can also determine that the vehicle 10 should be operated in the engine mode 1616 in low alert level areas or prior to entering the high alert level areas so that the ESS 1000 is fully charged by the time the vehicle 10 transports through the high alert level areas. In some embodiments, ensuring that the ESS 1000 has a 100% SOC or a high SOC while the vehicle 10 transports through the high alert level areas facilitates ensuring the vehicle 10 will have sufficient energy levels for operation of electrical weaponry, or for transitioning into the dual mode 1618 (e.g., if the vehicle 10 needs to escape an enemy). In some embodiments, the cloud computing system 2806 determines a series of control parameters for different locations along the route to automatically transition the vehicle 10 between the available modes of operation. In some embodiments, the control parameters are provided as suggestions to the operator so that the operator may manually transition the vehicle 10 between the different modes at appropriate times. The mission plan can include a notification to be provided to the operator via the HMI 1610 when the vehicle 10 is about to enter a dead-zone so that the operator is informed that the vehicle 10 is about to lose communications.

In some embodiments, any of the heuristic or rule-based techniques of the cloud computing system 2806 as described herein are used separately (e.g., without use of) the neural network 2810. In some embodiments, any of the heuristic or rule-based techniques of the cloud computing system 2806 described herein are used in combination with the neural network 2810 (e.g., the cloud computing system 2806 uses the route of the mission plan provided by the neural network 2810 and determines appropriate modes of operation of the vehicle 10 for different portions of the route). In some embodiments, the cloud computing system 2806 uses the mission plan provided by the neural network 2810 and determines alerts or notifications that should be provided to the operator of the vehicle 10 based on any entries provided by other vehicles 10 (e.g., enemy sighted at a particular location, approaching weather conditions, etc.). It should be understood that the neural network 2810 may determine similar modes of operation based on the identified alert level zones.

The cloud computing system 2806 can also be configured to determine notifications that should be provided to the operator along the route. The notifications may be based on any of the entries provided by other vehicles 10 of the fleet or population of vehicles 10, and can have an associated location. The HMI 1610 of the vehicle 10 can operate to provide the notifications when the vehicle 10 approaches within a specific distance of the associated location of the entries.

Referring particularly to FIG. 45, the geographic map 2852 is shown to include a base location 2862, illustration of a mountain range 2866, and a destination 2864. The geographic map 2852 is divided into a first low alert level area **2868*a*, a second low alert level area 2868*b*, a third low alert level area 2868*c*, a medium alert level area 2870, and a high alert level area 2884. The destination 2864 is positioned within the medium alert level area 2870. The cloud computing system 2806 is configured to use any of the collected vehicle data from any of the vehicles 10, the satellite imaging data, or the entries from any of the vehicles 10 to identify the low alert level areas 2868, the medium alert level area 2870, and the high alert level area 2884. For example, if one of the vehicles 10 detects (e.g., based on image data, or an occupant entry) of the satellite image data indicates that a hostile force is present at a specific location, or that an enemy base is located at a specific location, the cloud computing system 2806** may determine that an area surrounding the location of the hostile force or the enemy base is a high alert level area.

Referring particularly to FIG. 46, the geographic map 2852 now illustrates a route 2872 between the base location 2862 (e.g., the starting location) and the destination 2864. The route 2872 is shown extending through the first low alert level area **2868*a*, the third low alert level area 2868*c*, the high alert level area 2884, and the medium alert level area 2870. The route 2872 includes indications of a mode of operation of the vehicle 10. For example, along a first portion 2874 of the route 2872 (e.g., through the first low alert level area 2868***a* and the third low alert level area 2868*c*), the vehicle 10 may operate according to a first mode of operation (e.g., the engine mode 1616) so that the ESS 1000 of the vehicle 10 has a 100% SOC by the time the vehicle 10 arrives at the transition between the third low alert level area 2868*c* and the high alert level area 2884. Along a second portion 2876 of the route 2872 (e.g., through the high alert level area 2884), the vehicle 10 may operate according to a second mode of operation (e.g., the EV/silent mode 1620 or the 1622) to facilitate concealment of the vehicle 10 from hostile or enemy forces that may be in the area. Along a third portion 2878 of the route 2872 (e.g., through the medium alert level area 2870 to the destination 2864), the vehicle 10 operates according to a third mode of operation (e.g., returns to the engine mode 1616) and may charge the batteries 1008 of the ESS 1000 so that the ESS 1000 has a 100% or full SOC by the time the vehicle 10 arrives at the destination 2864.

The route 2872, the portions 2874, 2876, and 2878 of the route 2872, and the modes of operation for the vehicle 10 along the portions 2874, 2876, and 2878 of the route 2872 may be determined by the cloud computing system 2806 based on historically collected vehicle data of the vehicles 10, the geographic locations of the base location 2862 and the destination 2864, and the satellite image data (e.g., the geographic map 2852) and elevation or terrain data determined based on the satellite image data. In some embodiments, the route 2872 is determined by the neural network 2810 based on historically collected vehicle data of the vehicles 10, the geographic locations of the base location 2862 and the destination 2864, and the satellite image data (e.g., the geographic map 2852) and elevation or terrain data determined based on the satellite image data. In some embodiments, the cloud computing system 2806 uses a rule-based or heuristic technique to determine which of the modes of operation of the vehicle 10 that the vehicle 10 should be operated in along the portions 2874, 2876, and 2878 of the route 2872. In some embodiments, the cloud computing system 2806 and/or the neural network 2810 are configured to use the identified alert level zones to determine the route 2872 (e.g., to avoid high alert level zones if a detour through a lower alert level zone is viable). In some embodiments, the cloud computing system 2806 and/or the neural network 2810 are configured to identify the alert level zones based on any combination of satellite image data, collected vehicle data from the vehicles 10, or entries provided by the vehicles 10.

Referring still to FIG. 46, the route 2872 includes notifications 2880 and 2882 (e.g., prompts, entries, alerts, etc.) along the route 2872. The notifications 2880 and 2882 may be generated for the positions along the route 2872 as shown based on the satellite image data or based on entries provided by other vehicles 10. For example, if a different vehicle 10 previously experienced a sand storm at the location of the notification 2880, the notification 2880 may notify the vehicle 10 that is transporting along the route 2872 regarding potentially reduced visibility. Similarly, if a different vehicle 10 previously identified a fortification (e.g., a deserted building, a hiding spot) at a position proximate the notification 2882 (e.g., in the third low alert level zone 2868*c*), the notification 2822 can be positioned at the fortification by the cloud computing system 2806 when generating the mission plan.

Referring still to FIG. 46, the geographic map 2852 includes an indication 2886 which indicates a last located position of potentially hostile or enemy forces. The route 2872 includes a notification 2888 to notify the operator or crew of the vehicle 10 regarding the presence of potentially hostile forces.

In some embodiments, any of the notifications along the route 2872 can be presented (e.g., in a list) to the operator or crew of the vehicle 10 when the vehicle 10 is dispatched or first leaves the base location 2862. The notifications (e.g., notification 2880, notification 2882, and/or notification 2888) may be re-represented to the operator or crew when the vehicle 10 arrives at the location of the notification or approaches the location along the route 2872 of the notification. In some embodiments, notifications along the route 2872 can be updated in response to other vehicles 10 providing new entries nearby to the cloud computing system 2806.

It should be understood that the geographic map 2852 as shown in FIG. 46 may be displayed on a screen of the HMI 1610 to the operator or crew of the vehicle 10. The geographic map 2852 can be updated in real-time or periodically to show the position of the vehicle 10 along the route 2872.

Vehicle Control

Figure 47:
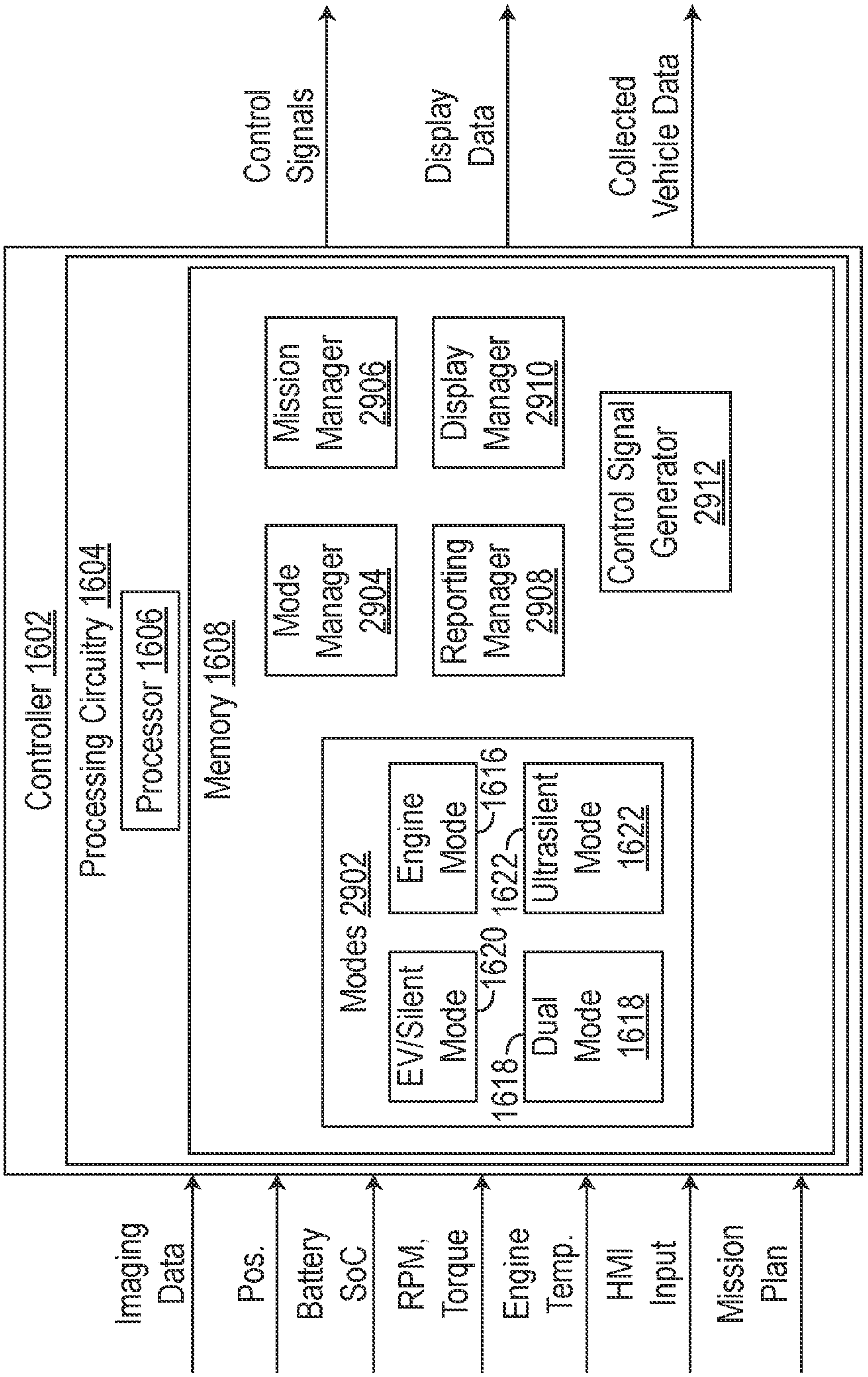
FIG. 47 is a block diagram of the controller of FIG. 39 configured for operation with the system of FIG. 43, according to an exemplary embodiment.

Referring to FIG. 47, the controller 1602 is shown in greater detail to include a mode manager 2904, a mission manager 2906, a reporting manager 2908, a display manager 2910, and a control signal generator 2912, according to some embodiments. The mission manager 2906 is configured to receive the mission plan from the cloud computing system 2806 and provide the modes of operation for the different portions of the route to the mode manager 2904. In some embodiments, the mission manager 2906 is also configured to provide notification data (e.g., regarding the particular locations of the notifications along the route) and image or map data to the display manager 2910 for use in displaying the image or map data and the notifications on the HMI 1610. In some embodiments, the mission manager 2906 is configured to provide route data to the display manager 2910 so that the display manager 2190 can operate the HMI 1610 to provide a graphical representation or overlay of the route on the image or map.

The mode manager 2904 can obtain the position from the GPS 2802 and the modes of operation for the different portions of the route provided by the mode manager 2904. When the vehicle 10 transports along the route of the mission plan or along the different portions of the route, the mode manager 2904 transitions the vehicle 10 between operating according to the EV/silent mode 1620, the engine mode 1616, the dual mode 1618, and/or the ultrasilent mode 1622 as indicated by the mission plan. The mode manager 2904 may activate any of the EV/silent mode 1620, the engine mode 1616, the dual mode 1618, and/or the ultrasilent mode 1622 so that the control signal generator 2912 generates control signals for the driveline 600 and the FEAD 800 (e.g., the engine controls, the IMG controls, the FEAD controls, etc.) according to the selected mode as described in greater detail above with reference to FIGS. 37-39.

The display manager 2910 is configured to generate display data to operate the HMI 1610 to provide any of the data of the mission plan (e.g., the route, the map, the notifications, etc.) to the operator or crew of the vehicle 10. In some embodiments, the display manager 2910 is configured to obtain the position of the vehicle 10 in real-time or periodically from the GPS 2802 and update the display data (e.g., in real-time or periodically) so that the HMI 1610 displays the current location of the vehicle 10 on the map (e.g., along the route). In some embodiments, the display manager 2910 is configured to operate the HMI 1610 to present or display any notifications or alerts for the route (e.g., the notification 2880, the notification 2882, the notification 2888, etc.) when the vehicle 10 approaches positions of the notifications or alerts along the route. In some embodiments, the display manager 2910 is configured to provide notifications regarding transition of a current mode of operation of the vehicle 10, or transition between different alert level zones to the operator or crew of the vehicle 10 by operating the HMI 1610. In some embodiments, the display manager 2910 is configured to receive the HMI input and change operation of the HMI 1610 to provide an interactive interface or display at the HMI 1610 (e.g., a display screen of the HMI 1610). The HMI input may also be an input of any of the entries described in greater detail above with reference to FIGS. 43 and 44, and may be provided to the reporting manager 2908 for transmission to the cloud computing system 2806.

Referring still to FIG. 47, the reporting manager 2908 is configured to obtain sensor data, system data, control unit data, operational data, etc., from any systems or sensors of the vehicle 10 and aggregate or sort collected data. The data that the reporting manager 2908 receives from the various systems or sensors of the vehicle 10 may be any of the collected vehicle data as described in greater detail above with reference to FIG. 43. The reporting manager 2908 can also receive the entries from the HMI 1610 or the display manager 2910 (e.g., the HMI inputs). The reporting manager 2908 may store the collected vehicle data and/or the entries in the memory 1608 if the transceiver 2812 is not in communication with the cloud computing system 2806. If or when the transceiver 2812 is in communication with the cloud computing system 2806, the reporting manager 2908 may transmit the collected vehicle data and/or the entries to the cloud computing system 2806.

Cloud Computing System

Figure 48:
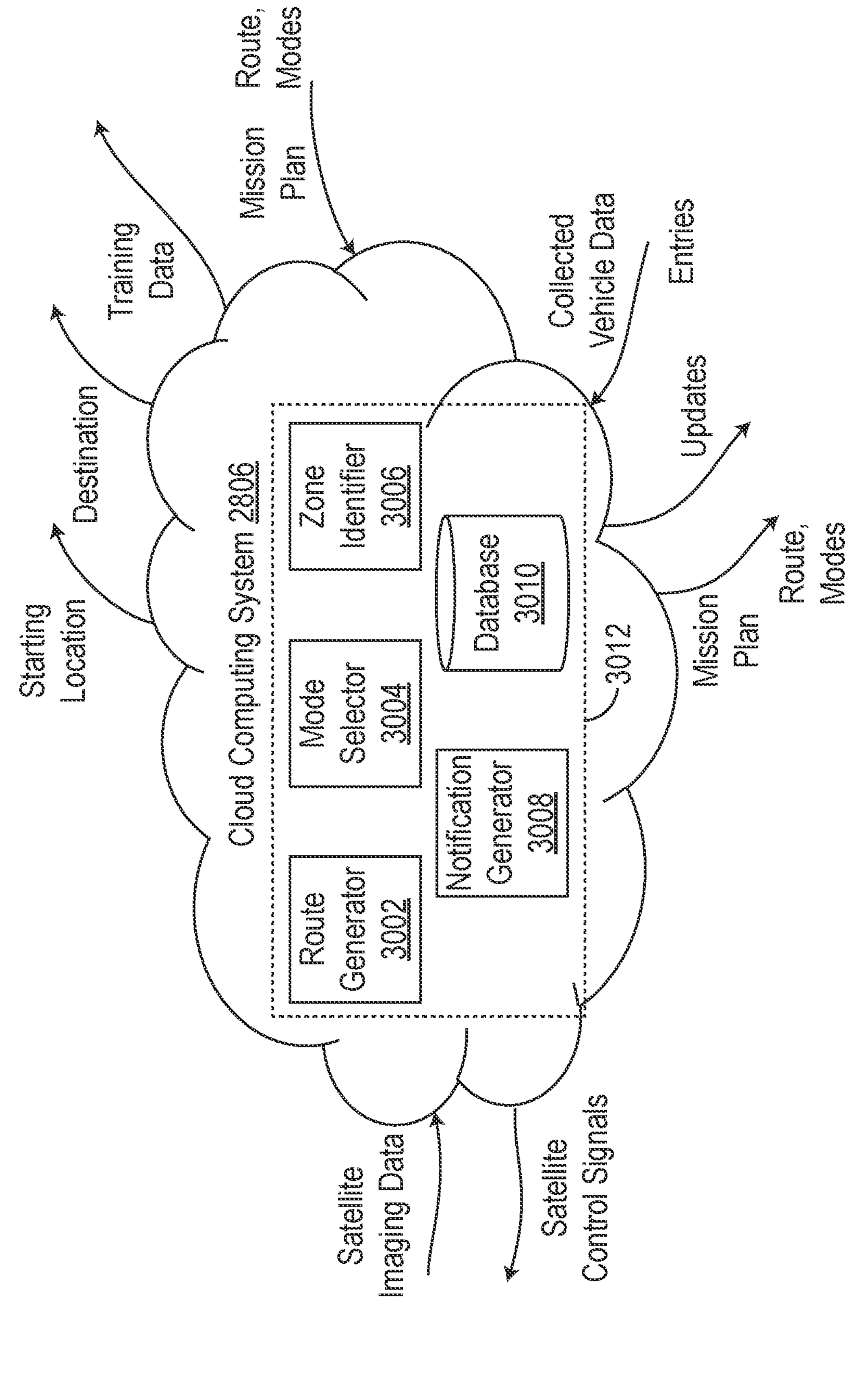
FIG. 48 is a diagram of a cloud computing system of the system of FIG. 43, according to an exemplary embodiment.

Referring to FIG. 48, the cloud computing system 2806 is shown in greater detail, according to some embodiments. The cloud computing system 2806 may be or include processing circuitry 3012 which may be a single processing circuit, multiple distributed processing circuits, etc., configured to perform any of the functionality, operations, steps, or processes of the cloud computing system 2806 described herein with reference to FIGS. 43-49. In some embodiments, the processing circuitry 3012 is similar to the processing circuitry 1604 and includes any number of processors 1606, memory 1608, etc.

The cloud computing system 2806 includes a route generator 3002, a mode selector 3004, a zone identifier 3006, a notification generator 3008, and a database 3010, according to some embodiments. In some embodiments, the cloud computing system 2806 is configured to obtain the satellite imaging data from the satellite 2808 and provide control signals for the satellite 2808 (e.g., shown as satellite control signals). The cloud computing system 2806 may also obtain the collected vehicle data from any of the vehicles 10. The cloud computing system 2806 can be configured to obtain the collected vehicle data and one or more entries from the vehicles 10 (e.g., of a fleet of vehicles 10). In some embodiments, the cloud computing system 2806 is configured to obtain, generate, or define the mission plan, including the route and modes of operation for portions of the route, and provide the mission plan to one or more of the vehicles 10.

The cloud computing system 2806 is also configured to query the neural network 2810 for aid in determining the route, or the mission plan, according to some embodiments. In some embodiments, the cloud computing system 2806 provides the training data to the neural network 2810 to train the neural network 2810 based on the training data. In some embodiments, the cloud computing system 2806 includes the neural network 2810. The neural network 2810, once fully trained, can be used to determine optimal mission plans for new missions by providing a starting location and a destination to the neural network 2810 or a model generated by training the neural network 2810. In some embodiments, the neural network 2810 receives, once trained, a desired mode of optimization or mission planning such as any of (a) minimize power consumption of the vehicle 10, (b) minimize transportation of the vehicle 10 through one or more high alert level zones or areas, (c) achieve the fastest possible route between the starting location and the destination, (d) have a specific SOC of the ESS 1000 when the vehicle 10 enters high alert level zones or when the vehicle 10 approaches the destination, (e) minimize detectability of the vehicle 10, etc., or (f) any combination of (a), (b), (c), (d), and (e) with the different goals of (a), (b), (c), (d), (e), in addition to the starting location and the destination. The training data may include the collected vehicle data (e.g., previous route data, or any of the collected vehicle data described in greater detail above) over a historical or past time period, and may also include historical or most recent entries provided by the vehicles 10 or determined based on recently collected vehicle data of the vehicles 10. The neural network 2810 can provide the cloud computing system 2806 with one or more mission plans including routes and modes of operation for the vehicle 10 along different portions of the routes. The neural network 2810 can also be configured to identify alert levels for different geographic zones (e.g., based on the satellite image data, the collected vehicle data, entries from the vehicles 10, etc.).

The zone identifier 3006 is configured to obtain the satellite image data, the collected vehicle data from any of the vehicles 10, and entries from any of the vehicles 10, and use the satellite image data, the collected vehicle data, and/or the entries from any of the vehicles 10 to identify one or more zones and corresponding alert levels for the one or more zones. In some embodiments, the zone identifier 3006 uses a heuristic or rule-based approach. For example, zones where a home base is located and where hostile forces have not been reported (e.g., indicated by the entries) may be assigned a low level of alert by the zone identifier 3006. Similarly, zones where a home base is not located, but a hostile force was previously reported a significant time period ago (e.g., a week ago, a month ago, etc.) may be assigned a medium level of alert by the zone identifier 3006. In some embodiments, zones or areas that a hostile force or severely inclement weather was reported (e.g., by the entries of the vehicles 10) or identified (e.g., based on image data of the collected vehicle data, based on the satellite image data, etc.) may be assigned a high level of alert by the zone identifier 3006. In some embodiments, the zone identifier 3006 is configured to use AI to perform the zone identification and assignation of alert levels. The zone identifier 3006 can also identify dead zones or zones where wireless communication is weak based on the collected vehicle data. In some embodiments, the zone identifier 3006 is configured to receive an input or a user-definition of the zones and the assigned levels of alerts for the zones (e.g., via a user input to the cloud computing system 2806 such as by a system administrator on a computer that can access the cloud computing system 2806). It should be understood that while the alert level or alert severities of the zones described herein are described as having high, medium, and low alert levels, any number of delineations may be used. For example, the zones may have an assigned alert level that is a score of 1-10, with 1 being the lowest alert level and 10 being the highest alert level.

Referring still to FIG. 48, the route generator 3002 is configured to perform a route generation process to determine a travel path or route for the vehicle 10 between the starting location and the destination, according to some embodiments. In some embodiments, the route generator 3002 is configured to query the neural network 2810 to determine the route. In some embodiments, the route generator 3002 uses the results of the zone identifier 3006 to determine the route.

In some embodiments, the route generator 3002 is configured to perform an optimization that considers different rating criteria or objectives (e.g., length of route, amount of distance or time that a potential route would pass through a high alert level zone, amount of energy consumption required for the vehicle 10 to travel the route, etc.) as a function of the route, given one or more constraints (e.g., an available amount of energy available to the vehicle 10, weapon capabilities of the vehicle 10, maximum torque output of the vehicle 10, etc.). The route generator 3002 can perform the optimization to determine the route that best meets the objectives of the optimization (e.g., maximizes some of the objectives and/or minimizes other of the objectives). In some embodiments, the route generator 3002 is configured to use maps that illustrate elevation changes and/or roads that are available for the vehicle 10 between the starting location and the destination. In some embodiments, the route generator 3002 is configured to consider multiple objectives for the optimization, with each objective assigned a particular weighting. In some embodiments, the route generator 3002 is configured to only consider a single objective (e.g., arrive at the destination as fast as possible, avoid high alert level areas at all costs, etc.) when performing the optimization. The objectives and weightings of the optimization performed by the route generator 3002 can be provided by a system administrator, a deployment manager, military personnel, operators of the vehicles 10, etc.

The route generator 3002 may provide the route to the mode selector 3004, according to some embodiments. In some embodiments, the mode selector 3004 is configured to also receive the zones and the assigned alert levels for each of the zones from the zone identifier 3006. The mode selector 3004 may identify portions of the route that cross different zones, and based on the length of the route through the different zones, the alert levels of the zones, one or more constraints, etc., select a suggested or required operating mode for the vehicle 10 along the portions of the route that pass through the zones. In some embodiments, the optimization performed by the route generator 3002 also uses the available modes as control decisions, and uses one or more constraints (e.g., have a maximum SOC of the batteries 1008 upon entering a high alert level zone, always suggest operation in the EV/silent mode 1620 when transporting through a high alert level zone, etc.) to generate the route and the suggested modes of operation along portions of the route.

The notification generator 3008 is configured to obtain the collected data and/or entries from the vehicles 10, and generate one or more notifications (e.g., the notification 2880, the notification 2882, the notification 2888, etc.) to be presented to the operator of the vehicle 10 and/or occupants or passengers of the vehicle 10 at different locations along the route. The notification generator 3008 may, in some embodiments, only consider entries or reports from other vehicles 10 that have been provided within the last week, within the last two weeks, etc., or within a predetermined time period. For example, if an obstruction in a road of the route has been reported in an entry from a vehicle 10 a day earlier at a particular geographic location, the notification generator 3008 may generate a notification at the particular geographic location that there is potentially an obstruction in the road that has been reported within the last day (e.g., at the time the obstruction was reported) and which vehicle 10 reported the obstruction. In this way, the notifications that are generated by the notification generator 3008 may include a specific geographic location for presentation to the crew of the vehicle 10 when the vehicle 10 approaches the specific geographic location, and information regarding a previously reported entry or an identified entry (e.g., based on the satellite imaging data, weather data, etc.).

Referring still to FIG. 48, the database 3010 can be configured to obtain, sort, aggregate, and store any of the mission plans generated, any of the updates provided to the vehicles 10, any of the collected vehicle data from the vehicles 10, the satellite imaging data, the entries provided by the vehicles 10, etc. In some embodiments, the database 3010 also stores the training data (e.g., sets of training data) that are used for training the neural network 2810. In some embodiments, the database 3010 is accessible by any of the route generator 3002, the mode selector 3004, the zone identifier 3006, the notification generator 3008, the neural network 2810, etc., for performing their respective functionality. The database 3010 may also store results or outputs of any of the route generator 3002, the mode selector 3004, the zone identifier 3006, the notification generator 3008, or the neural network 2810. In some embodiments, database 3010 is accessible by a user, system administrator, military personnel having sufficient clearance level, etc. In some embodiments, the cloud computing system 3806 is hosted on an encrypted webpage and can be accessed by a user responsive to the user providing acceptable credentials. The cloud computing system 2806 can also collect data from the vehicles 10 while transporting along the routes, and generate reports or reporting data for military personnel with a sufficient level of clearance.

Process

Figure 49:
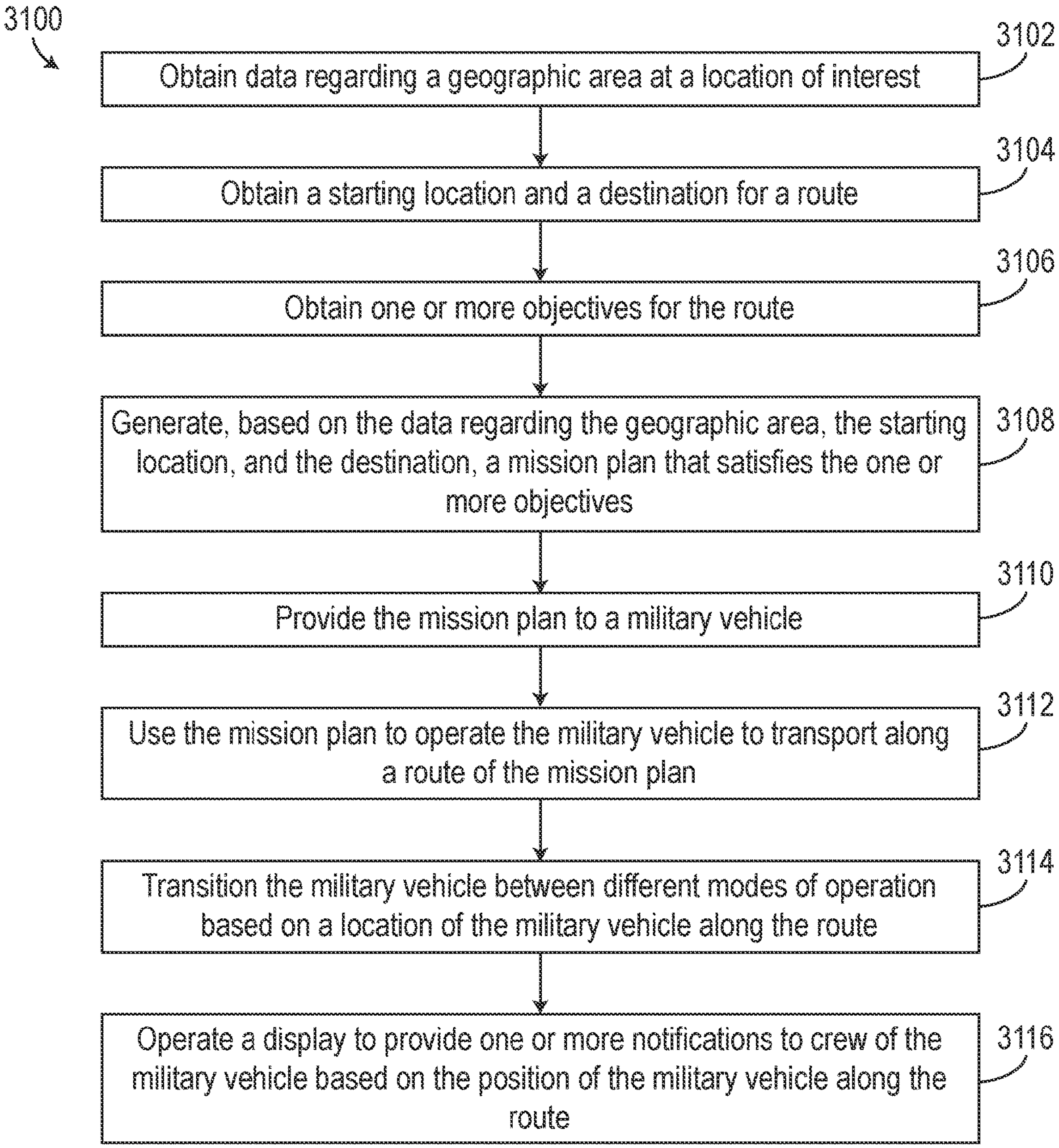
FIG. 49 is a flow diagram of a process for generating and using a mission plan for a military vehicle, according to an exemplary embodiment.

Referring now to FIG. 49, a process 3100 for generating and using a mission plan for a military vehicle (e.g., the vehicle 10) is shown, according to some embodiments. The process 3100 includes steps 3102-3116 and may be performed by the mission planning system 2800 and/or the vehicle 10. The process 3100 facilitates planning, based on known or learned routes, a proper path for the military vehicle to transport along to arrive at a destination, while intelligently adjusting modes of operation or operational parameters of the military vehicle along the route responsive to detected or predicted conditions of areas along the route. The process 3100 may also facilitate determining a mission plan (e.g., a route and modes of operation for different portions of the route) to meet an objective (e.g., get to a destination as fast as possible, arrive at the destination with 100% SOC of the batteries 1008), etc.).

Process 3100 includes obtaining data regarding a geographic area at a location of interest (step 3102), according to some embodiments. In some embodiments, the data is a map, imaging data provided by a satellite, elevation data of the geographic area, terrain data of the geographic area, etc. In some embodiments, the data includes data provided by one or more of a fleet of military vehicles. For example, the data may include the collected vehicle data as described in greater detail above with reference to FIGS. 43-48. In some embodiments, step 3102 is performed by the cloud computing system 2806.

Process 3100 includes obtaining a starting location and a destination for a route (step 3104), according to some embodiments. In some embodiments, the starting location and the destination are provided to the cloud computing system 2806 by a military personnel with sufficient clearance level to plan a mission, or are provided by operators or crew of the military vehicle. The starting location may be at a home base, or if the route is being re-calculated, may be a current location of the military vehicle. The destination may be used to define an end point of the route.

Process 3100 includes obtaining one or more objectives for the route (step 3106), according to some embodiments. In some embodiments, the one or more objectives are provided to the cloud computing system 2806 by the military personnel with sufficient clearance, or by the military vehicle or by crew of the military vehicle. In some embodiments, the one or more objectives are predetermined. Examples of objectives may include, but are not limited to: (a) minimize power consumption of the military along the route, (b) minimize transportation of the military vehicle through one or more high alert level zones or areas, (c) achieve the fastest possible route between the starting location and the destination, (d) have a specific SOC of the ESS 1000 when the military vehicle enters high alert level zones or when the military vehicle approaches the destination, (e) minimize detectability of the military vehicle, or (f) any combination of (a), (b), (c), (d), and (e) with the different objectives of (a), (b), (c), (d), (e) assigned different weightings.

Process 3100 includes generating, based on the data regarding the geographic area, the starting location and the destination, a mission plan that satisfies the one or more objectives (step 3108), according to some embodiments. In some embodiments, step 3108 is performed using a neural network, machine learning, or AI and is performed by the neural network 2810 using any of the techniques described in greater detail above with reference to FIGS. 43-49. In some embodiments, step 3108 is performed using a heuristic or rule-based approach and is performed by the cloud computing system 2806. In some embodiments, step 3108 is performed by performing an optimization (e.g., by the cloud computing system 2806). The mission plan may include a route from the starting location to the destination, and which of multiple modes of operation the military vehicle should be operated in along different portions of the route. The mission plan can be determined, generated, or defined, based on the collected vehicle data as described in greater detail above with reference to FIGS. 43-48, elevation or terrain data, specifications of the military vehicle, a model of the military vehicle (e.g., the vehicle 10) that defines operational characteristics of the military vehicle with respect to given inputs such as control decisions and/or environmental conditions, and/or entries or reports from other military vehicles (e.g., crowd-sourced information).

Process 3100 includes providing the mission plan to the military vehicle (step 3110) and using the mission plan to operate the military vehicle along a route of the mission plan (step 3112), according to some embodiments. In some embodiments, step 3110 is performed by the cloud computing system 2806 by transmitting (e.g., wirelessly or wiredly such as when the military vehicle is at a home base) the mission plan. In some embodiments, step 3112 includes autonomously operating the military vehicle (e.g., driving, braking, and steering the military vehicle) along the route. In some embodiments, step 3112 includes operating a screen of the HMI 1610 to provide a map of the area, with the route overlaid on the map so that the operator of the military vehicle is prompted to drive the military vehicle along the route. In some embodiments, the route is provided in an augmented reality (AR) manner such as on goggles of the operator of the military vehicle, on a windshield of the military vehicle, etc. In some embodiments, step 3112 includes autonomously operating the military vehicle to transport along the route, but allowing the operator to manually override autonomous operation of the military vehicle to manually operate the military vehicle for transportation. In some embodiments, step 3112 is performed by the controller 1602.

Process 3100 includes transitioning the military vehicle between different modes of operation based on a location of the military vehicle along the route (step 3114), according to some embodiments. In some embodiments, step 3114 is performed by the controller 1602 of the vehicle 10. The controller 1602 may automatically transition between any of the EV/silent mode 1620, the engine mode 1616, the dual mode 1618, and/or the ultrasilent mode 1622 based on the mission plan (e.g., when the mission plan indicates which mode of operation the military vehicle should be operated in along portions of the route) or may prompt the operator to manually transition the military vehicle between any of the EV/silent mode 1620, the engine mode 1616, the dual mode 1618, and/or the ultrasilent mode 1622 (e.g., by operating a display screen of the HMI 1610).

Process 3100 includes operating a display to provide one or more notifications to crew of the military vehicle based on the position of the military vehicle along the route (step 3116), according to some embodiments. In some embodiments, the notifications are a portion of the mission plan that have specific geographic locations (e.g., based on crowd-sourced data or reports or entries from other vehicles 10). In some embodiments, step 3116 is performed by the controller 1602 of the vehicle 10 by operating a display screen of the HMI 1610 to provide the notifications when the military vehicle (e.g., the vehicle 10) approaches geographic locations associated with the notifications. In some embodiments, the notifications include varying alert levels, and include textual or graphical information that is displayed on a screen of the HMI 1610 when the military vehicle approaches or reaches the geographic locations of the notifications. The notifications may be provided in a list (e.g., when starting the mission) on the display or screen of the HMI 1610 so that the operator may view all notifications associated with the route.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the hull and frame assembly 100, the driveline 600, IMG 700, the FEAD 800, the ESS 1000, the control system 1600, etc.) as shown in the various exemplary embodiments is illustrative only. Additionally, any element disclosed in one embodiment may be incorporated or utilized with any other embodiment disclosed herein.

The invention claimed is:

1. A system for mission planning of a military vehicle, the system comprising:

a military vehicle configured to operate according to a plurality of modes, the military vehicle comprising a controller; and processing circuitry configured to:

obtain a starting location and a destination for the military vehicle;

obtain data associated with a geographic area and reported identification of enemy forces;

determine a mission plan based on the data associated with the geographic area, the starting location and the destination, and the identification of enemy forces, the mission plan comprising a route between the starting location and the destination, a plurality of areas along the route having an alert level corresponding to the identification of enemy forces, and a selection of one of the plurality of modes that the military vehicle should be operated according to while transporting along the route through the plurality of areas based on the alert level, the mission plan and the selection of the plurality of modes determined prior to beginning implementation of the mission plan such that a state of charge of batteries of the military vehicle are sufficient to power electric weaponry of the military vehicle when the military vehicle is predicted to enter one or more areas having a high alert level and such that a distance that the military vehicle is predicted to travel through the one or more areas having the high alert level is reduced; and provide the mission plan to the military vehicle;

wherein the controller of the military vehicle is configured to use the mission plan to autonomously operate the military vehicle to transport along the route or prompt an operator of the military vehicle to operate the military vehicle to transport along the route;

wherein the controller is further configured to automatically transition the military vehicle between the plurality of modes based on the selection of the one of the plurality of modes that the military vehicle should be operated according to while transporting along the route through the plurality of areas such that a thermal and acoustic signature of the military vehicle are controlled.

2. The system of claim 1, wherein the mission plan is determined using artificial intelligence and training data obtained from a plurality of military vehicles in the geographic area.

3. The system of claim 1, wherein the mission plan is determined using a rules-based technique.

4. The system of claim 1, wherein the processing circuitry is further configured to:

obtain one or more objectives for the mission plan; and determine the mission plan based on the data associated with the geographic area, the mission plan comprising the route between the starting location and the destination, and the selection of one of the plurality of modes that the military vehicle should be operated according to while transporting along the route through the plurality of areas based on the alert level to achieve the one or more objectives for the mission plan.

5. The system of claim 4, wherein the one or more objectives comprise at least one of:

a desired state of charge that batteries of the military vehicle should be at when the military vehicle approaches the destination;

a minimization of energy consumed by the military vehicle for the military vehicle to transport from the starting location to the destination;

a minimization of an amount of time for the military vehicle to transport from the starting location to the destination;

or a minimization of detectability of the military vehicle.

6. The system of claim 5, wherein the desired state of charge that the batteries of the military vehicle should be at when the military vehicle approaches the destination is a maximum state of charge.

7. The system of claim 1, wherein the mission plan further comprises one or more notifications, wherein each of the one or more notifications is assigned to a geographic location along the route and is presented to the operator of the military vehicle when the military vehicle approaches the geographic location along the route.

8. The system of claim 7, wherein the one or more notifications are generated by the processing circuitry based on one or more entries or reports provided by another military vehicle that is in the geographic area.

9. The system of claim 1, wherein the plurality of modes comprise an engine mode, an electric vehicle or silent mode, an ultrasilent mode, and a dual-drive mode.

10. A method for mission planning of a military vehicle, the method comprising:

obtaining a starting location and a destination of the military vehicle configured to operate according to a plurality of modes;

obtaining data associated with a geographic area proximate at least one of the starting location and the destination of the military vehicle;

obtaining an identification of enemy forces and a corresponding location of the enemy forces;

determining a mission plan based on the data associated with the geographic area, the identification of enemy forces, the starting location, and the destination, the mission plan comprising a route between the starting location and the destination, a plurality of areas along the route having an alert level corresponding to the identification of enemy forces, and a selection of one of the plurality of modes that the military vehicle should be operated according to while transporting along the route through the plurality of areas based on the alert level, the mission plan and the selection of the plurality of modes determined prior to beginning implementation of the mission plan such that a state of charge of batteries of the military vehicle are sufficient to power electric weaponry of the military vehicle when the military vehicle is predicted to enter one or more areas having a high alert level and such that a distance that the military vehicle is predicted to travel through the one or more areas having the high alert level is reduced;

autonomously operating the military vehicle to transport along the route or prompting an operator of the military vehicle to operate the military vehicle to transport along the route; and automatically transitioning the military vehicle between the plurality of modes based on the selection of the one of the plurality of modes that the military should be operated according to while transporting along the route through the plurality of areas such that a thermal and acoustic signature of the military vehicle are controlled.

11. The method of claim 10, wherein the mission plan is determined using artificial intelligence and training data obtained from a plurality of military vehicles in the geographic area.

12. The method of claim 10, further comprising:

obtaining one or more objectives for the mission plan; and determining the mission plan based on the data associated with the geographic area, the mission plan comprising the route between the starting location and the destination, and the selection of one of the plurality of modes that the military vehicle should be operated according to while transporting along the route through the plurality of areas based on the alert level.

13. The method of claim 12, wherein the one or more objectives comprise at least one of:

a desired state of charge that batteries of the military vehicle should be at when the military vehicle approaches the destination;

a minimization of energy consumed by the military vehicle for the military vehicle to transport from the starting location to the destination;

a minimization of an amount of time for the military vehicle to transport from the starting location to the destination;

or a minimization of detectability of the military vehicle.

14. The method of claim 12, wherein the one or more objectives comprises at least a desired state of charge that the batteries of the military vehicle should be at when the military vehicle approaches the destination, the desired state of charge being a maximum state of charge.

15. The method of claim 12, wherein the mission plan further comprises one or more notifications, wherein each of the one or more notifications is assigned to a geographic location along the route and is presented to the operator of the military vehicle when the military vehicle approaches the geographic location along the route.

16. The method of claim 15, wherein the one or more notifications are generated by processing circuitry based on one or more entries or reports provided by another military vehicle that is in the geographic area.

17. The method of claim 10, wherein the plurality of modes comprise an engine mode, an electric vehicle or silent mode, an ultrasilent mode, and a dual-drive mode.

18. The method of claim 17, wherein:

in the engine mode, only an internal combustion engine operates to transport the military vehicle;

in the electric vehicle or silent mode, only an electric motor operates to transport the military vehicle;

in the ultrasilent mode, only the electric motor operates to transport the military vehicle and one or more other features are disabled to reduce sound output of the military vehicle; and in the dual-drive mode, both the engine and the electric motor operate to transport the military vehicle.

19. A method for mission planning of a military vehicle, the method comprising:

obtaining a starting location for the military vehicle, a destination for the military vehicle, and a plurality of desired objectives;

determining a mission plan that achieves the plurality of desired objectives based on data associated with a geographic area of at least one of the starting location or the destination, the starting location, and the destination, the mission plan comprising a route between the starting location and the destination, a plurality of areas along the route having an alert level corresponding to presence and identified equipment of enemy forces, and controls for the military vehicle while transporting along the route through the plurality of areas based on the alert level;

autonomously operating the military vehicle to transport along the route or prompting an operator of the military vehicle to operate the military vehicle to transport along the route; and adjusting operation of the military vehicle according to the controls of the mission plan along the plurality of areas based on the alert level such that a thermal and acoustic signature of the military vehicle are controlled;

wherein the plurality of desired objectives include both a desired state of charge of batteries of the military vehicle by entering a high alert one of the plurality of areas along the route or by the destination at which enemy forces have been identified and a minimization of an amount of time for the military vehicle to transport through high alert level areas.

20. The method of claim 19, further comprising:

obtaining information regarding a time at which enemy forces are identified along the route; and determining the mission plan based on an amount of time that has elapsed since the time at which the enemy forces were identified along the route.

* * * * *